United States Patent [19]
Shimada et al.

[11] Patent Number: 5,852,485
[45] Date of Patent: Dec. 22, 1998

[54] LIQUID CRYSTAL DISPLAY DEVICE AND METHOD FOR PRODUCING THE SAME

[75] Inventors: Yoshinori Shimada, Yamatokoriyama; Tetsuro Koyama; Hirohiko Nishiki, both of Tenri; Yoshiharu Kataoka, Suita, all of Japan

[73] Assignee: Sharp Kabushiki Kaisha, Osaka, Japan

[21] Appl. No.: 806,928

[22] Filed: Feb. 26, 1997

[30] Foreign Application Priority Data

| Feb. 27, 1996 | [JP] | Japan | 8-040125 |
| Feb. 27, 1996 | [JP] | Japan | 8-040127 |
| Mar. 19, 1996 | [JP] | Japan | 8-063543 |

[51] Int. Cl.$^6$ ................................................ G02F 1/1343
[52] U.S. Cl. ............................................ 349/141; 349/38
[58] Field of Search ...................... 349/141, 138, 349/38, 42

[56] References Cited

U.S. PATENT DOCUMENTS

| 3,876,287 | 4/1975 | Sprokel | 349/177 |
| 4,952,031 | 8/1990 | Tsunoda et al. | 349/24 |
| 5,064,275 | 11/1991 | Tsunoda et al. | 349/24 |
| 5,585,951 | 12/1996 | Noda et al. | 349/122 |
| 5,598,285 | 1/1997 | Kondo et al. | 349/39 |
| 5,600,464 | 2/1997 | Ohe et al. | 349/123 |
| 5,641,974 | 6/1997 | den Boer et al. | 257/59 |
| 5,745,207 | 4/1998 | Asuda et al. | 349/141 |
| 5,754,266 | 5/1998 | Ohta et al. | 349/139 |
| 5,760,856 | 6/1998 | Yanagawa et al. | 349/42 |
| 5,774,099 | 6/1998 | Iwasaki et al. | 345/87 |

FOREIGN PATENT DOCUMENTS

7-36058  2/1995  Japan .

*Primary Examiner*—William L. Sikes
*Assistant Examiner*—Tiep H. Nguyen
*Attorney, Agent, or Firm*—Nixon & Vanderhye, P.C.

[57] ABSTRACT

A liquid crystal display device includes an active-matrix substrate; a counter substrate; and a liquid crystal layer interposed between the active-matrix substrate and the counter substrate. The active-matrix substrate includes a plate; gate lines provided on the plate; a gate insulation layer provided on the plate; source lines provided on the gate insulation layer and Refining picture element areas together with the gate lines; switching elements provided at intersections of gate lines and the source lines, the switching elements each including a source electrode and a drain electrode as well as a gate electrode, connecting electrodes each connected to the drain electrode; an interlayer insulation layer provided on the gate insulation layers covering the gate lines, the source lines, and the switching elements; and picture element electrodes and counter electrodes provided on the interlayer insulation layer for driving liquid crystal molecules in the liquid crystal layer. The picture element electrodes are provided in a first direction of the picture element areas, and the counter electrodes are provided in the first direction of the picture element areas and extending over picture element areas.

15 Claims, 32 Drawing Sheets

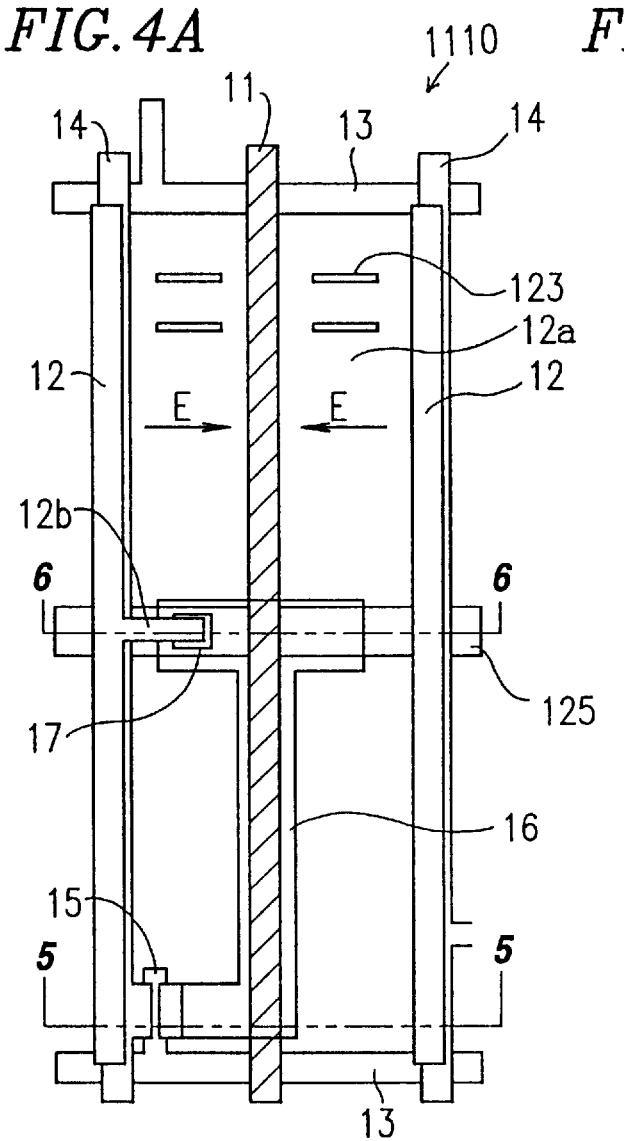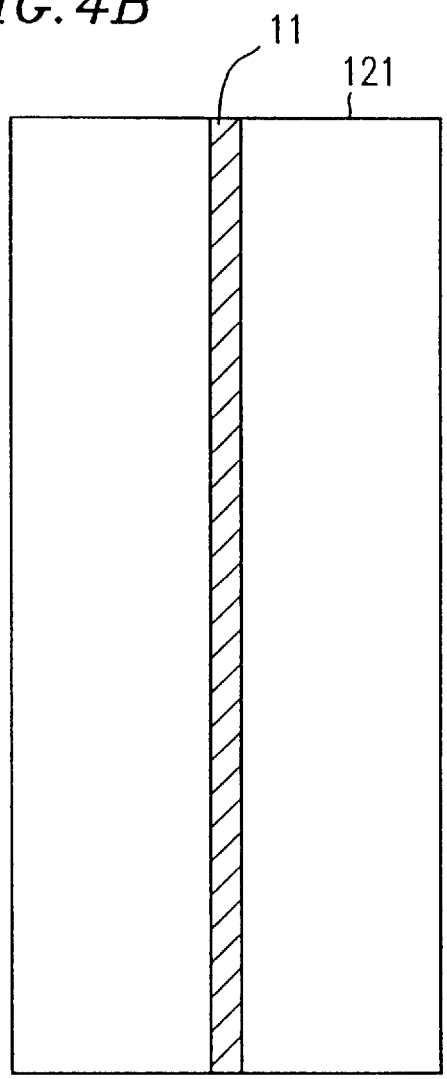

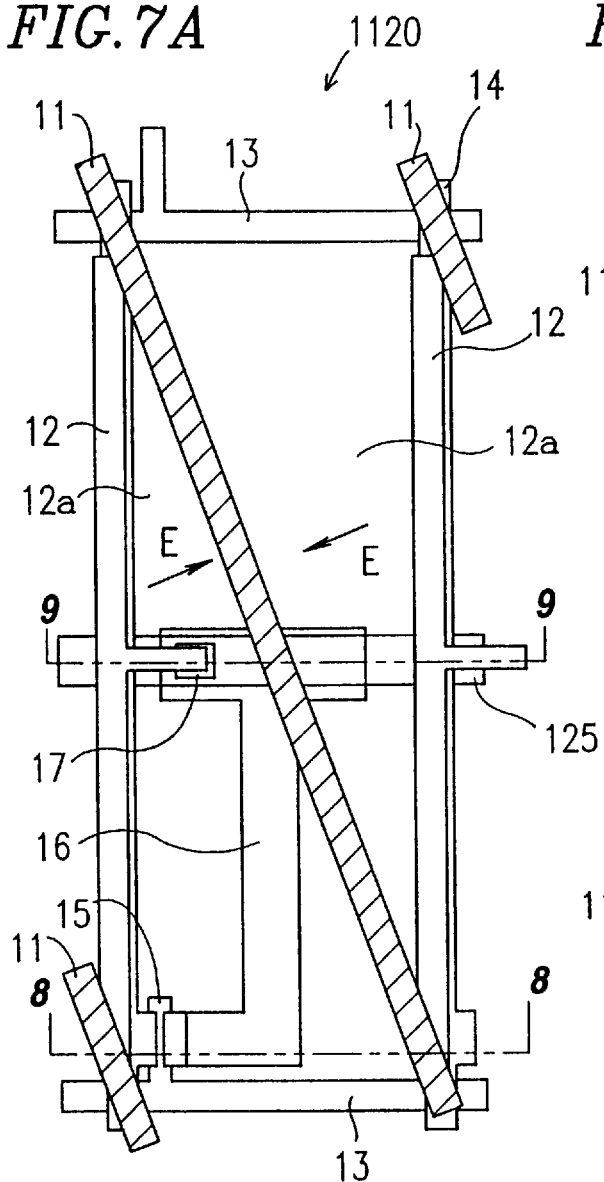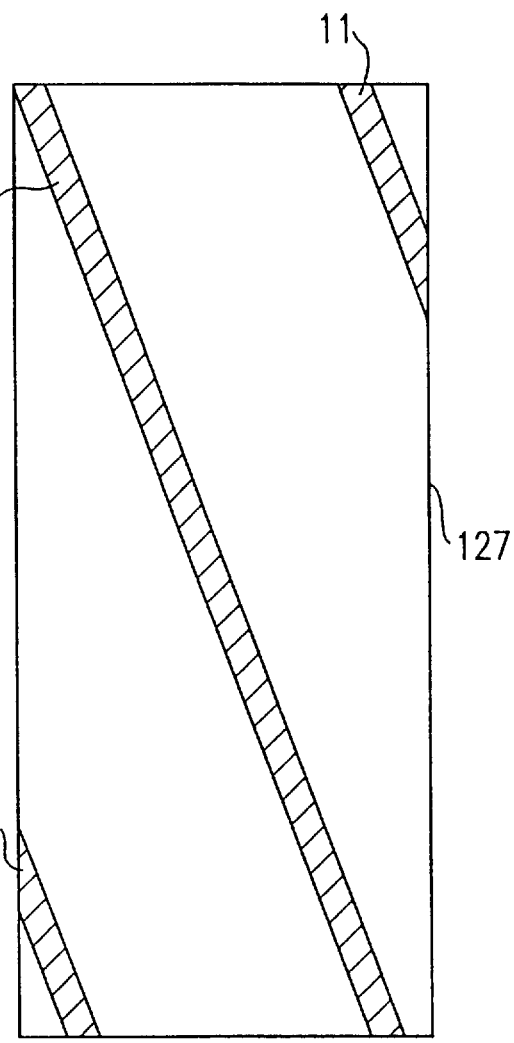

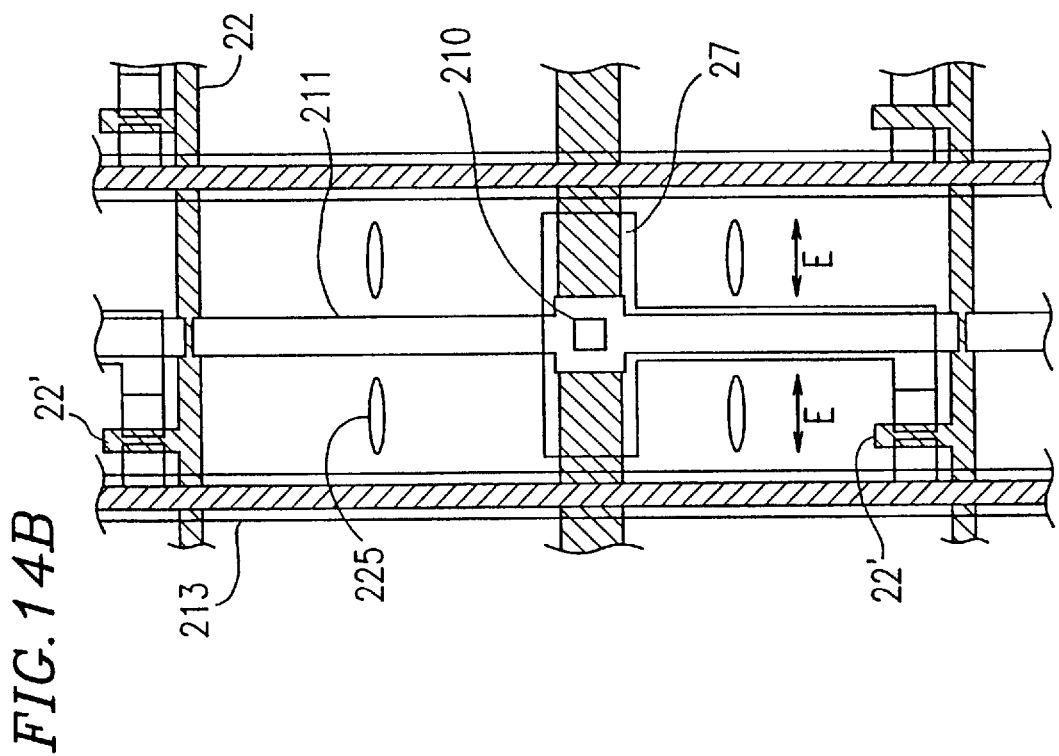
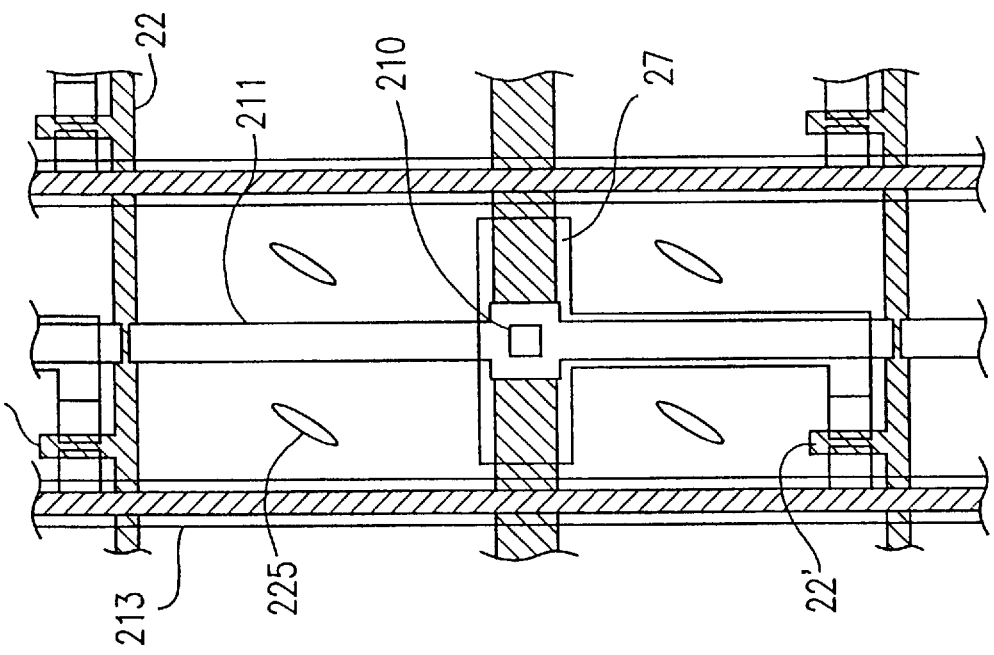

LIQUID CRYSTAL DISPLAY DEVICE AND METHOD FOR PRODUCING THE SAME

BACKGROUND OF THE INVENTION

1. Field of the Invention

The present invention relates to a display device including thin-film transistors (hereinafter, referred to as TFTs) serving as switching elements and a liquid crystal material serving as a display medium. In particular, the present invention relates to the configuration of an active-matrix substrate of such a display device.

2. Description of the Related Art

An active-matrix type liquid crystal display device (hereinafter, referred to as LCD device) includes TFTs functioning as switching elements formed in a matrix on an insulation substrate made of glass or the like. The active-matrix type LCD device is expected to realize flat panel display with high quality. In order to effectively realize a wide viewing angle in a conventional active-matrix type LCD device, a method for applying an electric field to liquid crystal molecules, in a direction substantially parallel to the substrate, has been proposed, for example, in Japanese Laid-Open Patent Publication No. 7-36058.

FIGS. 24A, 24B and 25 show the configuration of a conventional active-matrix type LCD device 4200. FIGS. 24A and 24B show an area corresponding to one picture element in the active-matrix substrate 4201. FIG. 25 is a cross-sectional view showing the active-matrix type LCD device 4200 taken along a line 25—25 in FIG. 24A.

As shown in FIG. 25, the active-matrix type LCD device 4200 includes an active-matrix substrate 4201, a counter substrate 4202, and a liquid crystal layer 217 interposed between the active-matrix substrate 4201 and the counter substrate 4202. The active-matrix substrate 4201 includes a lower glass plate 21. On the lower glass plate 21 are formed gate lines 22, common electrodes 223, a gate insulation film 23, source lines 28, a semiconductor layer 24, picture element electrodes 211, and driving electrodes (counter electrodes) 213. The gate insulation film 23 is formed so as to cover the gate lines 22 and the common electrodes 223. On the gate insulation film 23 are formed the semiconductor layer 24, the source lines 28, the picture element electrodes 211, and the driving electrodes 213.

As shown in FIGS. 24A and 24B, the source line 28 has a branch 28c at the portion where the source line 28 crosses the gate line 22. A switching element (TFT) 2203 is formed by using the gate line 22 as a gate electrode, the branch 28c as a source electrode, and the picture element electrode 211 as a drain electrode. The driving electrode 213 is formed of the same material as that of the picture element electrode 211. The driving electrode 213 is connected to the common electrode 223 via a contact hole 210.

A protection insulation film 224 is formed so as to cover the source lines 28, the picture element electrodes 211, the driving electrodes 213, and the switching elements 2203. On the protection insulation film 224, an alignment film 216 is formed. The common electrode 223 and the picture element electrode 211 cross each other, interposing the gate insulation film 23. At the portion where the common electrode 223 and the picture element electrode 211 cross each other, a storage capacitor is formed.

The counter substrate 4202 includes an upper plate 214, another alignment film 216 formed on the upper plate 214 so as to face the active-matrix substrate 4201, and a polarizing plate 212 formed on the outer surface of the upper plate 214, In the thus configured active-matrix type LCD device 4200, an electric field formed in a direction substantially parallel to the substrate is applied to the liquid crystal layer 217. Such a method for driving an LCD device by forming an electric field in a direction substantially parallel to the substrate is called a horizontal electric field driving system. As shown in FIG. 24A, liquid crystal molecules 225 are orientated so as to have a certain angle (from 0 degree or more but less than 15 degrees) with respect to a longitudinal direction of the picture element electrodes 211 and the driving electrodes 213 in the state where no voltage is applied. When a voltage is applied across the picture element electrode 211 and the driving electrode 213, the liquid crystal molecules 225 are oriented along an electric field E as indicated with an arrow in FIG. 24B from the picture element electrode 211 toward the driving electrode 213.

In the LCD device 4200 driven by the horizontal electric field driving system as described above, since the common electrodes 223 and the driving electrodes 213 are arranged on the active-matrix substrate on which TFTs are formed, the arrangement of wires for the electrodes on the active-matrix substrate is complicated as compared with an LCD device driven by a vertical electric field driving system in which the common electrodes are arranged on the counter substrate. Therefore, this conventional horizontal electric field driving system has a disadvantage in that crosstalk is likely to occur due to a parasitic capacitance between the wires. Furthermore, in the case where a transmission type LCD device is driven by the conventional horizontal electric field driving system, an aperture area through which light is transmitted is disadvantageously limited due to the presence of the common electrodes. Thus, sufficient brightness cannot be obtained.

With reference to FIGS. 30A, 30B and 31, another conventional LCD device 4300 device described in Japanese Laid-Open Patent Publication No. 7-36058 is described. The LCD device 4300 is of the horizontal electric field driving system.

FIG. 30A is a partial plan view of an active-matrix substrate 4301 of the LCD device 4300. FIG. 30B is a cross sectional view of the active-matrix substrate 4301 taken along line 30B, 31—30B, 31 in FIG. 30A. FIG. 31 is a cross sectional view of the LCD device 4300.

As shown in FIGS. 30A and 30B, the active-matrix substrate 4301 includes a lower plate 36a. On the lower plate 36a, a plurality of counter electrodes 35 are provided. An insulation layer 37 is provided on the lower plate 36a so as to cover the plurality of counter electrodes 35. On the insulation layer 37, a plurality of gate lines 31 and a plurality of source lines 32 are provided. The gate lines 31 are arranged in stripes parallel to each other, and the source lines 32 are also arranged in stripes parallel to each other. The gate lines 31 and the source lines 32 are substantially perpendicular to each other. Each picture element area 40 is defined by two adjacent gate lines 31 and two adjacent source lines 32. Although only one picture element area 40 is shown in FIG. 30A, the LCD device 4300 includes a plurality of picture element areas 40 defined by the gate lines 31 and the source lines 32 arranged in a matrix. Each counter electrode 35 is provided along the four peripheries of one picture element area 40.

At each of intersections of the gate lines 31 and the source lines 32, a TFT 38 is provided. The TFT 38 includes a gate electrode 31a, a source electrode 32a, and a drain electrode 34. The source electrode 32a is connected to the corresponding source line 32. As best shown in FIG. 30A, the drain electrode 34 is extended across the picture element area 40 in the shape of the letter H.

As shown in FIG. 31, an alignment layer 314 is provided on the insulation layer 37 so as to cover the source lines 32 and the drain electrodes 34. The LCD device 4300 includes the active-matrix substrate 4301 having such a structure and a counter substrate 4302. The counter substrate 4302 includes an upper plate 36b and an alignment layer 313 provided on the upper plate 36b.

The LCD device 4300 of the horizontal electric field driving system is completed by assembling the active-matrix substrate 4301 and the counter substrate 4302 in the state where the alignment layers 313 and 314 face each other and injecting liquid crystal molecules into the space therebetween to form a liquid crystal layer 39.

In an LCD device of the vertical electric field driving system, reduction in the contrast ratio and inversion of the gray scale levels in accordance with the viewing angle are caused because the angle between the light transmitted through the liquid crystal layer and the principal axis of the liquid crystal molecules varies in accordance with the viewing angle, resulting in birefringence anisotropy of the liquid crystal material.

The LCD device 4300 of the horizontal electric field driving system operates in the following manner.

As shown in FIG. 31, an electric field parallel to the upper and lower plates 36b and 36a is applied as a signal 315 between the drain electrode 34 and the counter electrode 35, Thus, the liquid crystal molecules in the liquid crystal layer 39 rotate in a plane parallel to the upper and lower plates 36b and 36a. In this manner, light transmittance is controlled. Accordingly, the angle between the light transmitted through the liquid crystal layer 39 and the principal axis of the liquid crystal molecules is maintained regardless of the viewing angle. As a result, the contrast ratio is maintained regardless of the viewing angle, thus realizing satisfactory display in a wider range of viewing angles.

SUMMARY OF THE INVENTION

According to one aspect of the invention, a liquid crystal display device includes an active-matrix substrate; a counter substrate; and a liquid crystal layer interposed between the active-matrix substrate and the counter substrate. The active-matrix substrate includes a plate; a plurality of gate lines provided on the plate; a gate insulation layer provided on the plate; and a plurality of source lines provided on the gate insulation layer and defining a plurality of picture element areas together with the plurality of gate lines. The active-matrix substrate also includes a plurality of switching elements provided at intersections of the plurality of gate lines; the switching elements each including a source electrode and a drain electrode as well as a gate electrode; a plurality of connecting electrodes each connected to the drain electrode; an interlayer insulation layer provided on the gate insulation layer, covering the plurality of gate lines, the plurality of source lines, and the plurality of switching elements; and a plurality of picture element electrodes and a plurality of counter electrodes provided on the interlayer insulation layer for driving liquid crystal molecules in the liquid crystal layer. The plurality of picture element electrodes are provided in a first direction of the picture element areas, and the plurality of counter electrodes are provided in the first direction of the picture element areas and extending over the plurality of picture element areas.

According to another aspect of the invention, a liquid crystal display device includes an active-matrix substrate; a counter substrate; and a liquid crystal layer interposed between the active-matrix substrate and the counter substrate. The active-matrix substrate includes a plate; a plurality of gate lines provided on the plate; a gate insulation layer provided on the plate; and a plurality of source lines provided on the gate insulation layer and defining a plurality of picture element areas together with the plurality of gate lines. The active-matrix substrate also includes a plurality of switching elements provided at intersections of the plurality of gate lines and the plurality of source lines, the switching elements each including a source electrode and a drain electrode as well as a gate electrode; a plurality of connecting electrodes each connected to the drain electrode, and a plurality of common lines each for forming a storage capacitor together with a part of the connecting electrode with the gate insulation layer interposed therebetween. Also included in the active-matrix substrate is an interlayer insulation layer provided on the gate insulation layer, covering the plurality of gate lines, the plurality of source lines, and the plurality of switching elements; and a plurality of picture element electrodes and a plurality of counter electrodes provided on the interlayer insulation layer for driving liquid crystal molecules In the liquid crystal layer. Each counter electrode is connected to the common line through a contact hole provided in the interlayer insulation layer in each of the plurality of picture element areas.

According to still another aspect of the invention, a liquid crystal display device includes an active-matrix substrate; a counter substrate; and a liquid crystal layer interposed between the active-matrix substrate and the counter substrate. The active-matrix substrate includes a plate; a plurality of gate lines provided on the plate; a gate insulation layer provided on the plate; and a plurality of source lines provided on the gate insulation layer and defining a plurality of picture element areas together with the plurality of gate lines. The active-matrix substrate also includes a plurality of switching elements provided at intersections of the plurality of gate lines and the plurality of source lines, the switching elements each including a source electrode and a drain electrode as well as a gate electrode; a plurality of connecting electrodes each connected to the drain electrode; and an interlayer insulation layer provided on the gate insulation layer, covering the plurality of gate lines, the plurality of source lines, and the plurality of switching elements; and a plurality of picture element electrodes and a plurality of counter electrodes for driving the liquid crystal molecules in the liquid crystal layer. The plurality of picture element electrodes are provided on the interlayer insulation layer, and the plurality of counter substrates are provided in the counter substrate.

According to still another aspect of the invention, a method for producing a liquid crystal display device includes the steps of forming a plurality of gate lines on a plate; forming a gate insulation layer on the plate; forming a plurality of source lines and a plurality of connecting electrodes by patterning; forming a switching element at each of intersections of the plurality of gate lines and the plurality of source lines, the switching element including a source electrode and a drain electrode as well as a gate electrode; forming an interlayer insulation layer on the gate insulation layer so as to cover the switching elements, the source lines, and the connecting electrodes; forming a plurality of picture element electrodes and a plurality of counter electrodes on the interlayer insulation layer; forming a plurality of contact holes running through the interlayer insulation layer in a thickness direction; connecting the picture element electrodes and the connecting electrodes respectively through the corresponding contact hole, thereby forming an active-matrix substrate; and assembling the active-matrix substrate and a counter substrate with a liquid crystal layer interposed therebetween. The picture element electrodes and the counter electrodes are used for driving liquid crystal molecules in the liquid crystal layer.

According to still another aspect of the invention, a method for producing a liquid crystal display device includes the steps of forming a plurality of gate lines on a plate; forming a gate insulation layer on the plate; forming a plurality of source lines and a plurality of connecting electrodes by patterning: forming a switching element at each of intersections of the plurality of gate lines and the plurality of source lines, the switching element including a source electrode and a drain electrode as well as a gate electrode branched from the gate line; forming an interlayer insulation layer on the gate insulation layer so as to cover the switching elements, the source lines, and the connecting electrodes, forming a plurality of picture element electrodes on the Interlayer insulation layer; forming a plurality of contact holes running through the interlayer insulation layer in a thickness direction; connecting the picture element electrodes and the connecting electrodes respectively through the corresponding contact hole, thereby forming an active-matrix substrate; forming a plurality of counter electrodes on another plate, thereby forming a counter substrate; and assembling the active-matrix substrate and the counter substrate with a liquid crystal layer interposed therebetween. The counter electrodes are formed at such positions that generate an electric field with the picture element electrodes, the electric field being in the direction substantially parallel to surfaces of the active-matrix substrate and the counter substrate. The picture element electrodes and the counter electrodes are used for driving liquid crystal molecules in the liquid crystal layer.

According to still another aspect of the invention, an active-matrix substrate includes: an insulation substrate; a plurality of switching elements arranged in a matrix on the insulation substrate; a plurality of first signal lines for supplying a signal for controlling the switching elements to the switching elements; a plurality of second signal lines for supplying a data signal to the switching elements, arranged so as to cross the first signal lines; an interlayer insulation film having contact holes formed therethrough, formed so as to cover the switching elements, the first signal lines, and the second signal lines; a plurality of picture element electrodes formed on the interlayer insulation film, electrically connected to the switching elements through the contact holes; and a plurality of counter electrodes formed on the interlayer insulation film, wherein the counter electrodes are formed along the second signal lines so es to face the second signal lines through the interlayer insulation film, the plurality of picture element electrodes are arranged in the same direction in which the counter electrodes are formed, and the plurality of picture element electrodes and the counter electrodes are alternately arranged so that the picture element electrodes and the counter electrodes are disposed at substantially equal intervals.

According to still another aspect of the invention, a liquid crystal display device includes: an active-matrix substrate; a counter substrate; and a liquid crystal layer interposed between the active-matrix substrate and the counter substrate, the active-matrix substrate including: a first insulation plate; a plurality of switching elements arranged in a matrix on the first insulation plate; a plurality of first signal lines for supplying a signal for controlling the switching elements to the switching elements; a plurality of second signal lines for supplying a data signal to the switching elements, arranged so as to cross the first signal lines; an insulation film having contact holes formed therethrough, the insulating film being formed so as to cover the switching elements and the first signal lines and the second signal lines; and a plurality of picture element electrodes formed on the insulation film, electrically connected to the switching elements via the contact holes, wherein the counter substrate includes a second insulation plate and counter electrodes formed on the second insulation plate, wherein the counter electrodes are formed along the second signal lines through the liquid crystal layer so as to oppose the second signal lines, the picture element electrodes are arranged in the same direction in which the counter electrodes are formed, and the picture element electrodes and the counter electrodes are alternately arranged so that the picture element electrodes and the counter electrodes are disposed at substantially equal intervals.

According to the present invention, since the picture element electrodes and the counter electrodes are alternately arranged at equal intervals, the picture element electrode is located substantially halfway between the two counter electrodes. As a result, an field generated in the right half of a picture element area is substantially equal to that generated in the left half thereof. Thus, the dependence of viewing characteristics on the viewing angle and the non-uniformity of display are reduced in each picture element area. In the case where a plurality of picture element electrodes and corresponding counter electrodes are placed within one picture element area, a pitch between the picture element electrode and the counter electrode is reduced. Therefore, an LCD device is capable of performing display at a reduced driving voltage.

According to still another aspect of the invention, a liquid crystal display device includes a pair of insulation plates; and a liquid crystal layer interposed between the pair of insulation substrates. One of the pair of insulation plates having thereon: a plurality of switching devices arranged in a matrix; a first line and a second line connected to each of the plurality of switching devices; a plurality of interlayer insulation layers each having a top surface end slanting surfaces, the plurality of interlayer insulation layers each covering at least one of the first line or the second line; and a plurality of first electrode and a plurality of second electrode for applying an electric field to the liquid crystal layer, either one of the plurality of first electrodes or the plurality of second electrodes being connected to the plurality of switching devices. Each of the first and second electrodes covers the top surface and the slanting surfaces of the respective interlayer insulation layer to apply the electric field in a direction parallel to the insulation plates.

According to the present invention, due to the structure in which the picture element electrodes overlap the source lines with the interlayer insulation layer interposed therebetween, light can be transmitted without being blocked by electrodes or lines. Thus, the numerical aperture is improved, which enhances the contrast ratio and the brightness.

The interlayer insulation layer which has a sufficiently small relative dielectric constant and a sufficient thickness, insulates the gate lines/source lines/common lines and the counter electrodes/picture element electrodes. Accordingly, generation of a floating capacitance is restricted, and the driving capacitance for the liquid crystal molecules changes less. Thus, data signals having a waveform with less deformation can be sent to the liquid crystal layer, resulting in a higher contrast ratio.

Since the picture element electrodes and the counter electrodes are formed of the same material using the same mask, the distance between the picture element electrodes and the counter electrodes can be precisely as designed. Thus, the production cost is reduced and the yield is raised.

In the structure in which the counter electrodes are provided in the counter substrate, generation of a parasitic capacitance between the counter electrodes and the picture element electrodes is prevented. Thus, reduction In the display quality caused by the delay of data signals is prevented.

In the structure in which the counter electrodes are provided in the counter substrate and moreover, non-parallel with respect to the picture element electrodes, the intensity of electric field generated between the picture element electrodes and the counter electrodes can be changed in accordance with different positions in one picture element area. Thus, satisfactory display quality can be obtained in a wider range of viewing angles.

In the structure in which the counter electrode is connected to the common electrode, the connecting electrode connected to the TFT is eliminated. Thus, delay in data signals caused by the electrodes and lines can be alleviated, and also light transmittance can be improved.

In the case where the counter electrode is provided substantially in the middle of the picture element area between the two picture element electrodes, generation of a parasitic capacitance between the counter electrode and the picture element electrode is prevented. Thus, generation of an off-current is also prevented.

By providing a boundary region between two adjacent picture element electrodes on a first signal line (gate line) in adjacent picture element areas, a gap between the picture element electrodes, which does not contribute to display, is located on the first signal line. Therefore, it is not necessary to independently form a light-shielding region. As a result, an aperture ratio can be improved.

The counter electrodes are formed along second signal lines (source lines) so as to have a width larger than that of the second signal line and to completely cover the second signal line As a result, since the second signal line is located inside the counter electrode, an aperture area is prevented from being invaded by the width of the second signal line. Thus, an aperture area can be increased.

A picture element area is defined as being surrounded by two first signal lines and two second signal lines. Therefore, in the case where one picture element electrode is located in each picture element area, all the counter electrodes within a display screen are formed so as to be located over the second signal lines. In the case where a plurality of picture element electrodes are located in each picture element area, some counter electrodes are located over all the second signal lines and the other counter electrodes are located between the adjacent second signal lines, The counter electrode formed in a region between two second signal lines is located between the picture element electrodes.

By forming the counter electrode so as to completely cover the second signal line with an interlayer insulation film being interposed therebetween, an electric field generated by the second signal line is shielded by the counter electrode (shielding effect). In particular, the counter electrode is formed between the liquid crystal layer and the second signal line so as to be apart therefrom to a certain degree in a thickness direction, whereby the effect of the electric field generated by the second signal line on the liquid crystal layer can be more effectively shielded. As a result, the orientation of liquid crystal molecules is prevented from being disturbed so as to avoid the occurrence of crosstalk.

Furthermore, common electrodes are provided so as to cross the picture element electrodes, end are electrically connected to the counter electrode having the same potential as that of the picture element electrodes. As a result, a region between the picture element electrode and the common electrode serves as a storage capacitor.

In the case where a color filter is formed by using an interlayer insulation film and is provided on the active-matrix substrate, an aperture ratio can be prevented from being lowered due to insufficient accuracy of the attachment between the active-matrix substrate and the counter substrate.

In the case where the counter electrodes are formed on the counter substrate with the liquid crystal layer interposed therebetween, a parasitic capacitance can be reduced. In addition, in the case where a color filter is formed on the counter substrate, the counter electrodes also serve as a black matrix.

In the structure where the first and the second electrodes for applying an electric field to the liquid crystal molecules are provided to cover the top surfaces and the slanting surfaces of the interlayer insulation layers, the electric field can be applied in a direction substantially parallel to the surfaces of the insulation plates. Either one of the first electrodes or the second electrodes are provided to cover the source lines completely. Thus, the numerical aperture of the liquid crystal display device is raised, and also generation of noise between the first lines and the second lines which has adverse affect on the display quality is prevented. For these reasons, satisfactory display quality satisfactory display quality is obtained in a wider range of viewing angles.

In the structure where the conductive layers are not provided on one of the insulation plates, the first and second electrodes on the other insulation plate can be used as spacers for maintaining the space between the two plates by setting the thicknesses of the electrodes appropriately.

Thus, the invention described herein makes possible the advantages of (1) providing a liquid crystal display device capable of realizing display with high brightness and reduced power consumption by increasing an aperture of a display area; (2) providing a liquid crystal display device capable of realizing display with high quality by arranging picture element electrodes and counter electrodes at substantially equal intervals so as to reduce non-uniformity of display and the dependence of viewing characteristics on a viewing angle; (3) providing a liquid crystal display device realizing display with reduced crosstalk and high quality by restraining the adverse effect of a source line on a picture element electrode; and (4) providing a liquid crystal display device having a sufficiently high numerical aperture and that restricts generation of noise between various electrodes and lines sufficiently to apply an electric field to the liquid crystal layer in a direction substantially parallel to the surfaces of the active-matrix substrate and the counter substrate.

These and other advantages of the present invention will become apparent to those skilled in the art upon reading and understanding the following detailed description with reference to the accompanying figures.

BRIEF DESCRIPTION OF THE DRAWINGS

FIG. 4A is a partial plan view of an active-matrix substrate of an LCD device in Example 3 according to the present invention;

FIG. 4B is a partial plan view of a counter electrode of the LCD device in Example 3;

FIG. 7A is a partial plan view of an active-matrix substrate of an LCD device in Example 4 according to the present invention;

FIG. 7B is a partial plan view of a counter electrode of the LCD device in Example 4;

FIG. 14A is a plan view of the LCD device of Example 8 in the state where no voltage is applied to a liquid crystal layer;

FIG. 14B is a plan view of the LCD device of Example 8 in the state where a voltage is applied to a liquid crystal layer;

DESCRIPTION OF THE PREFERRED EMBODIMENTS

Hereinafter, the present invention will be described by way of illustrative, but non-limiting examples with reference to the accompanying drawings.

EXAMPLE 1

With reference to FIGS. 1A, 1B, 2 and 3, an LCD device 1100 in Example 1 according to the present invention will be described.

Figure 1A:
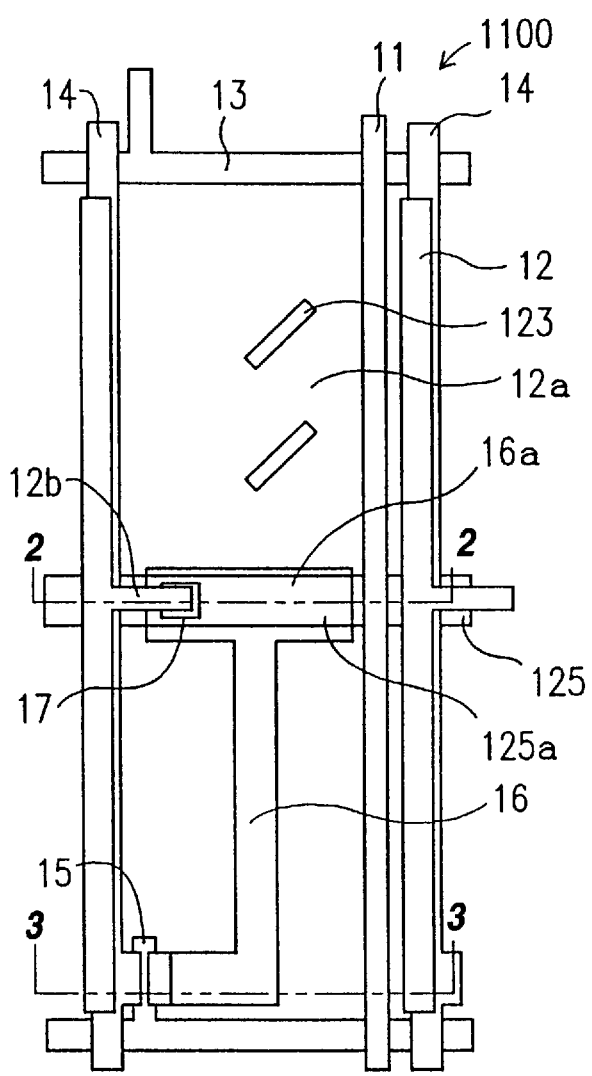
FIG. 1A is a partial plan view of an active-matrix substrate of an LCD device in Example 1 according to the present invention, illustrating the state where no voltage is applied.
Figure 1B:
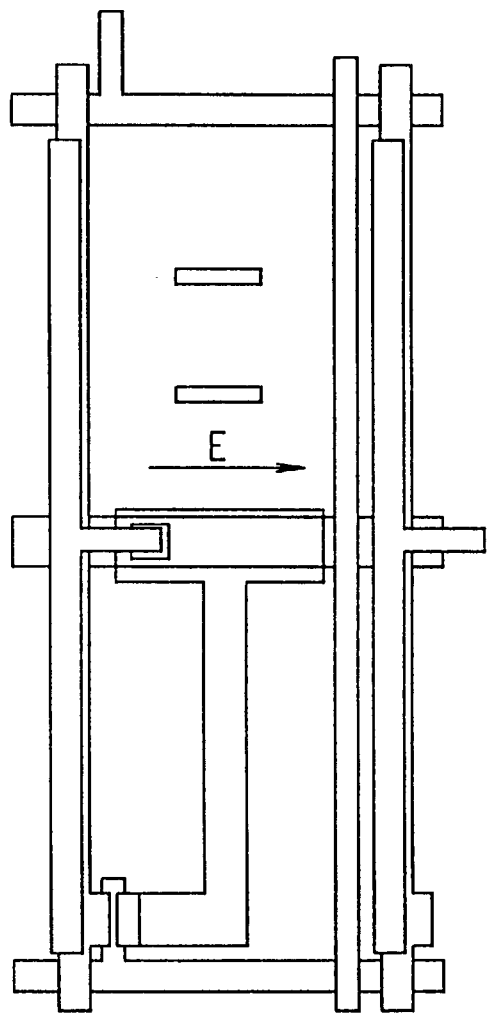
FIG. 1B is a partial plan view of the active-matrix substrate shown in FIG. 1A, illustrating the state where a voltage is applied.
Figure 2:
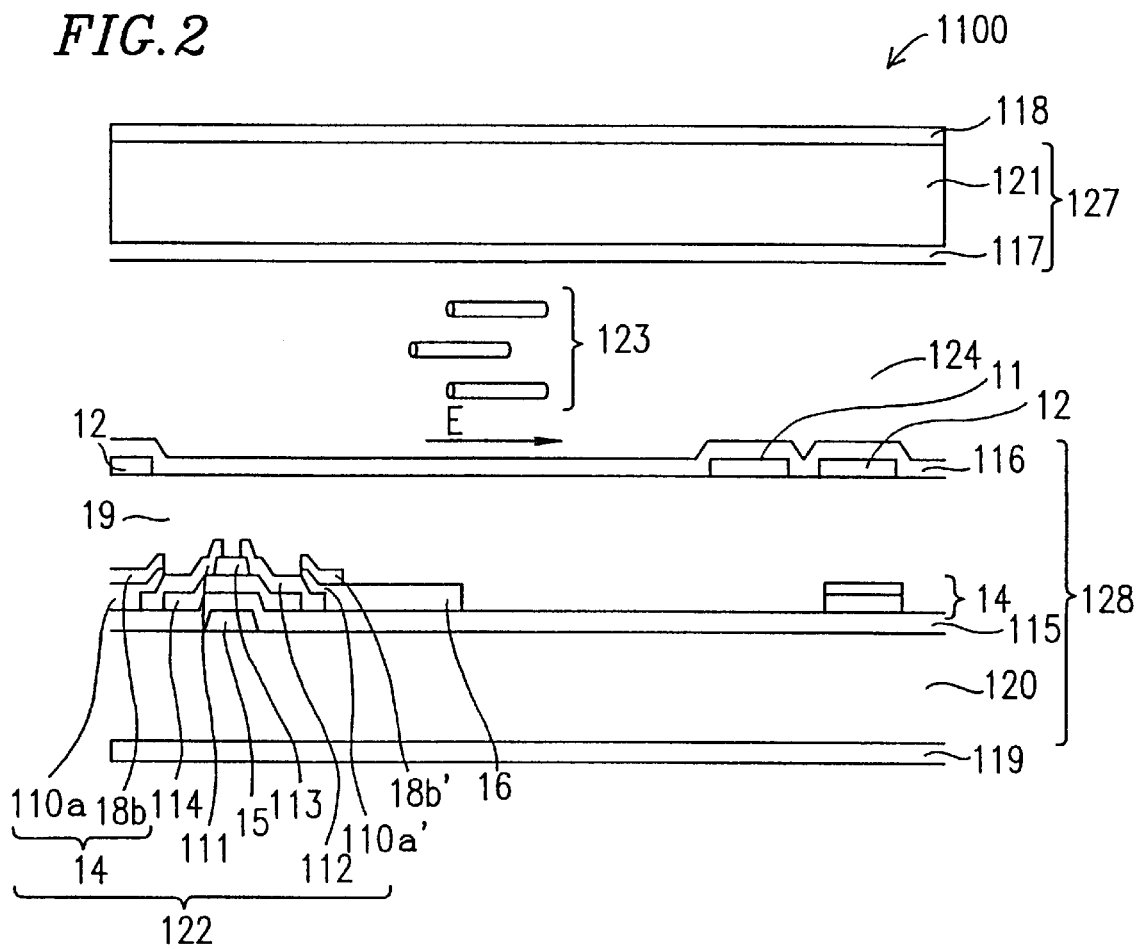
FIG. 2 is a cross sectional view of the LCD device shown in FIG. 1A along line A–A' in FIG. 1A.
Figure 3:
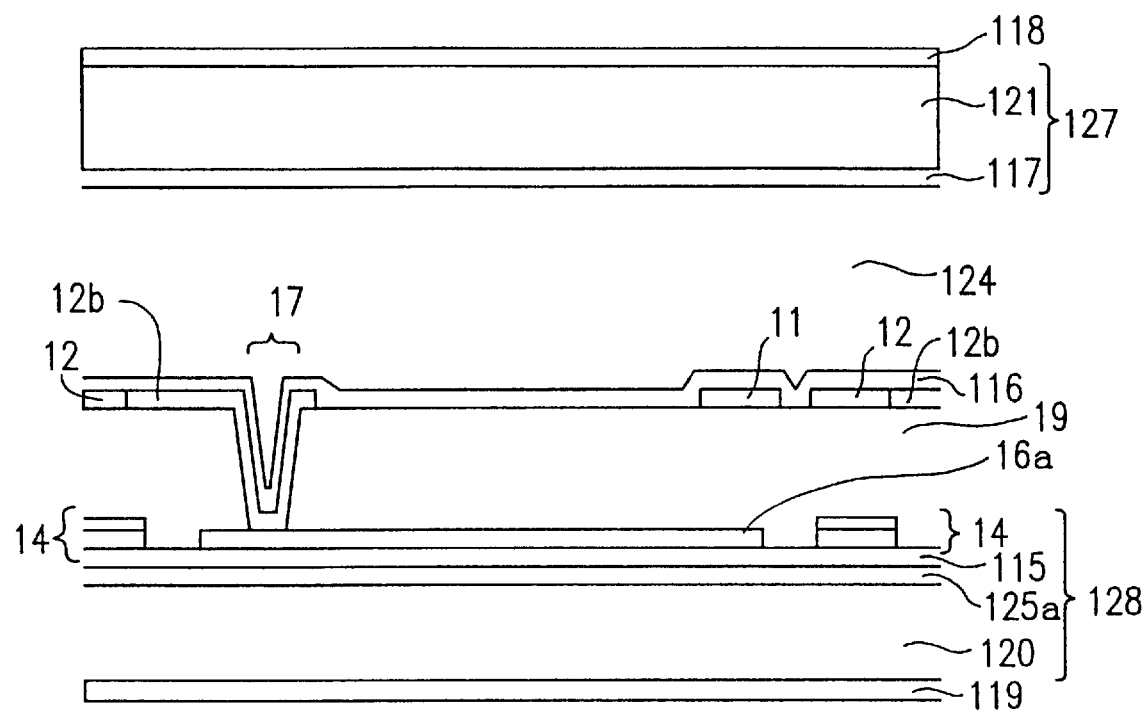
FIG. 3 is a cross sectional view of the LCD device shown in FIG. 1A along line 3—3.

FIGS. 1A and 1B are partial plan views of an LCD device 1100. Specifically, FIGS. 1A and 1B illustrate a part of the active-matrix substrate 128. FIG. 1A illustrates the state where no electric field is applied, and FIG. 1B illustrates the state where an electric field is applied. FIG. 2 is a cross sectional view of the LCD device 1100 taken along line 3—3 in FIG. 1A, and FIG. 3 is a cross sectional view of the LCD device 1100 taken along line 2—2 in FIG. 1A.

As shown in FIG. 1A, the active-matrix substrate 128 includes a plurality of gate lines 13 acting as scanning lines and a plurality of source lines 14 acting as data lines. The plurality of gate lines 13 are arranged in stripes parallel to each other, and the plurality of source lines 14 are arranged in stripes parallel to each other end substantially perpendicularly to the plurality of gate lines 13. Each picture element area 12a is defined by two adjacent gate lines 13 and two adjacent source lines 14. Thus, a plurality of picture element areas 12a are defined in a matrix by the gate lines 13 and the source lines 14. In this specification, the "picture element area" refers to a rectangular area which forms a pixel, FIGS. 1A and 1B show a part of the active-matrix substrate 128 corresponding to one picture element area 12a. At each of intersections of the gate lines 13 and the source lines 14, a TFT 122 acting as a switching device is provided.

Still referring to FIG. 1A, a plurality of picture element electrodes 12 are provided above the plurality of source lines 14. A plurality of counter electrodes 11 (only one is shown) are provided parallel to the picture element electrodes 12 (source lines 14) and perpendicular to the gate lines 13. Each counter electrode 11 is provided closer to one of the two adjacent picture element electrodes 12 having the picture element area 12a therebetween than to the other picture element electrode 12. The counter electrode 11 and the picture element electrode 12 which is farther from the counter electrode 11 are meted for operation.

For simplicity, the following description of the structure of the active-matrix substrate 128 will be performed regarding one picture element area 12a.

Referring to FIGS. 1A, 2 and 3, the TFT 122 includes a gate electrode 15, a source electrode 111, and a drain electrode 112. The gate electrode 15 is branched from the gate line 13. The TFT 122 is driven by a signal which is input to the gate electrode 15. The source electrode 111 is connected to the source line 14. A data signal is input to the source electrode 111. The drain electrode 112 is connected to the picture element electrode 12 through a connecting electrode 16 and a contact hole 17 (FIG. 3). As shown in FIG. 1A, the connecting electrode 16 is extended in a central part of the picture element area 12a substantially parallel to the source line 14 and the picture element electrode 12 and overlaps a common line 125, which is provided substantially parallel to the gate line 13. The connecting electrode 16 and a common line 125 form a storage capacitor in the state of interposing a gate insulation layer 115 (FIGS. 2 and 3) therebetween. A part of the connecting electrode 16 overlapping the common line 125 acts as an upper electrode 16a of the storage capacitor, and a part of the common line 125 overlapping the connecting electrode 16 acts as a lower electrode 125a of the storage capacitor. The common line 125 is provided substantially in the middle of the picture element area 12a.

As shown in FIGS. 2 and 3, the LCD device 1100 also includes a counter substrate 127. The counter substrate 127 includes an upper plate 121, an alignment layer 117 provided on a surface of the counter substrate 127.

With reference to FIGS. 2 and 3, the structure of the active-matrix substrate 128 will be described in more detail.

As shown in FIG. 2, the active-matrix substrate 128 includes a lower plate 120. The gate line 13 (FIG. 1) and the gate electrode 15 branched therefrom is provided on the lower plate 120. The common line 125 is also provided on the lower plate 120 (FIG. 3). The gate insulation layer 115 is provided covering the gate line 13, the gate electrode 15, and the common line 125. A semiconductor layer 114 is provided on the gate insulation layer 115 over the gate electrode 15, and a channel protection layer 113 is provided on a central part of the semiconductor layer 114. The source electrode 111 and the drain electrode 112 are provided on the gate insulation layer 115 so as to cover the semiconductor layer 114 and the channel protection layer 113. The source electrode 111 and the drain electrode 112 are provided so as to have a gap therebetween on the channel protection layer 113, The source electrode 111 and the drain electrode 112 are formed of $n^+$-a-Si (amorphous silicon). The gate line 13 and the common line 125 may be formed of any conductive material, e.g., ITO, Ti, Cr, Mo, Ta, Al, $SnO_2$, or any conductive resin. The gate line 13 and the common line 125 may each have a single layer or a plurality of layers. In the case where the gate line 13 and the common line 125 each have a plurality of layers, e.g., a Ta/Al, Ta/TaN, or $Ta_2O_5$/Ta/Al structure can be used. In this specification, when a layer is described as having the Ta/Al structure, the layer includes an Al film on the lower plate and a Ta film formed on the Al film. Similar descriptions will be used to indicate the structure of a layer having a plurality of films.

On an end part of the source electrode 111, the source line 14 is provided. The source line 14 includes a transparent conductive layer 110a and a metal layer 18b. On an end part of the drain electrode 112, a transparent conductive layer 110a' and a metal layer 18b' are provided. The transparent conductive layer 110a' is extended to act as the connecting electrode 16 for connecting the drain electrode 112 and the picture element electrode 12. As described above, the part of the connecting electrode 16 overlapping the common line 125 acts as the upper electrode 16a of the storage capacitor.

The active-matrix substrate 12B further includes an interlayer insulation layer 19 which covers the TFT 122, the gate line 13, the source line 14, and the connecting electrode 16.

The metal layer 18b' and the drain electrode 112 are out of contact with each other in FIG. 2, but may be in direct contact with each other. The metal layers 18b and 18b' are formed simultaneously, and may be formed of any conductive material, e.g., ITO, Ti, Cr, Mo, Ta, Al. $SnO_2$, or any conductive resin. The metal layers 18b and 18b' may each have, for example, a Te/TaN, Ta/ITO, or Ta/TaN/ITO structure.

As shown in FIGS. 2 and 3, the picture element electrode 12 for forming a picture element is provided on the interlayer insulation layer 19 directly above the source line 14. The picture element electrode 12 is connected to the drain electrode 112 through a connecting section 12b of the picture element electrode 12 which is extended to the bottom of the contact hole 17 and the connecting electrode 16. The connecting electrode 16 and the transparent conductive layers 110a and 110a' are formed of ITO or $SnO_2$.

Also on the interlayer insulation layer 19, the counter electrode 11 is provided closer to one of the two picture element electrodes 12 having a picture element area 12a therebetween than the other picture element electrode 12. The counter electrode 11 is not directly above the source line 14. The counter electrode 11 and the picture element electrode 12 are formed in the same production step, and may be formed of any conductive material, e.g., ITO, Ti, Cr, Mo, Ta, Al, $SnO_2$, or any conductive resin. The counter electrode 11 and the picture element electrode 12 may each have, for example, a Ta/TaN structure.

The interlayer insulation layer 19 may be formed of any insulating material which has a sufficiently low relative dielectric constant and transparency and is usable for forming a thick film. The interlayer insulation layer 19 is formed of a photosensitive acrylic resin in Example 1, but may be formed of any other photosensitive resin. Alternatively, a thermosetting resin such as a polyimide resin or an epoxy resin may be used. A photosensitive resin is advantageous in increasing the productivity, and an acrylic resin, which is transparent, is especially advantageous in having a sufficiently low relative dielectric constant.

The active-matrix substrate 128 further includes an alignment layer 116 provided on the interlayer insulation layer 19 and covers the picture element electrodes 12 and the counter electrode 11.

The LCD device 1100 having the above-described structure is produced by, for example, in the following manner.

First, a production method of the active-matrix substrate 128 will be described.

Referring to FIG. 2, the lower substrate 120 is formed of transparent glass or the like and thus is insulative. On the lower substrate 120, the gate line 13 and the gate electrode 15 branched from the gate line 13, the common electrode 125, the gate insulation layer 115, the semiconductor layer 114, the channel protection layer 113, the source electrode 111, the drain electrode 112, and the connecting electrode 16 are formed by any known appropriate method. The semiconductor layer 114, the source electrode 111 and the drain electrode 112 may be formed of a-Si, p-Si (polycrystalline silicon), a microcrystalline silicon or a conductive polymer material. The semiconductor layer 114 is formed of intrinsic semiconductor material, and the source electrode 111 and the drain electrode 112 are formed of an n+semiconductor material. The channel protection layer 113 and the gate insulation layer 115 are formed of, for example, silicon nitride ($Si_xN_y$), $SiO_z$, or an insulative resin.

Next, a transparent conductive layer and a metal layer are deposited sequentially by sputtering and patterned as prescribed to form the transparent conductive layers 110a and 110a', and the metal layers 18b and 18b'. The transparent conductive layer 110a and the metal layer 18b form the source line 14. As described above, the transparent conductive layer 110a' acts as the connecting electrode 16.

Then, a photosensitive acrylic resin is deposited by spin-coating to a thickness of about 5 $\mu$m to form the interlayer insulation layer 19, which covers the above-mentioned elements.

The interlayer insulation layer 19 is exposed to light in accordance with a prescribed pattern and developed by an alkaline solution. Thus, only the exposed portion of the interlayer insulation layer 19 is etched away to form the contact hole 17 (FIG. 3), which runs through the interlayer insulation layer 19 to reach the upper electrode 16a of the storage capacitor.

Then, a metal layer is formed on the interlayer insulation layer 19 by sputtering and etched to form the picture element electrode 12 and the counter electrode 11 each having a prescribed pattern. Each picture element electrode 12 which is a part of the corresponding picture element area 12a, is connected to the connecting electrode 16 at the bottom of the contact hole 17. The picture element electrode 12 and the counter electrode 11 are formed of an identical material in the same production step. The picture element electrode 12 and the counter electrode 11 are formed of Ta, which is conductive and does not allow light to transmit therethrough, in Example 1, but may alternatively be formed of Ti, Al, Cr, Mo, or any transparent (i.e., light-transmissive) conductive material such as ITO. In lieu of wet etching described above, dry etching can be used.

Then, the alignment layer 116 of polyimide is formed on the interlayer insulation layer 19 so as to cover the picture element electrode 12 and the counter electrode 11. The top surface of the alignment layer 116 is rubbed.

The counter substrate 127 is formed by any appropriate conventional method using known appropriate materials. The surface of the alignment layer 117 is rubbed.

The active-matrix substrate 128 and the counter substrate 127 are assembled in the state where the alignment layers 117 and 116 face each other. To the space therebetween, a liquid crystal material containing elongated liquid crystal molecules 123 is injected, thereby forming a liquid crystal layer 124. Then, polarizing plates 119 and 118 are located on outer surfaces of the active-matrix substrate 128 and the counter substrate 127, respectively.

The liquid crystal molecules 123 are aligned so that, when no voltage is applied thereto (FIG. 1A), the angle made of the principal axis of the liquid crystal molecules 123 and the picture element electrode 12 is from 45° or more but less than 90°. The principal axis of the liquid crystal molecules 123 in the vicinity of the active-matrix substrate 128 and the principal axis of the liquid crystal molecules 123 in the vicinity of the counter substrate 127 are parallel to each other. The liquid crystal molecules 123 have a positive dielectric anisotropy.

When a voltage is applied to the gate electrode 15 of the TFT 122 to turn "ON" the TFT 122, the picture element electrode 12 is supplied with a voltage. Thus, an electric field E is generated between the counter electrode 11 and one of the two picture element electrodes 12 which is farther from the counter electrode 11 as shown in FIG. 1B. The electric field is horizontal, namely, parallel to the gate lines 13 and perpendicular to the picture element electrodes 12. The liquid crystal molecules 123 changes the orientation thereof to the state where the principal axis of the liquid crystal molecules 123 is parallel to the direction of the electric field E as shown in FIG. 1B. By locating the polarizing plates 118 and 119 so that the polarizing directions thereof make a prescribed angle (for example, in a crossed nicols state in which the polarizing directions are perpendicular to each other), the light transmittance of the LCD device 1100 can be adjusted. Accordingly, the LCD device 1100 displays images having a sufficiently high contrast ratio without the need for the transparent electrode which is conventionally required in the counter substrate. Since all the steps required for producing the transparent electrode can be eliminated, the production cost of the LCD device is significantly reduced.

In the conventional LCD device in which the transparent electrode is provided in the counter substrate, the dark state is realized by nullifying the phase contrast caused by birefringence of the liquid crystal material. The phase contrast caused by birefringence is nullified by rotating, by voltage application, the liquid crystal molecules from the state of being parallel to the surfaces of the two substrates interposing the liquid crystal layer to the state of having an angle with respect to the surfaces of the two substrates. However, the phase contrast caused by birefringence can actually be nullified only when the image is seen at a viewing angle normal to the surfaces of the substrates. When the image is seen from a direction having even a slight angle with respect to the normal direction, the phase contrast is caused by birefringence. Thus, in the case of normally-white display, light leaks to cause reduction in the contrast ratio and also inversion of the gray scale levels. In contrast, in the LCD device 1100 in Example 1 according to the present invention, the principal axis of the liquid crystal molecules 123 is substantially parallel to the surfaces of the two substrates 128 and 127, and the voltage application does not rotate the liquid crystal molecules 123 in the direction perpendicular to the surfaces of the two substrates 128 and 127. Accordingly, the difference in brightness caused in accordance with the viewing angle is relatively small, significantly improving the viewing characteristic.

In the active-matrix substrate 128, the picture element electrode 12 and the counter electrode 11 can overlap the gate line 13, the source lines 14 and the TFT 122, due to the interlayer insulation layer 19 provided therebetween. Also due to the interlayer insulation layer 19, the picture element electrode 12 and the counter electrode 11 can be formed on a smooth surface.

In the LCD device 1100, the picture element electrode 12 is provided directly above the source line 14 connected to the TFT 122 with the interlayer insulation layer 19 interposed therebetween and the counter electrode 11 is provided offset from the source line 14 best shown in FIG. 2. Due to such a structure, an area where the backlight is transmitted can be enlarged.

The transmission-type LCD device 1100 including the active-matrix substrate 128 having such a structure has a higher numerical aperture. Moreover, the electric field generated by the gate line 13 and the source line 14 is shielded by the picture element electrode 12 and the counter electrode 11, thus restricting the defective orientation of the liquid crystal molecules 123 caused by the electric field. The defective orientation of the liquid crystal molecules 123 which is caused by the stepped portions formed by the gate line 13, the source line 14 and the TFT 122 is also restricted.

The acrylic resin used for the interlayer insulation layer 19 has a relative dielectric constant of 1.5 to 3.5, which is lower than that of an inorganic material (relative dielectric constant of silicon nitride: 8), and is relatively easily formed into a thick film having a thickness of 1.0 to 10.0 $\mu$m by spin-coating. Accordingly, the capacitance between the gate line 13 and the picture element electrode 12 can be reduced. Thus, the signal waveform is prevented from being distorted. For the same reason, the capacitance between the gate line 13/source line 14 and the picture element electrode 12/counter electrode 11 can be reduced, thereby preventing the signal waveform from being distorted. Thus, crosstalk caused between the gate line 13/source line 14 and the picture element electrode 12/counter electrode 11 is reduced, improving the clarity and brightness of the images.

Also in Example 1, the contact hole 17 is formed by patterning the interlayer insulation layer 19 by exposure to light and use of an alkaline solution. Such a forming method improves the tapered shape of the contact hole 17, thus enhancing the connection state between the picture element electrode 12 and the connecting electrode 16. The above-mentioned patterning method, which does not need photoresist, is advantageous in improving the productivity. The acrylic resin used for the interlayer insulation layer 19 is colored before being coated, but is made transparent when being exposed to light after being patterned. The acrylic or any other type of resin usable for the interlayer insulation layer 19 can be made transparent by chemical as well as optical means. The acrylic resin can have a relatively high transparency in this manner and therefore preferable.

EXAMPLE 2

Example 2 according to the present invention relates to a modification of the LCD device 1100 in Example 1. In Example 2, the counter electrode 11 is provided directly above the source line 14 with the interlayer insulation layer 19 interposed therebetween.

Conventionally, it is considered that provision of the counter electrode 11 and the picture element electrode 12 on the interlayer insulation layer 19 prevents satisfactory display characteristics because the floating capacitance is increased. However, the interlayer insulation layer 19 formed in the above-described manner has a sufficiently low dielectric constant and can have a sufficient thickness. Accordingly, even if the counter electrode 11 is provided directly above the source line 14 with the interlayer insulation layer 19 interposed therebetween, the floating capacitance can be restricted to be sufficiently small. Due to the effect brought by the provision of the counter electrode 11 directly above the source line 14, the numerical aperture and the contrast ratio of the LCD device are improved.

For the same reason, in the structure where the gate line 13 is provided parallel to the picture element electrode 12 and the picture element electrode 12 is provided directly above the gate line 13 with the interlayer insulation layer 19 interposed therebetween, the floating capacitance can be restricted to be sufficiently small. Due to the effect brought by the provision of the picture element electrode 12 directly above the gate line 13, the numerical aperture and the contrast ratio of the LCD device are improved.

In Example 2, as well as in Example 1, the electric field is generated horizontally with respect to the two substrates. Furthermore, the picture element electrodes 12 and the counter electrodes 11 are provided on the smooth surface of the interlayer insulation layer 19. For these reasons, reverse tilt is not generated. Thus, a black mask is not necessary. However, in the structure where the distance between the counter electrode 11 and one of the two picture element electrodes 12 having each picture element area 12a therebetween, is different from the distance between the counter electrode 11 and the other two picture element electrode 12 as in Examples 1 and 2, defective orientation may possibly occur due to different response rates in the two areas of the picture element area 12a defined by the counter electrode 11. In order to avoid such potential defective orientation, a black mask can be provided between the counter electrode 11 and one of the two picture element electrodes 12 which is closer to the counter electrode

EXAMPLE 3

With reference to FIGS. 4A, 4B, 5 and 6, an LCD device 1110 in Example 3 according to the present invention will be described. Identical elements previously discussed with respect to FIGS. 1A, 1B, 2 and 3 will bear identical reference numerals therewith and the descriptions thereof will be omitted.

Figure 5:
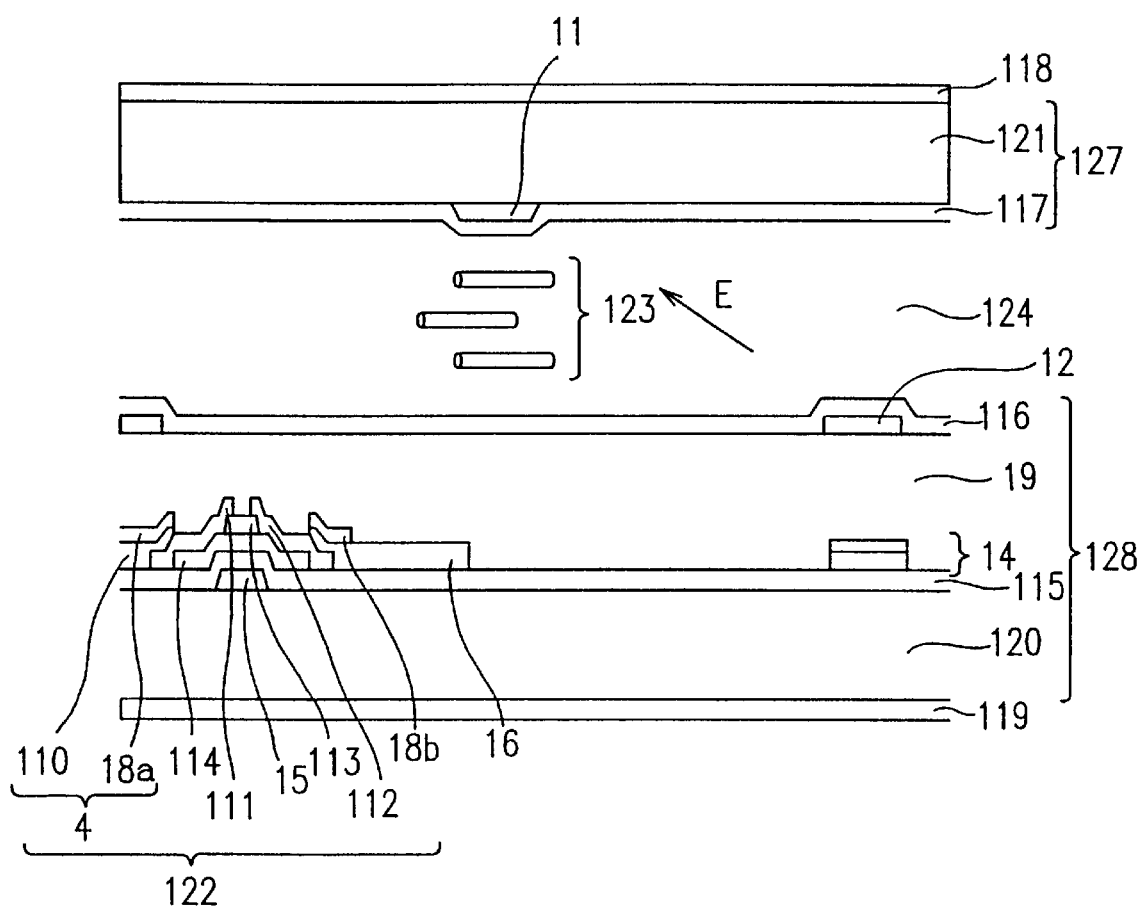
FIG. 5 is a cross sectional view of the LCD device shown in FIG. 4A along line 5—5 in FIG. 4A.
Figure 6:
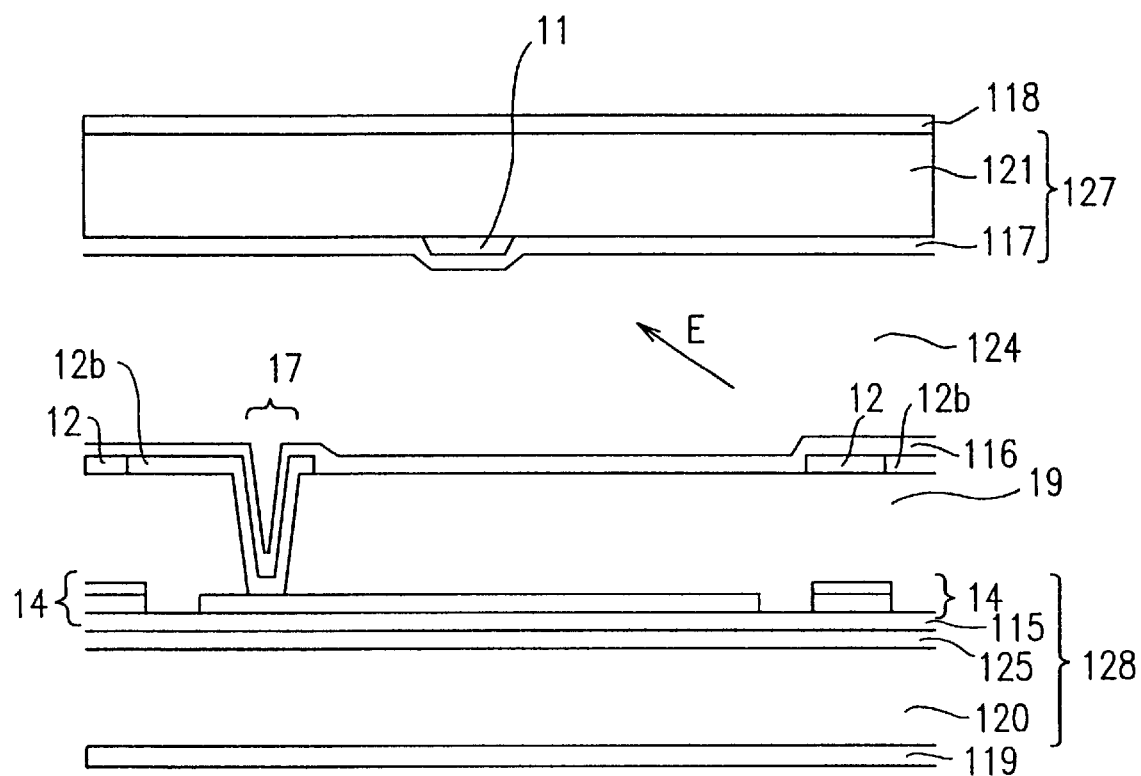
FIG. 6 is a cross sectional view of the LCD device shown in FIG. 4A along line 6—6 in FIG. 4A.

FIG. 4A is a partial plan views of an active-matrix substrate 128 of the LCD device 1110. FIG. 4B is a partial plan view of a counter substrate 127 of the LCD device 1100. FIG. 5 is a cross sectional view of the LCD device 1110 taken along line 5—5 in FIG. 4A, and FIG. 6 is a cross sectional view of the LCD device 1110 taken along line 6—6 in FIG. 4A.

As shown in FIG. 4A, 4B, 5 and 6, the LCD device 1110 in Example 3 is different from the LCD device 1100 in Example 1 in that the counter electrode 11 is provided substantially in the middle of each picture element area 12a and moreover, in the counter substrate 127.

The LCD device 1110 having the above-described structure is produced by, for example, the following manner.

The elements are formed in the same manner as in Example 1 until the formation of the interlayer insulation layer 19 is completed.

Then, the plurality of picture element electrodes 12 are formed in stripes on the interlayer insulation layer 19. The alignment layer 116 of polyimide is formed on the interlayer insulation layer 19 so as to cover the picture element electrodes 12, and the top surface of the alignment layer 116 is rubbed.

The counter substrate 127 is formed in the following manner.

On the upper plate 121, a conductive layer is formed by sputtering and treated with photolithography and etching, thereby forming the plurality of counter electrodes 11 in Stripes. The counter electrodes 11 are formed of Ta in Example 3, but may alternatively be formed of Ti, Al, Cr, ITO or the like. The alignment layer 117 is formed on the upper plate 121 so as to cover the counter electrodes 11. The surface of the alignment layer 117 is rubbed.

The active-matrix substrate 128 and the counter substrate 127 are assembled in the state where the alignment layers 117 and 116 face each other. A liquid crystal material containing elongated liquid crystal molecules 123 is infected into the space therebetween, thereby forming the liquid crystal layer 124, Then, polarizing plates 119 and 118 are located on outer surfaces of the active-matrix substrate 128 and the counter substrate 127, respectively. The liquid crystal molecules 123 are aligned so that, when no voltage is applied thereto, the angle made of the principal axis of the liquid crystal molecules 123 and the picture element electrode 12 is from 45° or more but less than 90°. The principal axis of the liquid crystal molecules 123 in the vicinity of the active-matrix substrate 128 and the principal axis of the liquid crystal molecules 123 in the vicinity of the counter substrate 127 are parallel to each other. The liquid crystal molecules 123 have a positive dielectric anisotropy.

When a voltage is applied to the gate electrode 15 of the TFT 122 to turn "ON" the TFT 122, the picture element electrode 12 is supplied with a voltage. Thus, an electric field E is generated between the counter electrode 11 and the two picture element electrodes 12 as shown in FIG. 4A. The electric field is horizontal (i.e., parallel) to the gate lines 13 and perpendicular to the picture element electrodes 12. The liquid crystal molecules 123 changes the orientation thereof to the state where the principal axis of the liquid crystal molecules 123 is parallel to the direction of the electric field E as shown in FIG. 4A. In FIGS. 5 and 6 which show the LCD device 1110 with the dimension in the thickness direction (indicated by arrow T) being enlarged with respect to the dimensions in other directions, the electric field appears to be tilted as indicated by arrow E. Actually, however, the width of the picture element area 12a (distance along line 6—6 and line 5—5) is about 40 to 80 $\mu$m, and the thickness of the liquid crystal layer 124 is about 6 $\mu$m. The latter is less than the former by about one order. Accordingly, the component of the electric field in the thickness direction is negligible, and thus the electric field can be considered to be substantially parallel to the surfaces of the two substrates 128 and 127. By locating the polarizing plates 118 and 119 so that the polarizing directions thereof make a prescribed angle (for example, in a crossed nicols state in which the polarizing directions are perpendicular to each other), the light transmittance of the LCD device 1110 can be adjusted.

Due to the structure in which the counter electrode 11 is provided substantially in the middle of the picture element area la, the floating capacitance between the counter electrode 11 and the source line 14/gate line 13 can be less than in Examples 1 and 2. Thus, the signal waveform is restricted from being distorted. Moreover, the generation of an off-current caused by a parasitic capacitance can be prevented.

Unlike the LCD device 1100 in Examples 1 and 2, in which defective orientation may possibly occur due to different response rates in the two areas in the picture element area 12a caused by the different widths thereof, such a problem does not occur in the LCD device 1110 in Example 3 in which the two areas of the picture element area 12a defined by the counter electrode 11 have a substantially equal width. Accordingly, there is no need for providing a black mask.

EXAMPLE 4

With reference to FIGS. 7A, 7B, 8 and 9, an LCD device 1120 in Example 4 according to the present invention will be described. identical elements previously discussed with respect to FIGS. 4A, 4B, 5 and 6 will bear identical reference numerals therewith and the descriptions thereof will be omitted.

Figure 8:
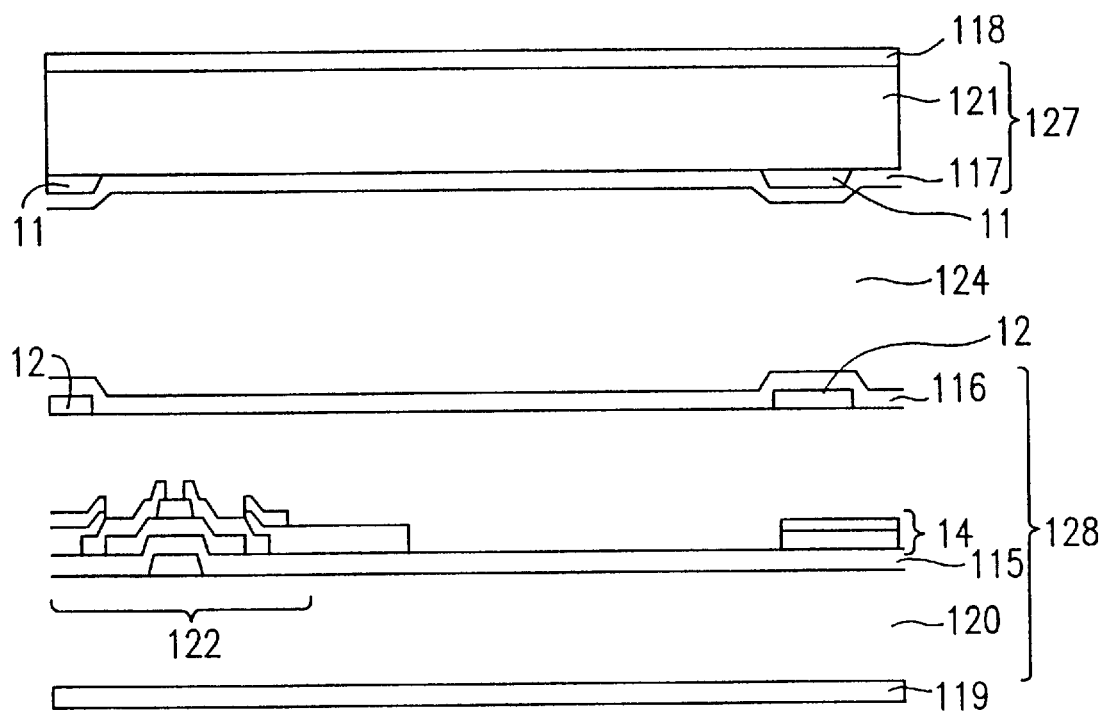
FIG. 8 is a cross sectional view of the LCD device shown in FIG. 7A along line 8—8 in FIG. 7A.

FIG. 7A is partial plan views of an active-matrix substrate 128 of the LCD device 1120. FIG. 7B is a partial plan view of a counter substrate 127 of the LCD 1120. FIG. 8 is a cross sectional view of the LCD device 1120 taken along line 8—8 in FIG. 7A, and FIG. 9 is a cross sectional view of the LCD device 1120 taken along line 9—9 in FIG. 7A.

As shown in FIG. 7A, 7B, 8 and 9, the LCD device 1120 in Example 4 is different from the LCD device 1110 in Example 3 in that the counter electrode 11 is provided so that a longitudinal direction thereof forms an angle with respect to a longitudinal direction of the picture element electrode 12 in each picture element area 12a. The counter electrode 11 is included in the counter substrate 127 as in Example 3.

Preferably, the counter electrode 11 is provided along the diagonal line of the picture element area 12a defined by the two adjacent gate lines 13 and two adjacent source lines 14.

Figure 9:
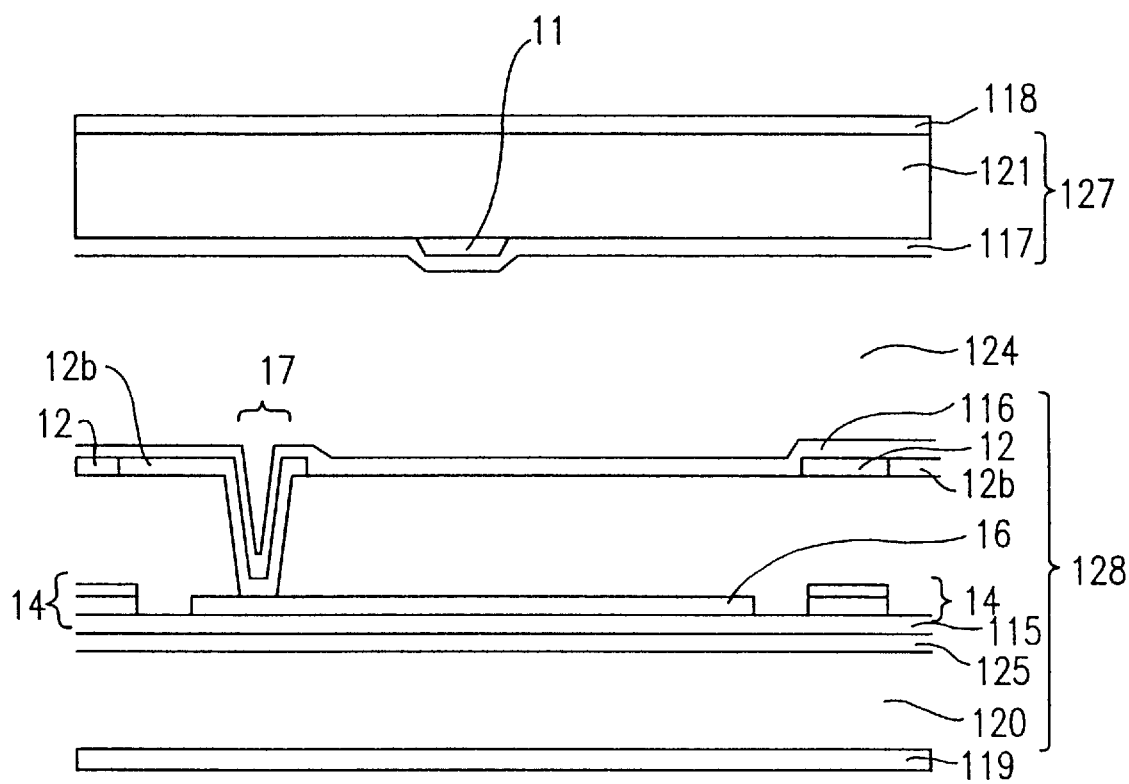
FIG. 9 is a cross sectional view of the LCD device shown in FIG. 7A along line 9—9 in FIG. 7A.

Assuming that the liquid crystal layer 124 includes a plurality of minute regions in each picture element area 12a, the intensity of the electric field between the picture element electrode 12 and the counter electrode 11 varies in accordance with the position of the minute region as shown in FIGS. 8 and 9. In different minute regions, the liquid crystal molecules rotate at different angles. Due to the difference in the rotation angle, the value of the phase contrast caused by birefringence differs. Thus, the tilting angle of the polarizing plane of the circularly polarized light which is propagated through the liquid crystal layer 124 differs in the different minute regions in each picture element area 12a. Accordingly, the light propagated through the different minute regions in the liquid crystal layer 124 in each picture element area 12a have different phase contracts, namely, titling angles. Due to such differences, the viewing angle characteristic is significantly improved.

The LCD device 1120 in Example 4 is formed in a similar manner as in the LCD device 1110 in Example 3 except for the position of the counter electrode 11.

EXAMPLE 5

Figure 10A:
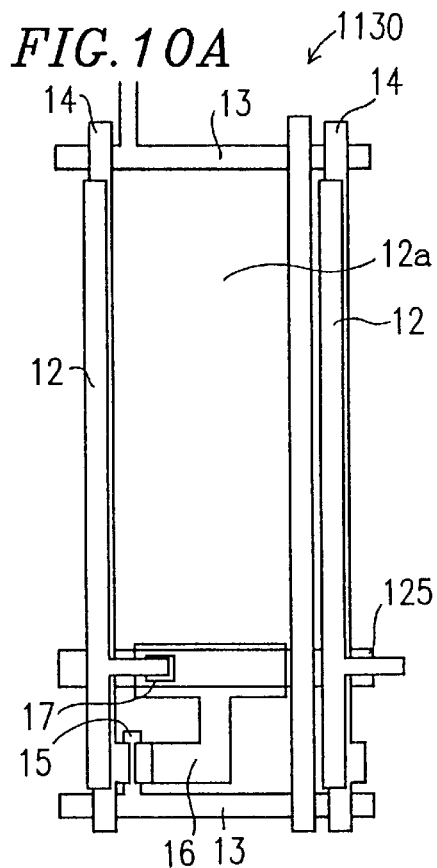
FIG. 10A is a partial plan view of an LCD device in Example 5 according to the present invention.

With reference to FIG. 10A, an LCD device 1130 in Example 5 according to the present invention will be described. Identical elements previously discussed with respect to FIGS. 1A, 1B, 2 and 3 will beer identical reference numerals therewith and the descriptions thereof will be omitted.

FIG. 10A is a plan view of a part of the LCD device 1130 corresponding to one picture element unit 12a. The LCD device 1130 in Example 5 is different from the LCD device 1100 in Example 1 in that the common line 125 is provided closer to one of the two gate lines 13 defining the picture element areas 12a, as opposed to being substantially in the middle of the picture element area 12a.

Due to such a structure, the orientation of the liquid crystal molecules is disturbed only in a peripheral area in the vicinity of the contact hole 17 formed above the common line 125, and not in the central part of the picture element area 12a. Accordingly, the display quality of the picture element area 12a as a whole is significantly improved. The display quality is further improved by providing a black mask for covering the peripheral area in which the orientation of the liquid crystal molecules is disturbed.

The LCD device 1130 in Example 5 is formed in a similar manner as in the LCD device 1100 in Example 1 except for the position of the common line 125 and the like.

EXAMPLE 6

Figure 10B:
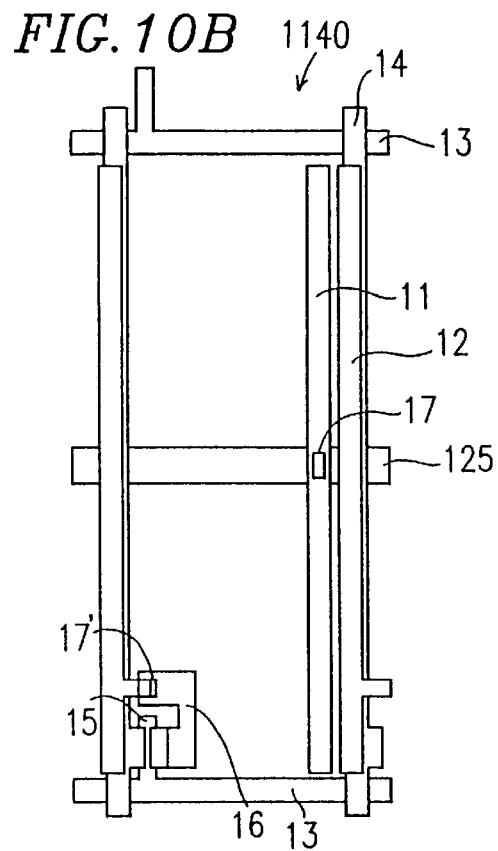
FIG. 10B is a partial plan view of an LCD device in Example 6 according to the present invention.

With reference to FIG. 10B, an LCD device 1140 in Example 6 according to the present invention will be described. Identical elements previously discussed with respect to FIGS. 1A, 1B, 2 and 3 will bear identical reference numerals therewith and the descriptions thereof will be omitted.

FIG. 10B is a plan view of a part of the LCD device 1140 corresponding to one picture element unit 12a. The LCD device 1140 in Example 6 is different from the LCD device 1100 in Example 1 in that the common line 125 is directly connected to the counter electrode 11 through the contact hole 17 running through the interlayer insulation layer 19 and that the picture element electrode 12 is directly connected to the TFT 122 through another contact hole 17', Due to such a structure, the connecting electrode 16 is not required to be extended in a central part of the picture element area 12a, as opposed to the structure in which the storage capacitance is formed on the side of the drain electrode 112 through the interlayer insulation layer 19. Thus, the light transmittance through the picture element area 12a is significantly enhanced, thereby improving the contrast ratio and luminance. Such a structure also solves the problem of delay of data signals caused by the resistance of the connecting electrode 16.

The LCD device 1140 in Example 6 is formed in a similar manner as in the LCD device 1100 in Example 1 except for the positions of the contact holes 17 and 17', and the like.

EXAMPLE 7

Figure 10C:
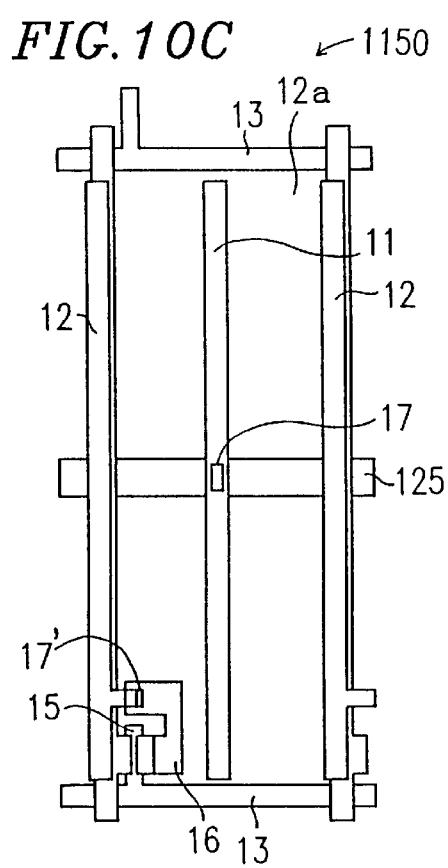
FIG. 10C is a partial plan view of an LCD device in Example 7 according to the present invention.

With reference to FIG. 10C, an LCD device 1150 in Example 7 according to the present invention will be described. Identical elements previously discussed with respect to FIG. 10B will bear identical reference numerals therewith and the descriptions thereof will be omitted.

FIG. 10C is a plan view of a part of the LCD device 1150 corresponding to one picture element unit 12a. The LCD device 1150 in Example 7 is different from the LCD device 1140 in Example 6 in that the counter electrode 11 is provided substantially in the middle of each picture element area 12a.

Due to such a structure, the generation of a parasitic capacitance between the picture element electrode 12 and the counter electrode 11 is prevented. Thus, the signal waveform is restricted from being distorted.

Figure 10D:
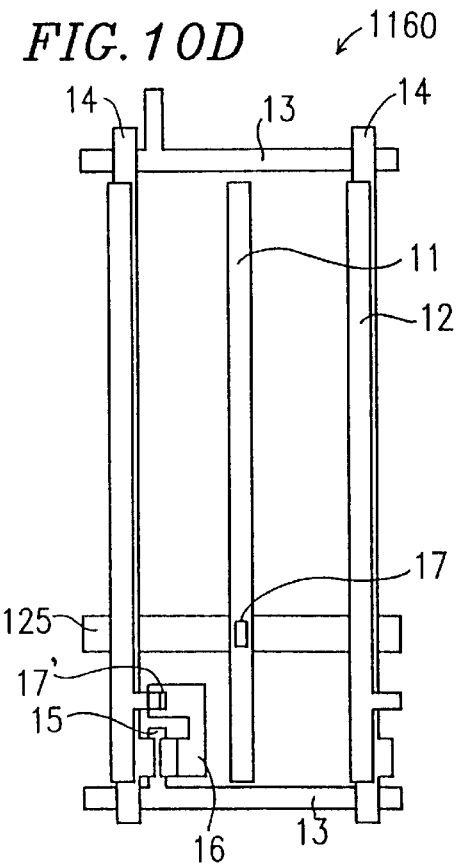
FIG. 10D is a partial plan view of an LCD device in a modification of Example 7 according to the present invention.

FIG. 10D is a plan view of a part of the LCD device 1160 corresponding to one picture element unit 12a. The LCD device 1160 is modified from the LCD device 1150 in Example 7. The counter electrode 11 is provided substantially in the middle of each picture element area 12a and the common line 125 is provided closer to one of the two gate lines 13 as in Example 5.

The LCD device 1150 and the LCD device 1160 in the seventh example are each formed in a similar manner as in the LCD device 1100 in Example 1 except for the positions of relevant elements.

In Examples 1 through 7, a signal for driving the liquid crystal molecules may be the same as that of a TN-mode LCD device. The level of the voltage to be applied can be appropriately selected in accordance with the liquid crystal material and the cell structure (e.g., the distance between the picture element electrode 12 and the counter electrode 11). The potential of the common line 125 may be maintained at a certain level. Although a storage capacitance is formed by the connecting electrode 16 and the common line 125 in the above-described examples, the common line 125 can be eliminated in the structure where the voltage can be held by the liquid crystal material. Alternatively, a storage capacitance may be formed by providing a gate insulation layer on the gate lines 13.

According to the present invention, the following effects, for example, are achieved.

1. Due to the structure in which the picture element electrodes 12 overlap the source lines 14 with the interlayer insulation layer 19 interposed therebetween, light can be transmitted without being prevented by electrodes or lines. Thus, the numerical aperture is improved, which enhances the contrast ratio and the brightness.

2. The interlayer insulation layer 19, which has a sufficiently small relative dielectric constant and a sufficient thickness, insulates the gate lines 13/source lines 14/common lines 125 and the counter electrodes 11/picture element electrodes 12. Accordingly, generation of a floating capacitance is restricted, and the driving capacitance for the liquid crystal molecules changes less. Thus, data signals having a waveform with less deformation can be sent to the liquid crystal layer 124, resulting in a higher contrast ratio.

3. Since the picture element electrodes 12 and the counter electrodes 11 are formed of the same material using the same mask, the distance between the picture element electrodes 12 and the counter electrodes 11 can be precisely as designed. Thus, the production cost is reduced and the yield is raised.

4. In the structure in which the counter electrodes 11 are provided in the counter substrate 127, generation of a parasitic capacitance between the counter electrodes 11 and the picture element electrodes is prevented. Thus, reduction in the display quality caused by the delay of data signals is prevented.

5. In the structure in which the counter electrodes 11 are provided in the counter substrate 127 and moreover, with an angle with respect to the picture element electrodes 12, the intensity of electric field generated between the picture element electrodes 12 and the counter electrodes 11 can be changed in accordance with different positions in one picture element area 12a. Thus, satisfactory display quality can be obtained in a wider range of viewing angles.

6. In the structure in which the counter electrode 11 is connected to the common electrode 125, the connecting electrode 16 connected to the TFT 122 is eliminated. Thus, delay in data signals caused by the electrodes and lines can be alleviated, and also light transmittance can be improved.

7. In the case where the counter electrode 11 is provided substantially in the middle of the picture element area 12a between the two picture element electrodes 12, generation of a parasitic capacitance between the counter electrode 11 and the picture element electrode 12 is prevented. Thus, generation of an off-current is also prevented.

EXAMPLE 8

Figure 11:
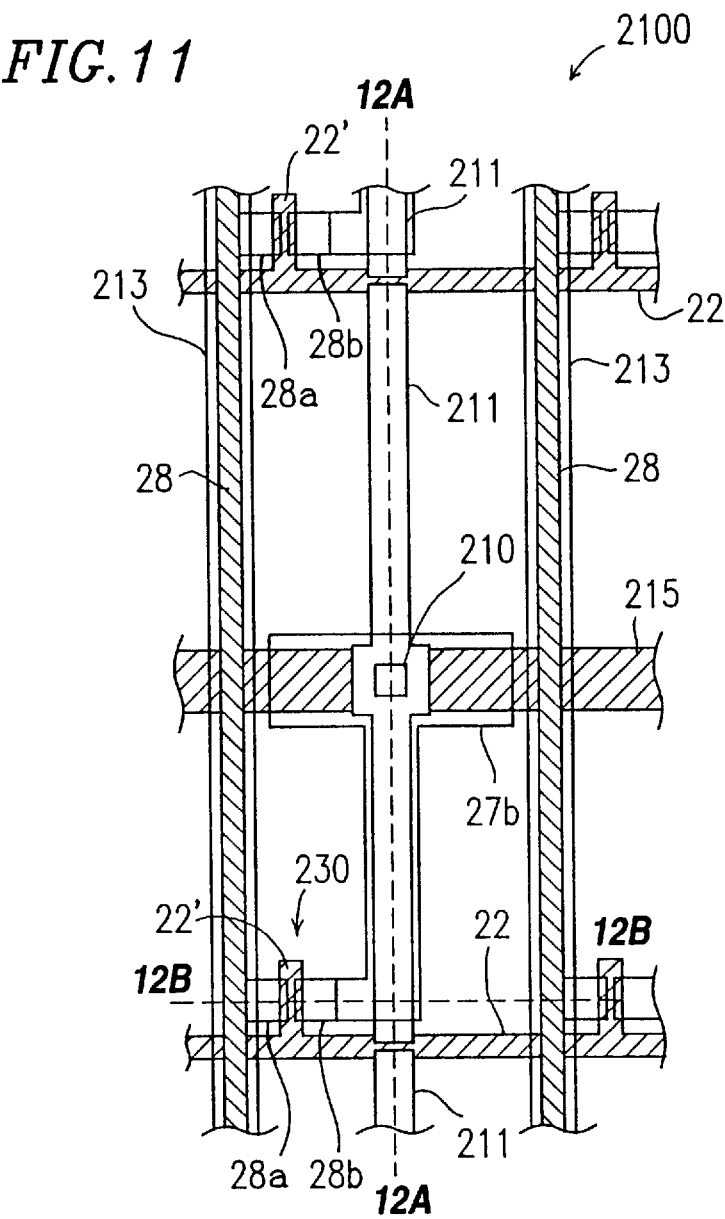
FIG. 11 is a plan view showing the configuration of an LCD device in Example 8 according to the present invention.
Figure 12A:
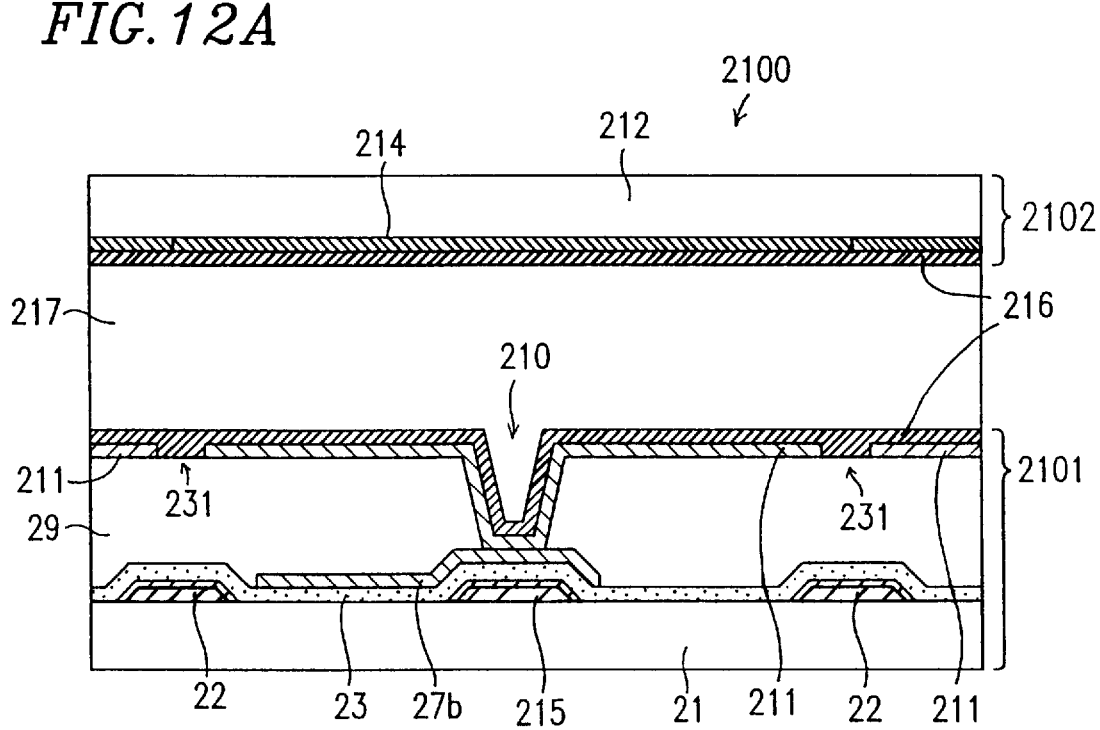
FIG. 12A is a cross-sectional view of the LCD device taken along a line 12A—12A in FIG. 11.
Figure 12B:
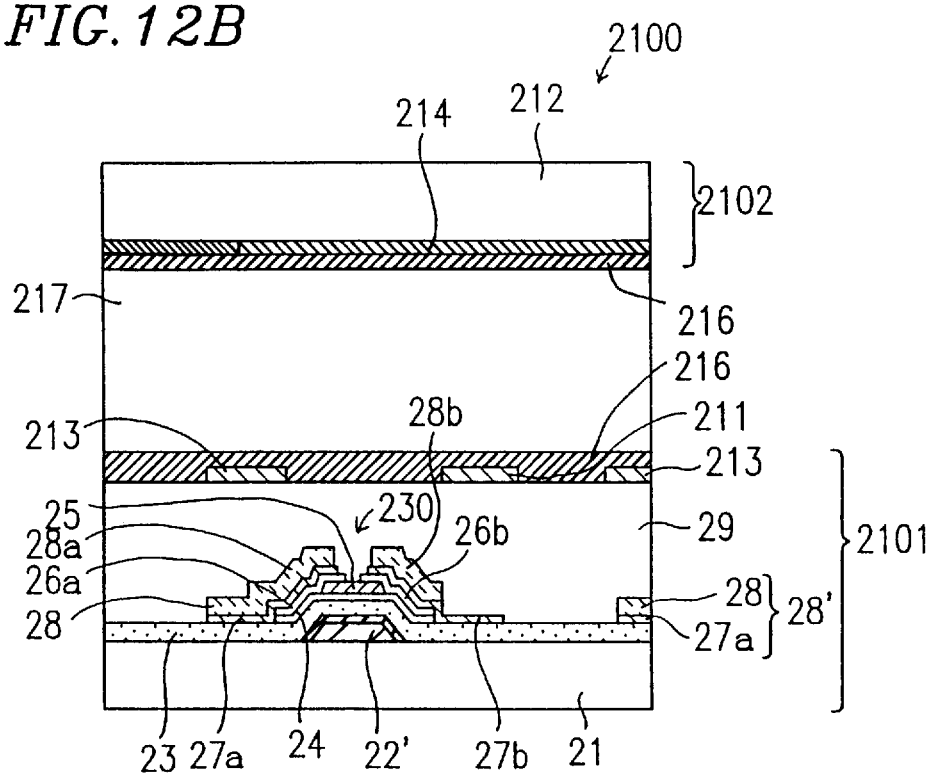
FIG. 12B is a cross-sectional view of the LCD device taken along a line 12B—12B in FIG. 11.

FIG. 11 Is a cross-sectional view showing an LCD device 2100 of Example 8 according to the present invention. FIG. 12 is a cross-sectional view of the LCD device 2100 taken along a line 12A—12 shown in FIG. 11, and FIG. 12B is a cross-sectional view of the LCD device 2100 taken along a line 12B—12B shown in FIG. 11. As shown in FIGS. 12A and 12B, the LCD device 2100 includes an active-matrix substrate 2101, a counter substrate 2102, and a liquid crystal layer 217 interposed therebetween.

First, the basic structure of the active-matrix substrate 2101 will be described. As shown in FIGS. 11 and 12A, the active-matrix substrate 2101 includes a lower plate 21 made of a transparent insulation material such as glass. On the lower plate 21, gate lines 22, gate electrodes 22' branched from the gate lines 22, and common electrodes 215 are formed. Source lines 28' are formed thereon so as to cross the gate line 22 and the common line 215 with a gate insulation film 23 being sandwiched therebetween. On the source lines 28', an interlayer insulation film 29 is formed. Picture element electrodes 211 and counter electrodes (driving electrodes) 213 are alternately formed so that the counter electrodes 213 overlap the corresponding source lines 28'. The picture element electrodes 211 and the counter electrodes 213 cross the gate lines 22 and the common electrode 215. Each of the counter electrodes 213 is formed along each corresponding source line 28'.

As shown in FIG. 11, the picture element electrodes 211 and the counter electrode 213 are arranged in an alternate manner so that the picture element electrodes 211 and the counter electrodes 213 are disposed at substantially equal intervals. In Example 8 each picture element area (i.e., an area serving as a unit of display) is defined as being surrounded by two gate lines 22 and the two source lines 28' (and the counter electrode 213 formed over the source line 28' through the interlayer insulation film 29). Each picture element area includes the picture element electrode 211 extending through the picture element area in the middle thereof. A gap 231 (FIG. 12A) serving as a region for separating the two adjacent picture element electrodes 211 (in a longitudinal direction in FIG. 11) from each other is provided over the gate line 22 at the position corresponding to the gate line 22. By forming the gap 231 in this manner, a boundary region between the picture element regions can be minimized. As a result, an aperture ratio can be improved.

At each crossing point of the source line 28' and the gate line 22, the TFT 230 serving as a switching element is formed so as to correspond to each picture element area. As shown in FIG. 12B, the TFT 230 includes the gate electrode 22', the gate insulation film 23, the semiconductor layer 24, and a channel protection layer 25 formed in the center of the semiconductor layer 24, and contact layers 26a and 26b formed so as to cover both edges of the channel protection layer 25. The source line 28' and an underlaying transparent conductive film 27a are connected to the contact layer 26a in an overlapped manner. This overlapping portion serves as a source electrode 28a. The drain electrode 28b and an underlaying transparent film 27b are connected to the contact layer 26b in an overlapped manner. An interlayer insulation film 29 is formed thereon so as to cover the TFT 230, the gate line 22 and the source line 28'.

As shown in FIGS. 11 and 12A, the transparent conductive film 27b extends along the picture element electrode 211 formed above, and faces the common electrode 215 through the gate insulation film 23, In the region where the transparent conductive film 27b faces the common electrode 215, the picture element electrode 211 is electrically connected to the transparent conductive film 27b via the Contact hole 210 formed through the interlayer insulation film 29.

Figure 13:
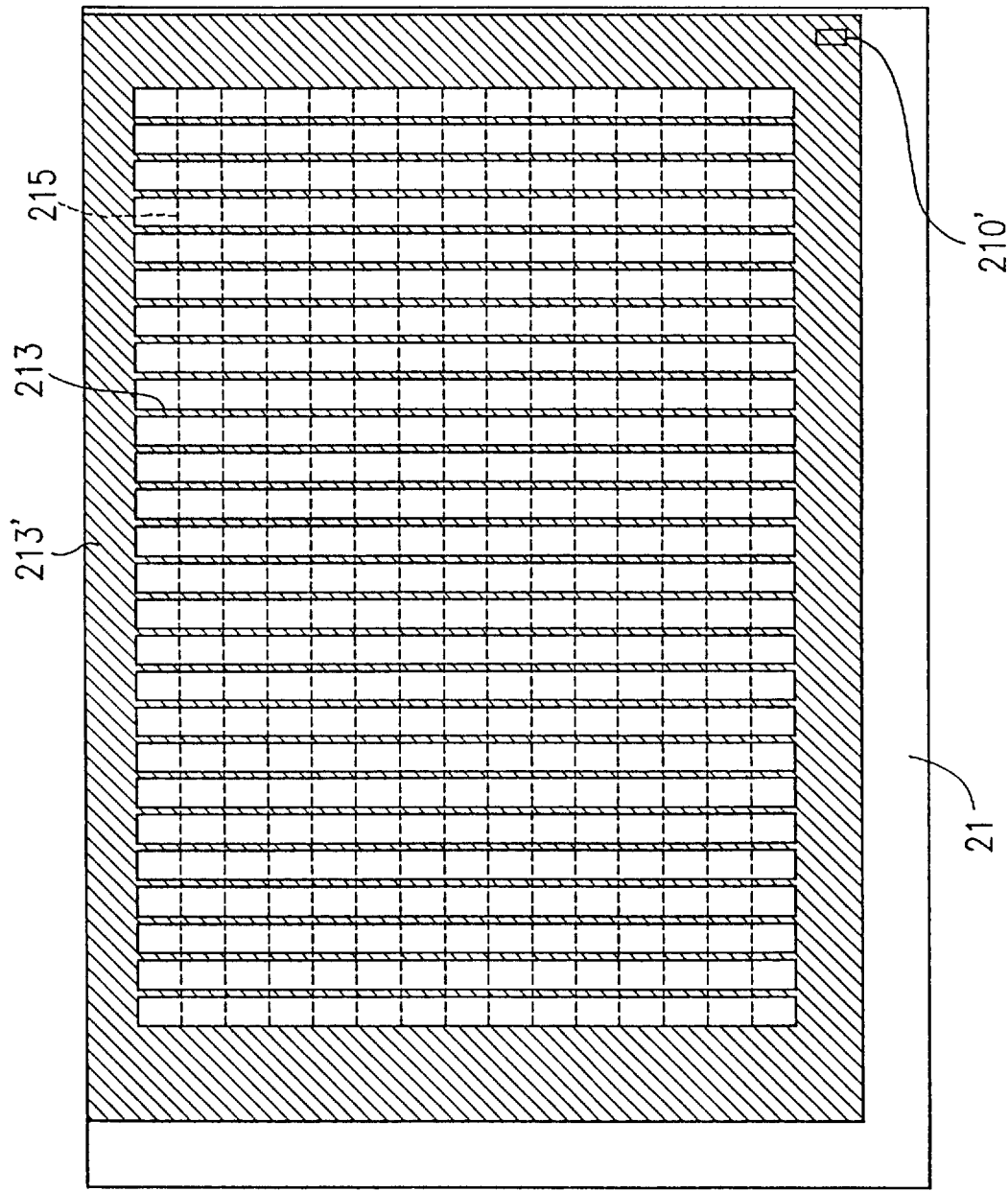
FIG. 13 is a schematic view of an active-matrix substrate of the LCD device of Example 8 according to the present invention.

Turning to FIG. 13, the arrangement of the entire active-matrix substrate 2101 is illustrated. As shown in FIG. 13, since all the counter electrodes 213 are connected to each other in a region 213' on the transparent insulation plate 21 other then the picture element regions (hereinafter, referred to as a peripheral region), all the counter electrodes 213 have the same potential. The counter electrodes 213 are connected to the common electrodes 215 via the contact holes 210' in the peripheral region 213'. In this manner, the common electrodes 215 and the transparent conductive film 27b having the same potential as that of the picture element electrodes 211 form a storage capacitor.

Next, with reference to FIGS. 11, 12A and 12B, a method for fabricating the LCD device 2100 will be described. First, In the active-matrix substrate 2101, the gate line ZZ, the gate electrode 22', and the common electrode 215 are formed on the lower plate 21 by patterning a metal layer such as a Ta layer or an Al layer. It is preferable that the metal layer has a thickness between about 3600 to 6500 Å. The gate insulating film 23 is formed on the entire lower plate 21 so as to cover the gate line 22, the gate electrode 22', and the common electrode 215. For example, the gate insulation film 23 can be formed of $SiN_x$, $SiO_z$ or the like to have a thickness between about 3000 to 5000 Å.

Next, the semiconductor layer 24 is formed on the gate insulation film 23 at the position corresponding to the gate electrode 22'. The semiconductor layer 24 can be made of a-Si or p-Si or the like. It is preferable that the semiconductor layer 24 has a thickness between about 300 to 500 Å, The channel protection layer 25 is formed on the middle area of the semiconductor layer 24 in a prescribed pattern. A $SiN_x$, layer having a thickness of about 1000 Å is used as the channel protection layer 25, Next, the contact layers 26a (source electrode side) and 26b (drain electrode side) made of $n^+$-Si layers, each having a thickness of about 700 Å, are formed so as to overlap both ends of the channel protection layer 25 and to cover the semiconductor layer 24.

On the contact layers 26a and 26b, a transparent conductive film such as an indium-tin-oxide (ITO) is formed by sputtering, Then, the transparent conductive film is patterned so an to form the transparent conductive film 27a serving as an underlying layer of the source line 28' and the source electrode 28a and the transparent conductive film 27b serving as an underlaying layer of the drain electrode 28b and extending toward the common electrode 215. On the transparent conductive films 27a and 27b, a metal layer made of Ta, Al or the like is formed by sputtering so as to have a thickness between about 3600 and 6500 Å. Then, the metal layer is patterned so as to form an upper layer 28 of the source line, the source electrode 28a, and the drain electrode 28b. In Example 8, as shown in FIG. 12B, the source line 28' having a double-layered structure is formed by using the metal layer 28 serving as the overlying layer and the transparent conductive film 27a serving as the underlying layer. With the source line 28' having the double-layered structure, even if a defect occurs in part of the overlying metal layer 28, the occurrence of short-circuit of the source line 28' can be reduced because the underlaying transparent conductive film 27a maintains electrical connection.

Next, the interlayer insulation film 29 is formed by using, for example, a photosensitive acrylic resin so as to cover the TFT 230, the gate line 22, the source line 23 and the transparent conductive film 27b.

During the formation process of the interlayer insulation film 29, the contact hole 210 is simultaneously formed by exposure to light and alkali development. The interlayer insulation film 29 has a thickness of about 3 μm. It is preferable that the contact hole 210 has a large opening area. Preferably, the contact hole 210 has a width smaller than that of the common electrode 215, and is located inside the common electrode 215 completely. The interlayer insulation film 29 may be formed by using a resin such as polyimide.

Next, the metal layer such as a Ta film or an Al film is formed to a thickness between about 5000 to 7000 Å by sputtering. Then, the metal layer is patterned so as to form the picture element electrode 211 and the counter electrode 213. The picture element electrode 211 is electrically connected via the contact hole 210 formed through the interlayer insulation film 29 to the transparent conductive film 27b connected to the drain electrode 28b. In Example 8, the picture element electrodes 211 and the counter electrodes 213 are arranged in the same direction in an alternate manner so that the picture element electrodes 211 and the counter electrodes 213 are disposed at substantially equal intervals. In Example 8, all the counter electrodes 213 are formed so as to face the corresponding source lines 28' within a display screen through the interlayer insulation film 29. Moreover, the counter electrode 213 is formed so as to have a width larger than that of the source line 28' and thus to completely cover the source line 28'.

On the other hand, in the counter substrate 2102, a photosensitive color resist is applied onto the upper plate 212 and then is exposed and developed to form a color filter 214 of red, green and blue. Thereafter, alignment films 215 are formed on the active-matrix substrate 2101 and the counter substrate 2102, respectively, so as to be in contact with the liquid crystal layer 217. Thereafter, the substrates 2101 and 2102 are attached to each other interposing a predetermined gap therebetween. Then, a liquid crystal material is injected into the gap to form a liquid crystal layer 217. In this manner, the LCD device 2100 is completed.

FIG. 14A is a plan view showing the thus fabricated LCD device 2100 in the state where no voltage is applied, and FIG. 14B is a plan view showing the thus fabricated LCD device 2100 in the state where a voltage is applied to the liquid crystal layer 217 so as to drive the LCD device 2100. As shown in FIG. 14A, the liquid crystal molecules 225 are orientated so as to have a certain angle (from 0 degrees or more but less than 15 degrees) with respect to the longitudinal direction of the picture element electrodes 211 and the counter electrodes 213. When a voltage is applied across the picture element electrode 211 and the counter electrode 213, an electric field E is formed in a direction substantially parallel to the substrate (as indicated with arrows in FIG. 14B). The liquid crystal molecules 225 are orientated along the electric field E from the picture element electrode 211 toward the driving electrode 213. Since the picture element electrode 211 is placed substantially middle of the two counter electrodes 213 in Example 8, the electric field E formed in each picture element area is substantially identical on both sides of the picture element electrode 211. Therefore, the dependence of viewing characteristics on a viewing angle and non-uniformity of display in each picture element area can be reduced while realizing high quality display.

As described above, in Example 8, the counter electrode 213 is formed along the source line 28' in an overlapped manners and the source line 28' is located so as not to project from the electrode 213 in a width direction. Therefore, the source line 28' is prevented from excessively invading the aperture area, thereby increasing the aperture area. By placing the gap 231 of the picture element electrode 211 on the gate line 22, an aperture ratio can be further improved. Since the aperture area through which light is transmitted is increased thereby, an LCD device with high brightness can be provided by using a conventional backlight. In other words, an LCD device capable of realizing sufficient brightness with reduced power consumption can be provided.

As described above, by forming the counter electrodes 213 so as to completely cover the source lines 28' interposing the interlayer insulation film 29 therebetween, the electric field formed by the source line 28' can be shielded by the counter electrode 213 (shielding effect). In particular, since the counter electrode 213 is provided between the liquid crystal layer 217 and the source line 28' so as to be apart therefrom to a certain degree in a thickness direction, the effect of the electric field generated by the source line 28' on the liquid crystal layer 217 can be more effectively shielded. As a result, an electric field formed by the source line 28' and the orientation of liquid crystal molecules are prevented from being disturbed to avoid the generation of crosstalk. Thus, an LCD device with higher quality can be provided thereby.

EXAMPLE 9

Figure 15:
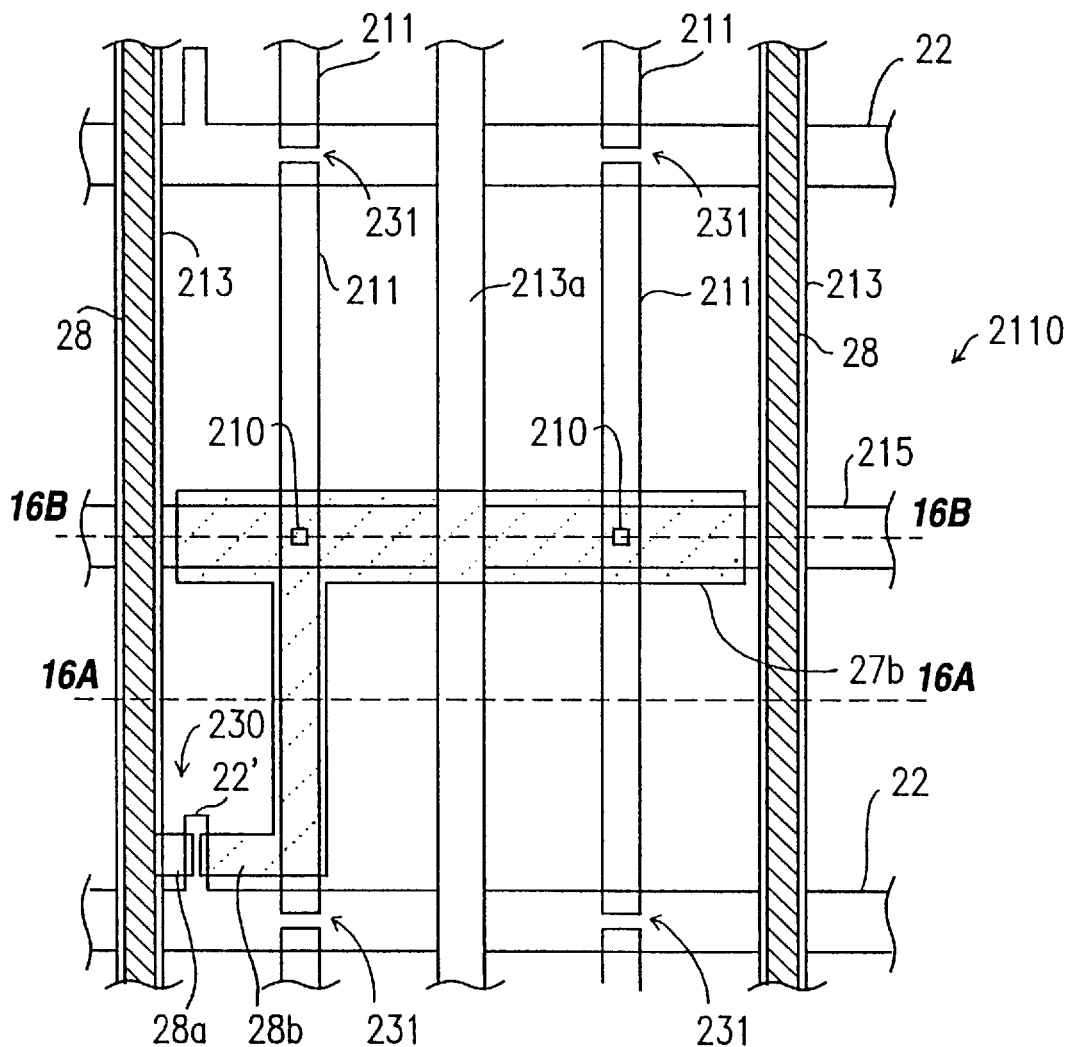
FIG. 15 is a plan view showing the configuration of an LCD device of Example 9 according to the present invention.
Figure 16A:
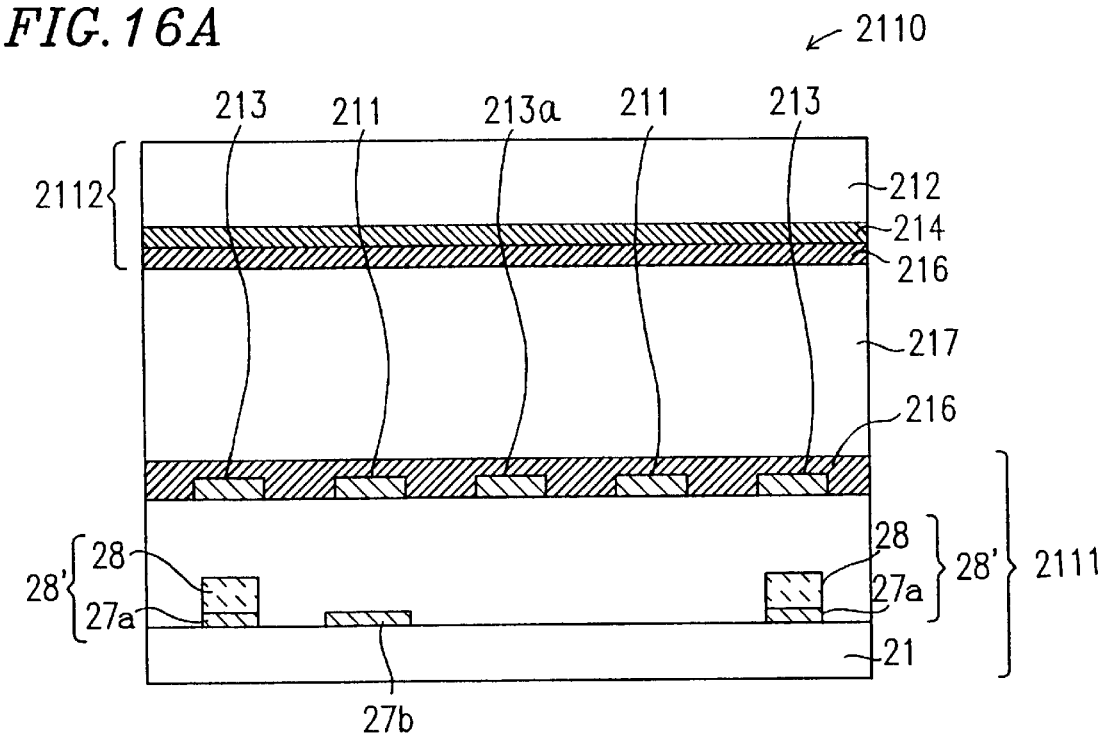
FIG. 16A is a cross-sectional view of the LCD device shown in FIG. 15 taken along a line 16A—16A.
Figure 16B:
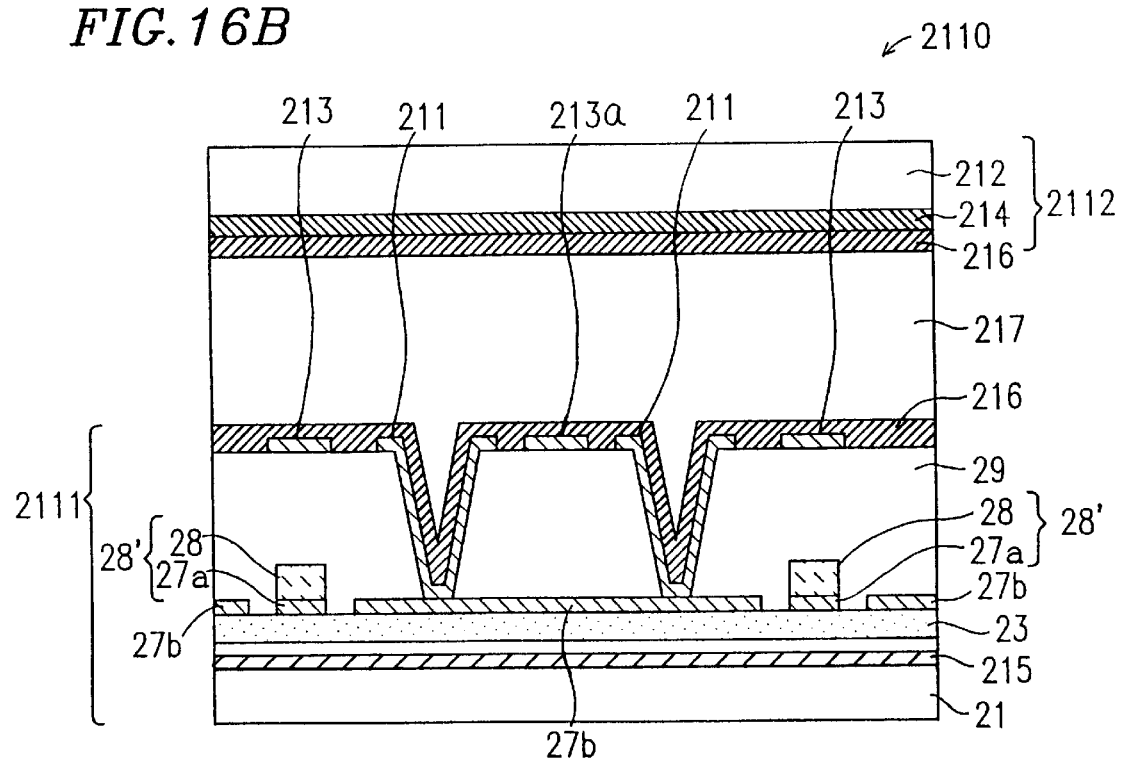
FIG. 16B is a cross-sectional view of the LCD device shown in FIG. 15 taken along a line 16B—16B.

FIG. 15 is a plan view of an LCD device 2110 in Example 9 according to the present invention. FIG. 16A is a cross-sectional view of the LCD device 2110 taken along a line 16A—16A shown in FIG. 15, and FIG. 16B is a cross-sectional view taken along a line 16B—16B shown in FIG. 15. In Examples 9 through 12 described below, the same components as those in Example 8 are denoted by the same reference numerals. As shown in FIGS. 16A and 16B, the LCD device 2110 includes an active-matrix substrate 2111, a counter substrate 2112, and the liquid crystal layer 217 interposed between the active-matrix substrate 2111 and the counter substrate 2112.

First, the basic configuration of the active-matrix substrate 2111 will be described. As shown in FIGS. 15, 16A and 16B, the gate lines 22, the gate electrodes 22' branched from the gate lines 22, and the common electrodes 215 are formed on the lower plate 21 made of a transparent insulation material such as glass. The source lines 28' are formed thereon through the gate insulation film 23 so as to cross the gate lines 22 and the common electrodes 215, On the source lines 28', an interlayer insulation film 29 is formed. The picture element electrodes 211 and the counter electrodes 213 are alternately formed so that the counter electrodes overlap the corresponding source lines 28'. The picture element electrodes 211 and the counter electrodes 213 cross the gate lines 22 and the counter electrodes 215.

As shown in FIG. 15, the picture element electrodes 211 and the counter electrodes 213 are alternately arranged so that the picture element electrodes 211 and the counter electrodes 213 are disposed at substantially equal intervals. In Example 9, one picture element area (i.e., an area serving as a unit of display) is defined as being surrounded by two gate lines 22 and two source lines 28' (and the counter electrode 213 superimposed over the source line 28' through the interlayer insulation film 29). Each picture element area includes one counter electrode 213a disposed substantially in the middle of the picture element area and two picture element electrodes 211 sandwiching the counter electrode 213a. That is, each of the two picture element electrodes 211 included in one picture element area is sandwiched between the counter electrodes 213 and 213a. As can be seen from FIGS. 16A and 16B, the source line 28 is not formed under the counter electrode 213a located in the middle of the picture element region.

The gaps 231 for separating the adjacent two picture element electrodes 211 (in the longitudinal direction in FIG. 15) are provided on the gate lines 22. By forming the gaps 231 in this manner, a boundary region between the picture element areas can be minimized so as to improve the aperture ratio.

At each crossing point of the source line 28' and the gate line 22, the TFT 230 serving as a switching element is formed so as to correspond to each picture element area. The configuration of the TFT 230 of Example 9 is the same as that of the TFT 230 of Example 8 shown in FIG. 12B. Specifically, the TFT 230 includes the gate electrode 22', the gate insulation film 23, the semiconductor layer 24, and the channel protection layer 25 formed in the center of the semiconductor layer 24, and the contact layers 26a and 26b formed so as to cover both edges of the channel protection layer 25. The source line 28' and the underlaying transparent conductive film 27a are connected to the contact layer 26b in an overlapped manner. The overlapping portion serves as the source electrode 28a. The drain electrode 28b and an underlaying transparent film 27b are connected to the contact layer 26b in an overlapped manner.

As shown in FIGS. 15, 16A and 16B, the transparent conductive film 27b extends from the drain electrode 28b along one of the picture element electrodes 211, and faces the common electrode 215 through the gate insulation film 23. The transparent conductive film 27b extends along the common electrode 215, and crosses the two picture element electrodes 211 and the counter electrode 213a interposed therebetween through the interlayer insulation film 29, Each of the picture element electrodes 211 is connected to the transparent conductive film 27b at the crossing point via each of the contact holes 210 formed through the interlayer insulation film 29.

As in Example 8, since all the counter electrodes 213 and 213a are connected to each other in the peripheral region 213' (shown in FIG. 13) of the insulation substrate 21 other than the picture element areas, all the counter electrodes 213 and 213a have the same potential. The counter electrodes 213 and 213a are connected to the common electrode 215 via the contact holes 2101 in the peripheral region 213'. In this manner, the common electrode 215 and the transparent conductive film 27b having the same potential as that of the picture element electrodes 211 form a storage capacitor.

Also in Example 9, the picture element electrodes 211 and the counter electrodes 213 (213a) are alternately arranged in the same direction so that the picture element electrodes and the counter electrodes are disposed at substantially equal intervals. In Example 9, the counter electrodes 213 are formed so an to face all the source lines 28' within a display screen interposing t h e interlayer insulation film 29 therebetween. Moreover, in each picture element area, the counter electrodes 213a is disposed substantially in the middle thereof. The counter electrode 213 is formed so as to have a larger width than that of the source line 28' and so as to completely cover the width of the source line 28'. Since the counter electrode 213 is formed so that the width of the source line 28' does not project from the width of the counter electrode 213. Therefore, the aperture area is not excessively invaded by the width of the source line 28', thereby increasing the aperture area.

Moreover, by forming the counter electrode 213 so as to completely cover the source line 28' through the interlayer insulation film 29, an electric field generated by the source line 28' can be shielded by the counter electrode 213. In particular, since the counter electrode 213 is disposed between the liquid crystal layer 217 and the source line 28' so as to be apart therefrom to a certain degree in a thickness direction, the effect of the electric field generated by the source line 28' on the liquid crystal layer 217 can be more effectively shielded. As a result, the electric field generated by the source line 28' and the orientation of liquid crystal molecules can be prevented from being disturbed to avoid the occurrence of crosstalk.

In Example 9, since one picture element area includes two picture element electrodes 211, a distance between the picture element electrode 211 and the counter electrode 213 is reduced as compared with Example 8. As a result, a driving voltage can be reduced. One picture element area may include three or more picture element electrodes 211. By disposing a plurality of picture element electrodes 211 and corresponding counter electrodes 213 in one picture element area, a pitch between the picture element electrode 211 and the counter electrode 213 can be reduced. As a result, display can be performed at a lowered driving voltage.

Since a method for fabricating the LCD device 2110 of Example 9 is the same as that of the LCD device 2100 of Example 8, the description thereof is herein omitted.

EXAMPLE 10

Figure 17:
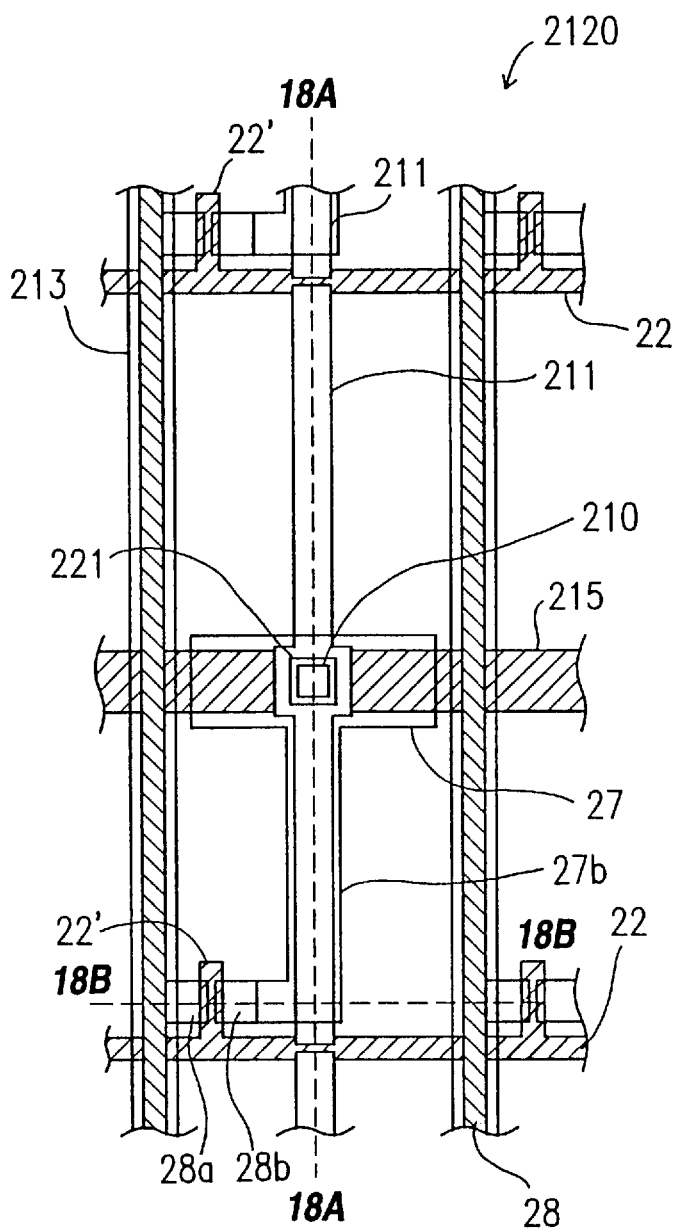
FIG. 17 is a plan view showing the configuration of an LCD device of Example 10 according to the present invention.
Figure 18A:
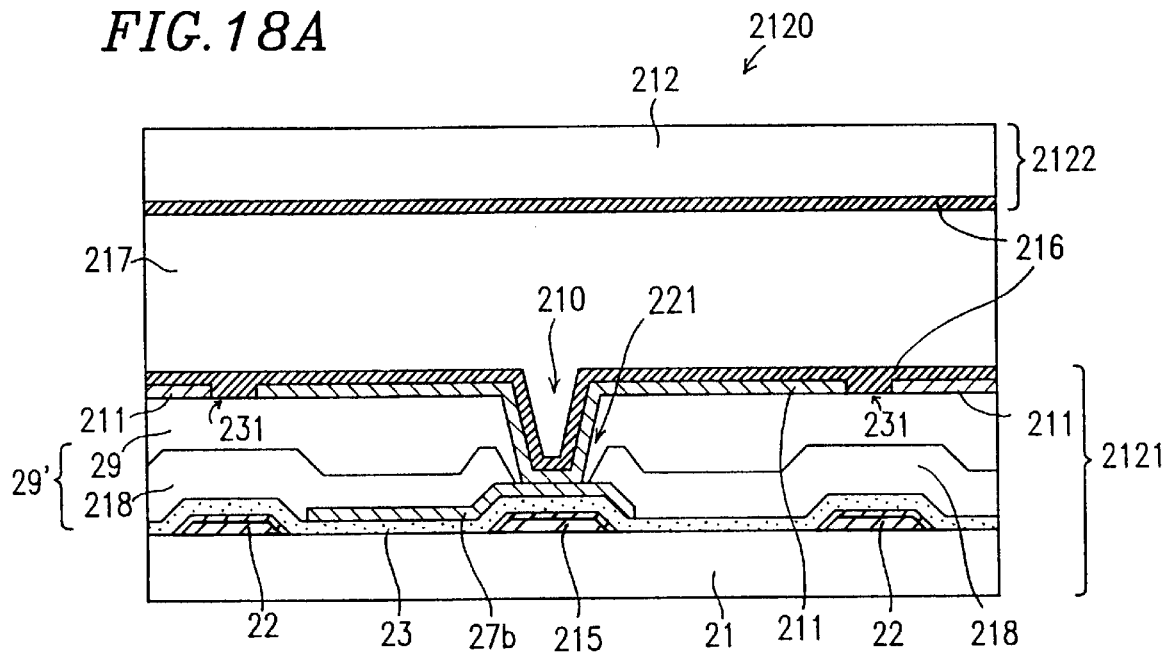
FIG. 18A is a cross-sectional view of the LCD device shown in FIG. 17 taken along a line 18A—18A.
Figure 18B:
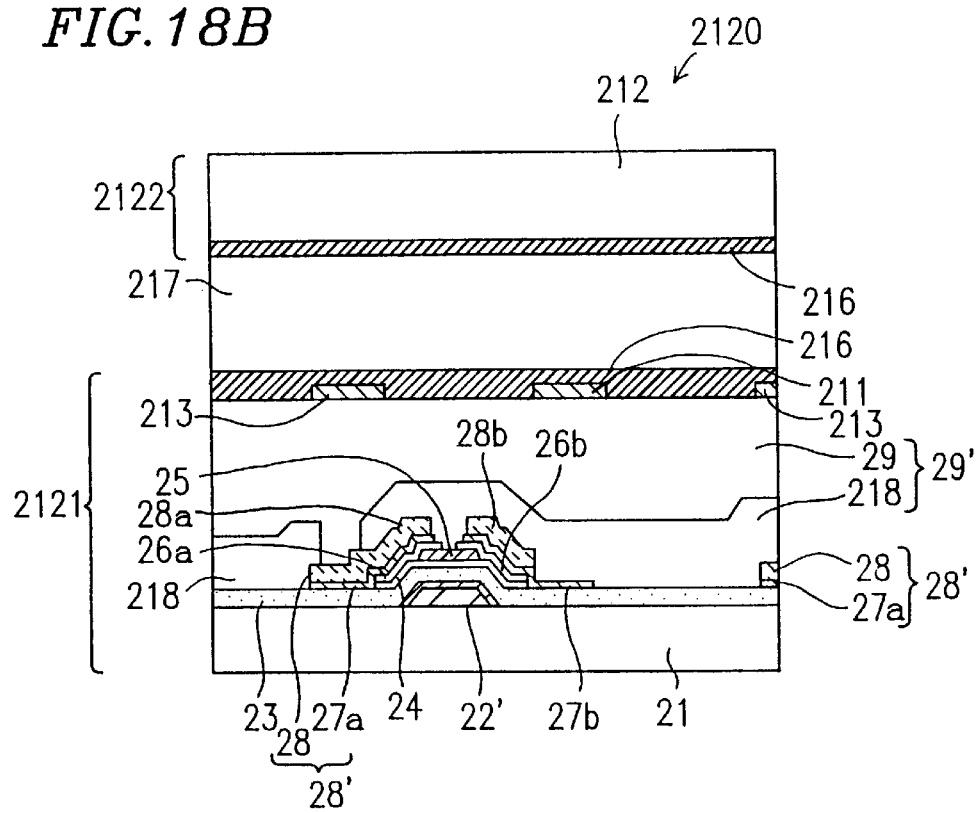
FIG. 18B is a cross-sectional view of the LCD device shown in FIG. 17 taken along a line 18B—18B.

FIG. 17 is a plan view showing an LCD device 2120 of Example 10 according to the present invention. FIG. 18A is a cross-sectional view of the LCD device 2120 taken along a line 18A—18A shown in FIG. 17, and FIG. 18B is a cross-sectional view of the LCD device 2120 taken along a line 18B—18B shown in FIG. 17. As shown in FIGS. 1BA and 18B, the LCD device 2120 includes an active-matrix substrate 2121, a counter substrate 2122, and a liquid crystal layer 217 interposed therebetween.

First, the basic configuration of the active-matrix substrate 2121 will be described. As shown in FIGS. 17 and 18A, the gate line 22, the gate electrode 22' branched from the gate line 22, and the common electrode 215 are formed on the lower plate 21 made of a transparent insulation material such as glass in the active-matrix substrate 2121. The source line 28' is formed thereon through the gate insulation film 23 so as to cross the gate line 2Z and the common electrode 215. On the source line 28', the picture element electrodes 211 and the counter electrodes 213 are formed through the color filter 218 and the interlayer insulation film 29. The picture element electrodes 211 and the counter electrodes 213 cross the gate lines 22 and the common electrodes 215, Each of the counter electrodes 213 is formed along the corresponding source line 28'.

As shown in FIG. 17, the picture element electrodes 211 and the counter electrodes 213 are formed in an alternate manner so that the picture element electrodes 211 and the counter electrodes 213 are disposed at substantially equal intervals. In Example 10, one picture element area (i.e., an area serving as a unit of display) is surrounded by two gate lines 22 and two source lines 28' (and the counter electrode 213 superimposed on the source line 28'). Each of the picture element areas includes the picture element electrode 211 disposed in the middle thereof. The gaps 231 (FIG. 18A) for separating the two adjacent picture element electrodes 211 (in the longitudinal direction in FIG. 17) are provided on the gate lines 22. By forming the gaps 231 in this manner, a boundary area of the picture element areas can be minimized so as to improve an aperture ratio.

At the crossing point of the source line 28' and the gate line 22, the TFT 230 serving as a switching element is formed so as correspond to each picture element area. As shown in FIG. 18B, the TFT 230 includes the gate electrode 22' formed on the transparent substrate 21, the gate insulation film 23, the semiconductor layer 24, and the channel protection layer 25 formed in the middle of the semiconductor layer 24, and the contact layers 26a and 26b formed so as to cover both edges of the channel protection layer 25. The source line 28' and the underlaying transparent conductive film 27a are connected to the contact layer 25a in a superimposed manner, This overlapping portion serves as the source line 28a. The drain electrode 28b and an underlaying transparent film 27b are connected to the contact layer 26b in an overlapped manner. The interlayer insulation film 29' is formed so as to cover the TFT 230, the gate line 22 and the source line 28'.

The interlayer insulation film 29' includes an insulation film 218 of three colors serving as a color filter 218 and an interlayer insulation film 29 formed thereon. In the color filter 218, three colors of the insulation film 218 are arranged in a predetermined pattern such as a stripe pattern or a delta pattern. A contact hole 221 formed through the color filter and the contact hole 210 formed through the interlayer insulation film 29 are provided at the same position so as to correspond to each other.

AS shown in FIGS. 17 and 18A, the transparent conductive film 27b extends along the picture element electrode 211, and overlaps the common electrode 215 through the gate insulation film 23. In the portion where the transparent conductive film 27b opposes the common electrode 215, the picture element electrode 211 is electrically connected to the transparent conductive film 27b via the contact hole 210 formed through the interlayer insulation film 29 and the contact hole 221 formed through the color filter 218.

As in Example 8, all the counter electrodes 213 are connected In the peripheral area 213' in the insulation substrate 21 as shown in FIG. 13 in Example 10. The counter electrode 213 is connected to the common electrode 215 via the contact hole 210 in the peripheral area 213'. In this manner, the common electrode 215 and the transparent conductive film 27b having the same potential as that of the picture element electrode 211 form a storage capacitor.

Next, with reference to FIGS. 17, 18A and 18B, a method for fabricating the LCD device 2120 will be described. First, in the active-matrix substrate 2121, gate lines 22, gate electrodes 22' and the common electrode 215 are formed on the lower plate 21 made of a transparent insulation material such as glass by patterning a metal layer made of Ta, Al or the like. A thickness of the metal layer is preferably in the range of about 3600 to 6500 Å. Next, the gate insulation film 23 is formed on the entire insulation substrate 21 so as to cover the gate line 22, the gate electrode 22' and the common electrode 215. For example, a $SiN_x$ film, a $SiO_z$ film or the like having a thickness between about 3000 to 5000 Å can be used as the gate insulation film, Next, the semiconductor layer 24 is formed on the gate insulation film 23 so as to face the gate electrode 22'. The semiconductor layer 24 can be made of a-Si or p-Si or the like. It is preferable that the semiconductor layer 24 has a thickness between about 300 to 500 Å. The channel protection layer 25 is formed on the middle area of the semiconductor layer 24 in a prescribed pattern, A $SiN_x$ layer having a thickness of about 1000 Å is used as the channel protection layer 25, Next, the contact layers 26a (source electrode side) and 26b (drain electrode side) made of $n^+$-Si layers, each having a thickness of about 700 Å, are formed so as to overlap both ends of the channel protection layer 25 and to cover the semiconductor layer 24.

On the contact layers 26a and 26b, a transparent conductive film such as an ITO is formed by sputtering. Then, the transparent conductive film is patterned so as to form the transparent conductive film 27a serving as an underlying layer of the source line and the source electrode and the transparent conductive film 27b serving as an underlaying layer of the drain electrode and extending toward the common electrode 215. On the transparent conductive films 27a and 27b, a metal layer made of Ta, Al or the like is formed by sputtering so as to have a thickness between about 3600 and 6500 Å. Then, the metal layer is patterned so as to form an upper layer 28 of the source line, the source electrode 28a, and the drain electrode 28b. In Example 10, as shown in FIG. 18B, the source line 28' having a double-layered structure is formed by using the metal layer 28 serving as the overlying layer and the transparent conductive film 27a serving es the underlying layer, With the source line 28' having the double-layered structure, even if a defect occurs in part of the overlying metal layer 28, the occurrence of short-circuit of the source line 28' can be reduced because the underlaying transparent conductive film 27a maintains electrical connection.

Next, a red photosensitive film resin is attached so as to cover the TFTs 230, the gate lines 22, the source lines 23 and the transparent conductive film 27b. Then, the photosensitive film is patterned by exposure to light and developed so as to form a first insulation film serving as a red filter. Upon patterning, the contact hole 221 is simultaneously formed. In the similar manner, a second insulation film and a third insulation film serving as a green filter and a blue filter are formed by using a green photosensitive film resin and a blue photosensitive film resin, respectively. By these first through third insulation films, the color filter 218 having the contact holes 221 formed therethrough is formed.

On the color filter 218, for example, the interlayer insulation film 29 is formed by using a photosensitive acrylic resin. During the formation process of the interlayer insulation film 29, the contact hole 210 is formed at the same position as that of the contact hole 221. A total thickness of the color filter 218 and the interlayer insulation film 29 is about 3 μm. It is preferred that areas of the contact holes 210 and 221 are large. Preferably, the contact hole 221 is formed so as to have a width smaller than that of the common electrode 215 and to be located inside the common electrode 215, The contact hole 210 is formed so as to have a smaller width than that of the contact hole 221 and to be located inside the contact hole 221. By forming the interlayer insulation film 29 on the color filter 218, the interlayer insulation film 29 can be formed so as to have a flattened surface. The interlayer insulation film 29 may be formed by using a resin such as polyimide.

Next, on the interlayer insulation film 29, a metal layer such as Ta, Al or the like is formed by sputtering to have a thickness between 5000 to 7000 Å. Then, the metal lye; is patterned so as to form the picture element electrode and the counter electrode 213. The picture element electrode 211 is electrically connected to the transparent conductive film 27b connected to the drain electrode 28b, via the contact hole 210 formed through the interlayer insulation film 29 and the contact hole 221 formed through the color filter 218. In Example 10, the picture element electrodes 211 and the counter electrodes 213 are alternately formed in the same direction so that the picture element electrodes 211 and the counter electrodes 213 are disposed at substantially equal intervals. In Example 10, the counter electrodes 213 are formed so as to face all the source lines 28' within a display screen through the interlayer insulation film 29'. Furthermore, the counter electrode 213 is formed so as to have a larger width then that of the source line 28' and completely cover the source line 28'.

Thereafter, the alignment films 216 are formed on the active-matrix substrate 2121 and the counter substrate 2122, respectively. Then, the active-matrix substrate 2121 and the counter substrate 2122 are attached to each other interposing a predetermined space therebetween with the alignment films being opposed. Then, a liquid crystal material is injected into the gap to form the liquid crystal layer 217. In this manner, the LCD device 2120 is completed.

As described above, according to the LCD device 2120 according to Example 10, since the source line 28' is formed so as to be located within the width of the counter electrode 213, the aperture area is not invaded by the width of the source line 28'. As a result, the aperture area can be increased. Moreover, by locating the gaps 231 between the picture element electrodes 211 on the gate line 22, the aperture area can be further increased to realize an LCD device with a high aperture ratio. An LCD device with high brightness can be provided by using a conventional backlight. In other words, an LCD device capable of realizing sufficient brightness with reduced power consumption can be provided.

In addition, the counter electrode 213 is formed so as to completely cover the source line 28' with the interlayer insulation film 29' being interposed therebetween. The electric field formed by the source line 28' can be shielded by the counter electrode 213 (shielding effect). In particular, since the counter electrode 213 is located between the liquid crystal layer 217 and the source line 28' so as to be apart therefrom to a certain degree in a thickness direction, the effect generated by the source line 28' on the liquid crystal layer 217 can be more effectively shielded. As a result, the electric field formed by the source line 28' and the orientation of the liquid crystal molecules are prevented from being disturbed so as to avoid the occurrence of crosstalk.

The LCD device 2120 is driven by the same manner as that of the LCD device 2100 in Example 8 (FIGS. 14A and 14B). Since the picture element electrode 211 is substantially placed in the middle of the picture element area in the LCD device 2120, the electric field E generated in the right part of the picture element area is equal to that generated in the left part of the picture element area. Therefore, the dependence of viewing characteristics on a viewing angle or non-uniformity of display within each picture element area are reduced to realize an LCD device capable of displaying an image with higher quality.

Moreover, in Example 10, the color filter 218 is formed as part of the interlayer insulation film 29', so that the counter substrate 2122 substantially includes the upper plate 212 made of a transparent insulation material alone. As a result, it is possible to prevent the reduction of an aperture ratio due to accuracy upon attachment between the active-matrix substrate 2121 and the counter substrate 2122. Thus, an aperture ratio can be further increased while the fabrication cost is lowered.

EXAMPLE 11

Figure 19:
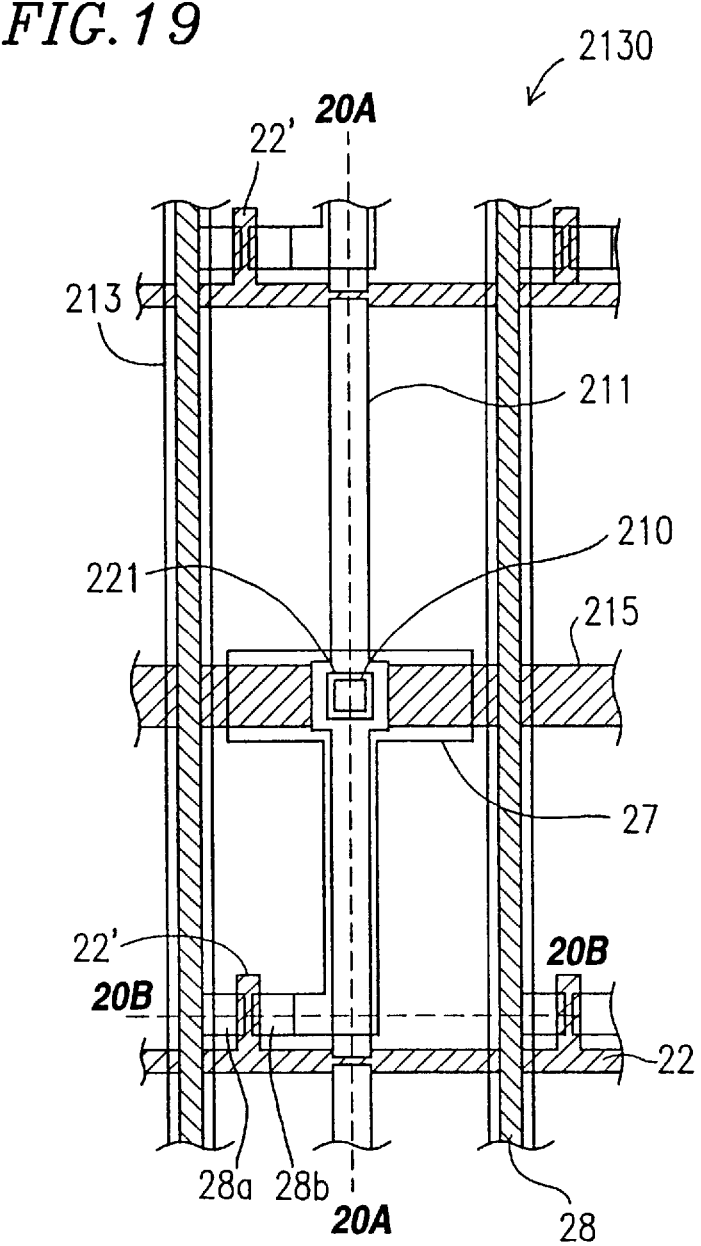
FIG. 19 is a plan view showing the configuration of an LCD device of Example 11 according to the present invention.
Figure 20A:
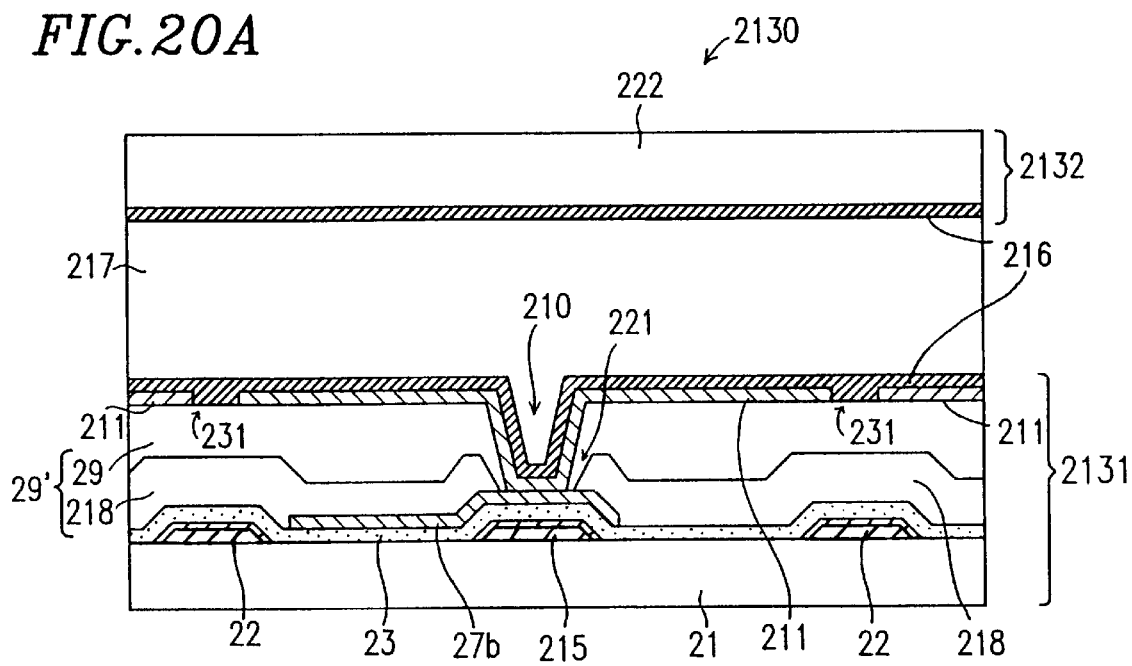
FIG. 20A is a cross-sectional view of the LCD device shown in FIG. 19 taken along a line 20A—20A.
Figure 20B:
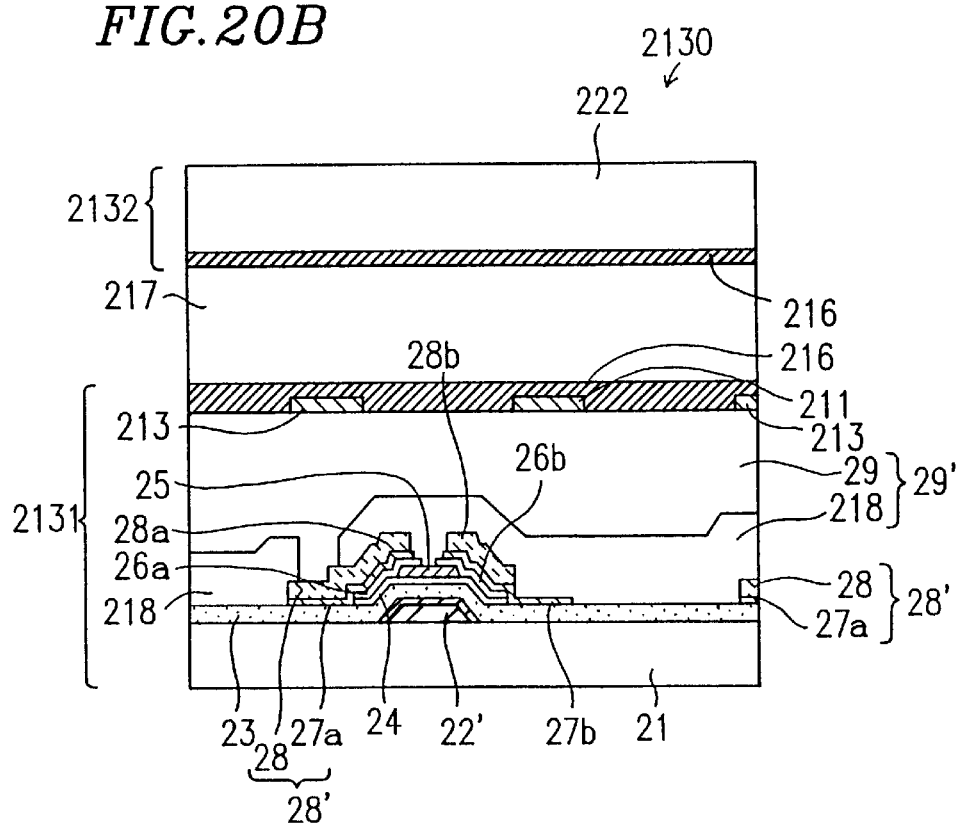
FIG. 20B is a cross-sectional view of the LCD device shown in FIG. 19 taken along a line 20B—20B.

FIG. 19 is a plan view showing a reflection type LCD device 2130 of Example 11 according to the present invention. FIG. 20A is a cross-sectional view of the LCD device 2130 taken along a line A-A' shown in FIG. 19, and FIG. 20B is a cross-sectional view of the LCD device 2130 taken along a line 20B—20B shown in FIG. 19. As shown in FIGS. 20A and 20B, the LCD device 2130 includes an active-matrix substrate 2131, a counter substrate 2132, and the liquid crystal layer 217 interposed between the active-matrix substrate 2131 and the counter substrate 2132. In Example 11, the counter substrate 2132 includes an upper plate 222 having a mirror-finished surface.

First, the basic configuration of the active-matrix substrate 2131 will be described. As shown in FIG. 19 and 20A, the active-matrix substrate 2131 includes gate lines 22, gate electrodes 22' branched from the gate line 22 and the common electrode 215 formed on the transparent lower plate 21 made of glass or the like. The source line 28' is formed thereon through the gate insulation film 23 so as to cross the gate line 22 and the common electrode 215. On the source line 28', the picture element electrode 211 and the counter electrode 213 are formed through the interlayer insulation film 29' including the color filter 218 and the interlayer insulation film 29. The picture element electrode 211 and the counter electrode 213 cross the gate line 22 and the common electrode 215. Each counter electrode 213 is formed along the corresponding source line 28'.

As shown in FIG. 19, the picture element electrode 211 and the counter electrode 213 are alternately arranged so that the picture element electrodes 211 and the counter electrodes 213 are disposed at substantially equal intervals. in Example 11, a picture element area (i.e., an area serving as a unit of display) is defined as being surrounded by two gate lines 22 and two source line 28' (and the counter electrodes 213 superimposed over the source lines 28'). Each picture element area includes the picture element electrode 211 placed in the middle of the picture element area. The gaps 231 (FIG. 20A) for separating adjacent two picture element electrodes 211 from each other (in the longitudinal direction in FIG. 19) are provided on the gate lines 22. By forming the gaps 231 in this manner, the peripheral area of each picture element can be minimized so as to improve an aperture ratio.

At the crossing point of the source line 28' and the gate line 22, each TFT 230 serving as a switching element is formed so as correspond to each picture element area. As shown in FIG. 20B, the TFT 230 includes the gate electrode 22' formed on the transparent substrate 21, the gate insulation film 23, the semiconductor layer 24, and the channel protection layer 25 formed in the middle of the semiconductor layer 24, and the contact layers 26a and 26b formed on both sides of the channel protection layer 25. The source line 28' and the underlaying transparent conductive film 27a are connected to the contact layer 26a in a superimposed manner. This overlapping portion serves as the source line 28a. The drain electrode 28b and an underlaying transparent film 27b are connected to the contact layer 26b in an overlapped manner. The interlayer insulation film 29' is formed so as to cover the TFT 230, the gate line 22 And the source line 28'.

The interlayer insulation film 29' of Example 11 includes an insulation film of three colors serving as a color filter 218 and an interlayer insulation film 29 formed thereon. The color filter 218 is formed so as to cover each picture element area, In the color filter 218, three colors are arranged in a predetermined pattern such as a stripe pattern or a delta pattern. The contact holes 221 formed through the color filter and the contact holes 210 formed through the interlayer insulation film 29 are provided at the same positions.

As shown in FIGS. 19 and 20A, the transparent conductive film 27b extends along the picture element electrode 211, and overlaps the common electrode 215 through the gate insulation film 23. In the portion where the transparent conductive film 27b faces the common electrode 215, the picture element electrode 211 is electrically connected to the transparent conductive film 27b via the contact hole 210 formed through the interlayer insulation film 29 and the contact hole 221 formed through the color filter 218.

As in Example 8, all the counter electrodes 213 are connected in the peripheral area 213' in the insulation substrate 21 as shown in FIG. 13 in Example 11. The counter electrode 213 is connected to the common electrode 215 via the contact hole 210 in the peripheral area 213'. In this manner, the common electrode 215 and the transparent conductive film 27b having the same potential as that of the picture element electrode 211 form a storage capacitor.

Since a method for fabricating the active-matrix substrate 2131 of Example 11 according to the present invention is the same as that for fabricating the active-matrix substrate 2121 of Example 10, the detailed description thereof is herein omitted and only the points different from that of Example 10 will be described. Since the upper plate 222 included in the counter substrate 2132 has a mirror-finished surface, the upper plate 222 serves as a reflecting plate. After the alignment films 216 are formed on the active-matrix substrate 2131 and the counter substrate 2132, respectively, the active-matrix substrate 2131 and the counter substrate 2132 are Attached to each other with a predetermined gap being interposed therebetween. Then, a liquid crystal material is injected in the gap so as to form the liquid crystal layer 217. In this manner, the LCD device 2130 is completed.

According to the LCD device 2130 of Example 11, since the source line 28' is formed so as to be located inside the counter electrode 213 in a width direction. Thus, the source line 28' does not invade the aperture area, resulting in an increased aperture area. Moreover, by placing the gaps 231 between the picture element electrodes on the gate lines 22, an aperture area can be further increased. As a result, an LCD device with a high aperture ratio can be realized.

The counter electrode 213 is formed so as to completely cover the source line 28' interposing the interlayer insulation film 29' therebetween. The electric field formed by the source line 28' can be shielded by the counter electrode 213 (shielding effect). In particular, since the counter electrode 213 is placed between the liquid crystal layer 217 and the source line 28' so as to have a certain space therebetween, the effect generated by the source line 28' on the liquid crystal layer 217 can be more effectively shielded. As a result, the electric field formed by the source line 28' and the orientation of the liquid crystal molecules are prevented from being disturbed so as to avoid the occurrence of crosstalk.

The LCD device 2130 is driven by the same manner as that of the LCD device 2100 in Example 8 (FIGS. 14A and 14B). Since the picture element electrode 211 is placed substantially in the middle of the picture element area in the LCD device 2130, the electric field E generated in the right part of the picture element area is equal to that generated in the left part of the picture element area. Therefore, the dependence of viewing characteristics on a viewing angle and the non-uniformity of display within each picture element area are reduced to realize an LCD device capable of displaying an image with higher quality.

EXAMPLE 12

Figure 21:
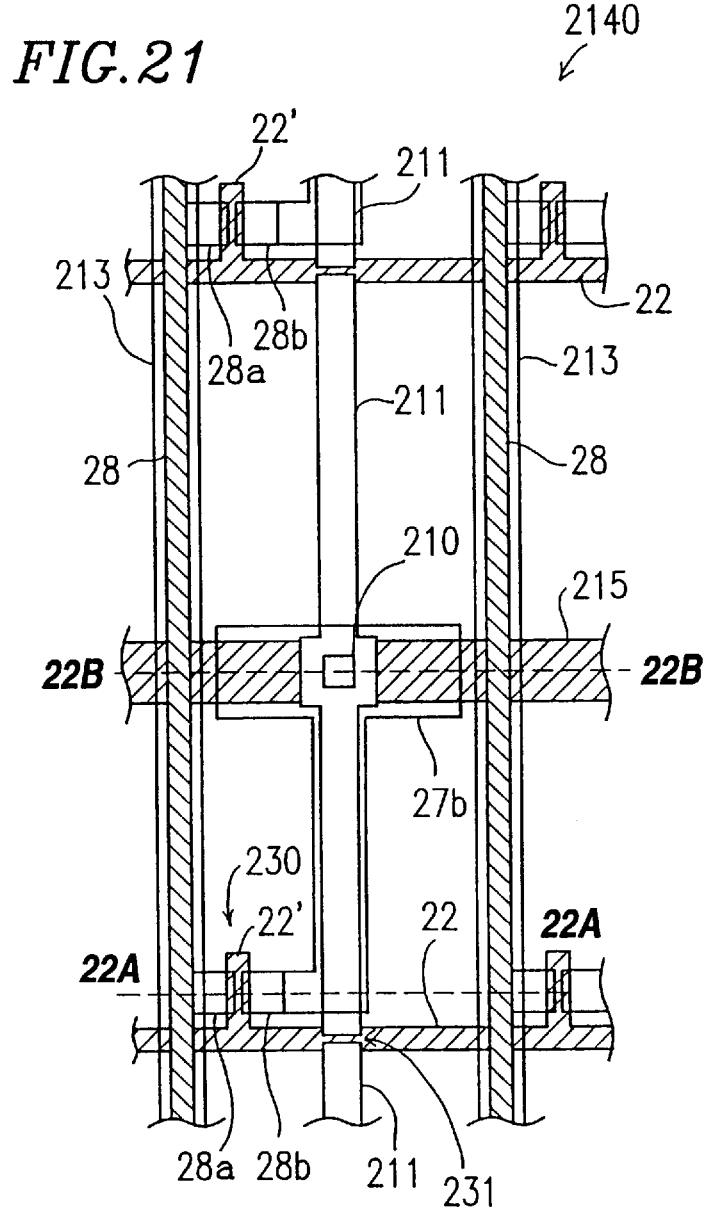
FIG. 21 is a plan view showing the configuration of an LCD device of Example 12 according to the present invention.
Figure 22A:
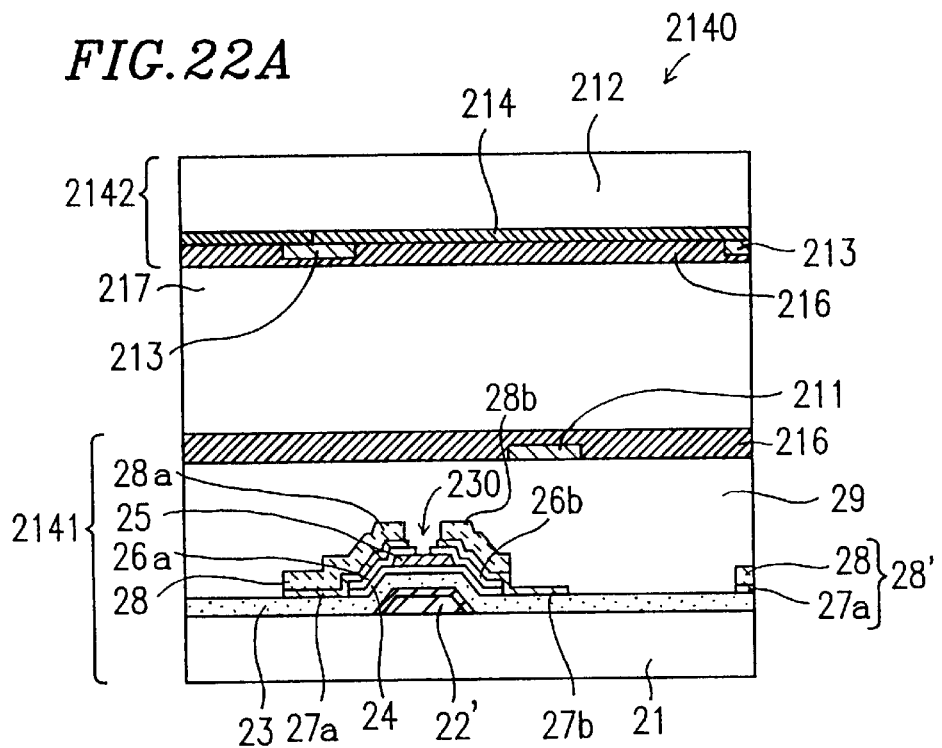
FIG. 22A is a cross-sectional view of the LCD device shown in FIG. 21 taken along a line B–B'.
Figure 22B:
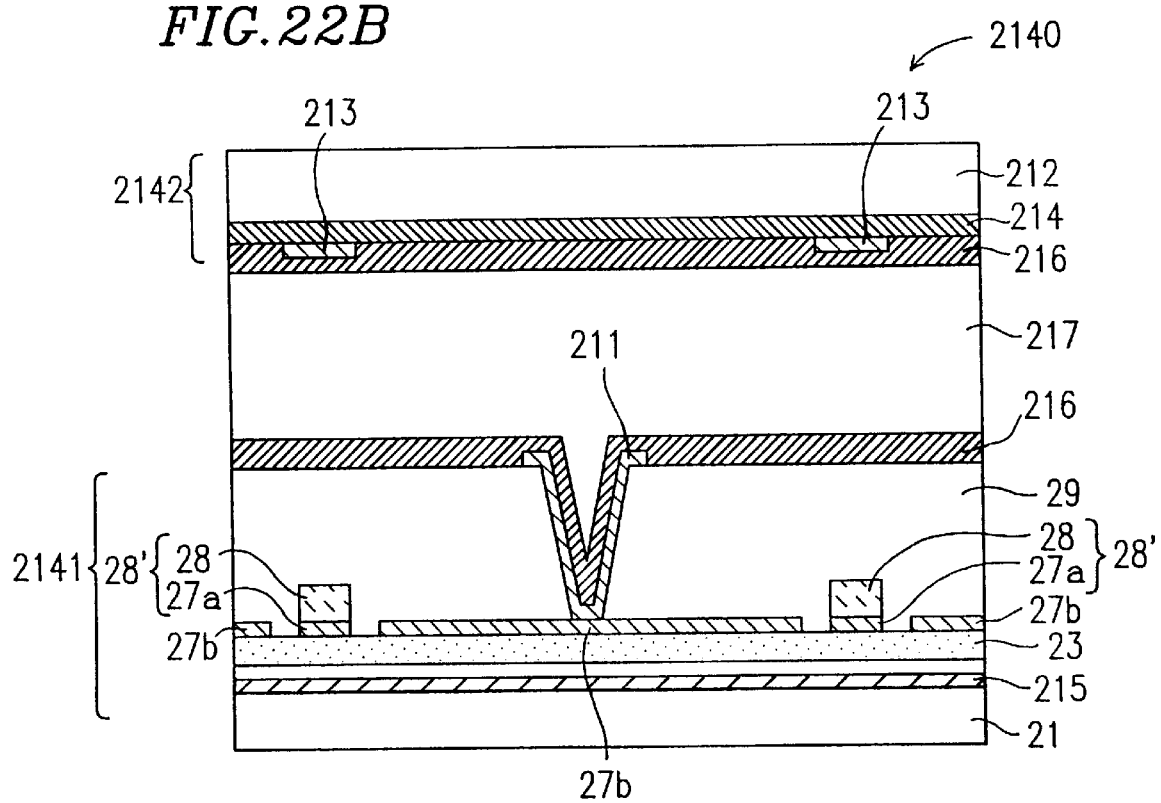
FIG. 22B is a cross-sectional view of the LCD device shown in FIG. 21 taken along a line 22B—22B.

FIG. 21 is a plan view showing an LCD device 2140 of Example 12 according to the present invention. FIG. 22A is a cross-sectional view of the LCD device 2140 taken along a line 22A—22A shown in FIG. 21, and FIG. 22B is a cross-sectional view of the LCD device 2120 taken along a line 22B—22B shown in FIG. 21. As shown in FIGS. 22A and 22B, the LCD device 2140 includes an active-matrix substrate 2141, a counter substrate 2142, and the liquid crystal layer 217 interposed therebetween.

First, the basic configuration of the active-matrix substrate 2141 will be described. As shown in FIGS. 21 and 22A, the gate line 22, the gate electrode 22' branched from the gate line 22, and the common electrode 215 are formed on the lower plate 21 made of a transparent insulation material such as glass in the active-matrix substrate 2141. The source line 28' is formed thereon through the gate insulation film 23 so as to cross the gate line 22 and the common electrode 215. The picture element electrodes 211 are formed over the source line 28' through the interlayer insulation film 29 so as to cross the gate lines 22 and the common electrodes 215.

The counter substrate 2142 includes the upper plate 212 made of a transparent insulation material such as glass. On the upper plate 212, the color filter 214 is formed. Then, the counter electrodes 213 are formed on the color filter 214. In Example 12, the counter electrodes 213 are formed not on the active-matrix substrate 2141 but on the counter substrate 2142.

As shown in FIGS. 22A and 22B, each of the counter electrodes 213 is formed along each corresponding source line 28' through the liquid crystal layer 217. As shown in FIG. 21, the picture element electrodes 211 and the counter electrodes 213 are alternately arranged so that the picture element electrodes 211 and the counter electrodes 213 are disposed at substantially equal intervals. In Example 12, one picture element area (i.e., an area serving as a unit of display) is defined as being surrounded by two gate lines 22 and two source lines 28' (and therefore the counter electrodes 213 superimposed over the source lines 28' through the interlayer insulation films 29). Each picture element area includes the picture element electrode 211 arranged in the middle of the picture element area. The gaps 231 for separating two adjacent picture element electrodes 211 (in the longitudinal direction in FIG. 21) are provided on the gate lines 22. By forming the gaps 231 in this manner, the peripheral area of each picture element can be minimized so as to improve an aperture ratio.

At the crossing point of the source line 28' and the gate line 22, the TFT 230 serving as a switching element is formed so as correspond to each picture element area. As shown in FIG. 22A, the TFT 230 includes the gate electrode 22' formed on the transparent substrate 21, the gate insulation film 23, the semiconductor layer 24, and the channel protection layer 25 formed in the middle of the semiconductor layer 24, and the contact layers 26a and 26b formed on both sides of the channel protection layer 25. The source line 28' and the underlaying transparent conductive film 27a are connected to the contact layer 26a in a superimposed manner. This overlapping portion serves as the source line 28a. The drain electrode 28b and an underlaying transparent film 27b are connected to the contact layer 26b in an overlapped manner. The interlayer insulation film 29 is formed so an to cover the TFT 230, the gate line 22 and the source line 28'.

As shown in FIGS. 21 and 22A, the transparent conductive film 27b extends along the picture element electrode 211, and is opposed to the common electrode 215 through the gate insulation film 23. In the portion where the transparent conductive film 27b faces the common electrode 215, the picture element electrode 211 is electrically connected to the transparent conductive film 27b via the contact hole 210 formed through the interlayer insulation film 29.

As in Example 8, all the counter electrodes 213 are connected In the peripheral area in the insulation plate 212 included in the counter substrate 2142 also in Example 12 as shown in FIG. 13. The counter electrode 213 are connected to the common electrodes 215 via the contact holes 210 in the peripheral area. In this manner, the common electrode 215 and the transparent conductive film 27b having the same potential as that of the picture element electrode 211 form a storage capacitor.

Next, with reference to FIGS. 21, 22A and 22B, a method for fabricating the LCD device 2140 will be described. First, in the active-matrix substrate 2141, the gate line 22, the gate electrode 22' and the common electrode 215 are formed on the lower plate 21 made of a transparent insulation plate such as glass by patterning a metal layer made of Ta, Al or the like. A thickness of the metal layer is preferably in the range of about 3600 to 6500 Å. Next, the gate insulation film 23 is formed on the entire insulation substrate 21 so as to cover the gate line 22, the gate electrode 22' and the common electrode 215. For example, a $SiN_x$ film, a $SiO_z$ film or the like having a thickness between about 3000 to 5000 Å can be used as the gate insulation film.

Next, the semiconductor layer 24 is formed on the gate insulation film 23 so as to face the gate electrode 22'. The semiconductor layer 24 can be made of a-Si or p-Si or the like. It is preferable that the semiconductor layer 24 has a thickness between about 300 to 500 Å. The channel protection layer 25 is formed on the middle area of the semiconductor layer 24 in a prescribed pattern. A $SiN_x$ layer having a thickness of about 1000 Å is used as the channel protection layer 25. Next, The contact layers 26a (source electrode side) and 26b (drain electrode side) made of $n^+$-Si layers, each having a thickness of about 700 Å, are formed so as to overlap both ends of the channel protection layer 25 and to cover the semiconductor layer 24.

On the contact layers 26a and 26b, a transparent conductive film such as an ITO is formed by sputtering. Then, the transparent conductive film is patterned so as to form the transparent conductive film 27a serving as an underlying layer of the source line and the source electrode and the transparent conductive film 27b serving as an underlaying layer of the drain electrode and extending toward the common electrode 215. On the transparent conductive films 27a and 27b, a metal layer made of Ta, Al or the like is formed by sputtering so as to have a thickness between about 3600 and 6500 Å. Then, the metal layer is patterned so as to form an upper layer 28 of the source line, the source electrode 28a, and the drain electrode 28b. In Example 8, as shown in FIG. 22B, the source line 28' having a double-layered structure is formed by using the metal layer 28 serving as the overlying layer and the transparent conductive film 27a serving as the underlying layer. With the source line 28' having the double-layered structure, even if a defect occurs in part of the overlying metal layer 28, the occurrence of short-circuit of the source line 28' can be reduced because the underlaying transparent conductive film 27a maintains electrical connection.

Next, the interlayer insulation film 29 is formed by using, for example, a photosensitive acrylic resin, so as to cover the TFT 230, the gate line 22, the source line 23 and the transparent conductive film 27b. During the formation process of the interlayer insulation film 29, the contact hole 210 is simultaneously formed by exposure to light and alkali development. The interlayer insulation film 29 has a thickness of about 3 μm. It is preferred that the contact hole 210 has a large opening area. The interlayer insulation film 29 may be formed by using a resin such as polyimide.

Next, on the interlayer insulation film 29, a metal layer such as Ta, Al or the like is formed by sputtering to have a thickness between 5000 to 7000 Å. Then, the metal layer is patterned so as to form the picture element electrodes 211. The picture element electrodes 211 are electrically connected to the transparent conductive film 27b connected to the drain electrode 28b, via the contact holes 210 formed through the interlayer insulation film 29.

Regarding the counter substrate 2142, a photosensitive color resist is applied onto the upper plate 212 made of a transparent insulation material, and is then exposed to light and developed so as to form the color filters of red, green and blue. Subsequently, a metal layer made of Ta, Al or the like is formed to a thickness of about 5000 to 7000 Å by sputtering on the color filter 214. Then, the metal layer is patterned so as to form the counter electrodes 213.

Thereafter, the alignment films 216 are formed on the active-matrix substrate 2141 and the counter substrate 2142, respectively. Then, the active-matrix substrate 2141 and the counter substrate 2142 are attached to each other with a predetermined space being therebetween. Then, a liquid crystal material is injected into the gap to form the liquid crystal layer 217. In this manner, the LCD device 2140 is completed.

In Example 12, the picture element electrodes 211 and the counter electrodes 213 are alternately arranged in the same direction so that the picture element electrodes 211 and the counter electrodes 213 are disposed at substantially equal intervals. Moreover, the counter electrodes 213 are formed so as to face all the source lines 28' within a display screen through the liquid crystal layer 217. In addition, the counter electrode 213 is formed so as to have a width larger than that of the source line 28' and completely cover the source line 28'.

As described above, since the source line 28' is formed so that the source line 28' is located inside the counter electrode 213 in a width direction, the aperture area is not excessively invaded by the width of the source line 28'. Thus, an aperture area can be increased. Moreover, by forming the counter electrodes 213 on the counter substrate 2142 including the color filter 214, the counter electrodes 213 also serve as a black matrix. Since an area through which light is transmitted is increased by increasing an aperture ratio, an LCD device with high brightness can be provided by using a conventional backlight. Furthermore, an LCD device capable of realizing sufficient brightness with reduced power consumption can be provided.

In Example 12, by providing the counter electrodes 213 on the counter substrate 2142 including the color filter 214, a parasitic capacitance can be reduced as compared with the case where the counter electrodes 213 are formed on the active-matrix substrate 2141.

Moreover, the picture element electrode 211 is located in the middle of the space between the two adjacent electrodes 213 in each picture element area. Therefore, an electric field generated in the right part of each picture element area is substantially equal to that in the left part thereof. Thus, it is possible reduce the dependence of viewing characteristics on viewing angle and non-uniformity of display within each picture element area so as to realize an LCD device capable of displaying an image with higher quality.

Figure 23:
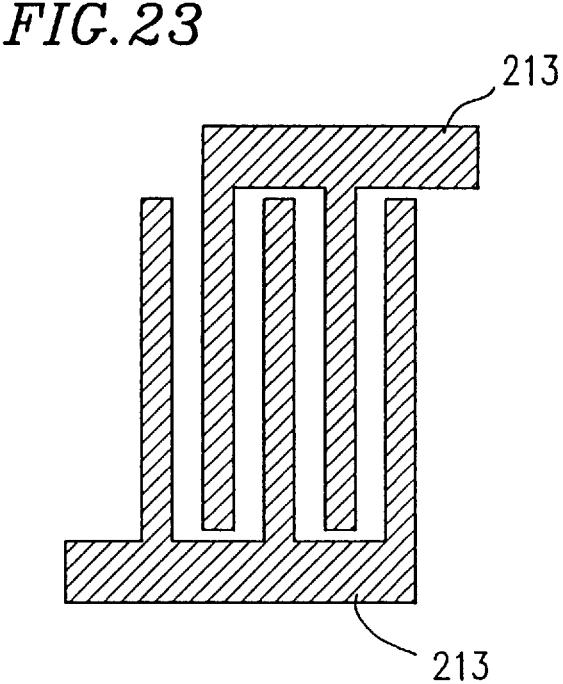
FIG. 23 is a view showing another exemplary shape of the common electrode.
Figure 24A:
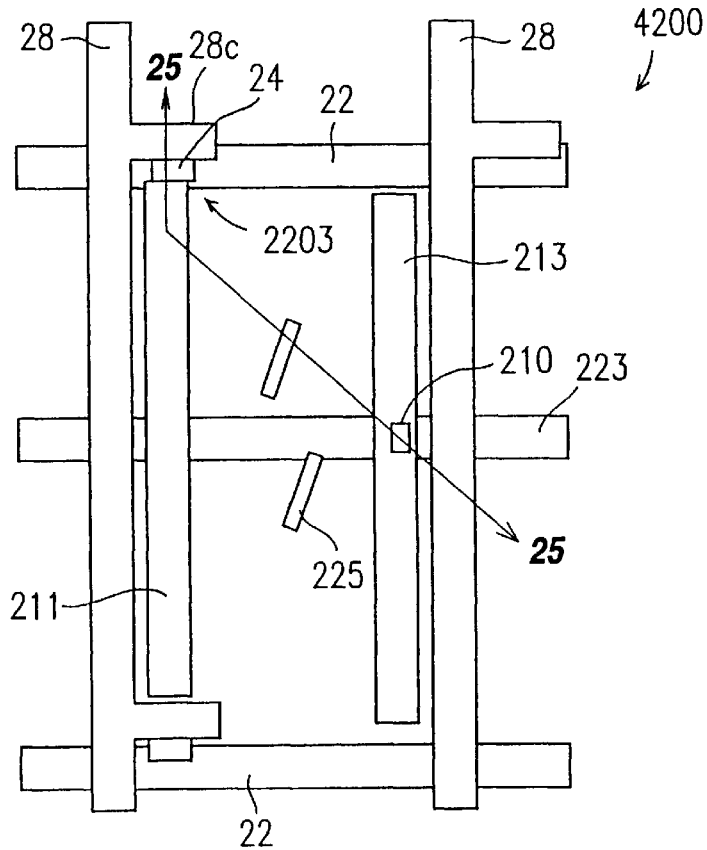
FIGS. 24A and 24B are plan views showing the configuration of a conventional LCD device.
Figure 24B:
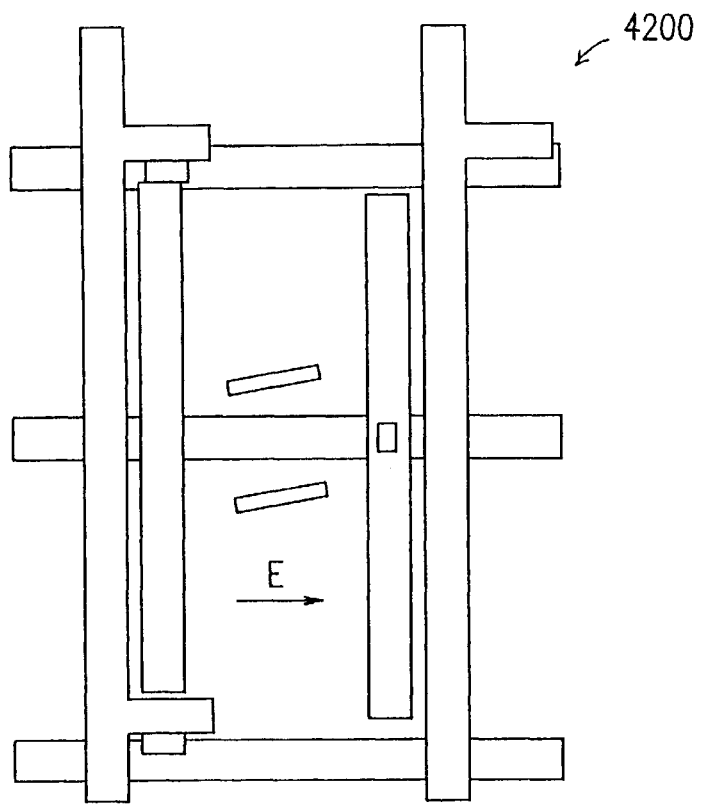
Figure 25:
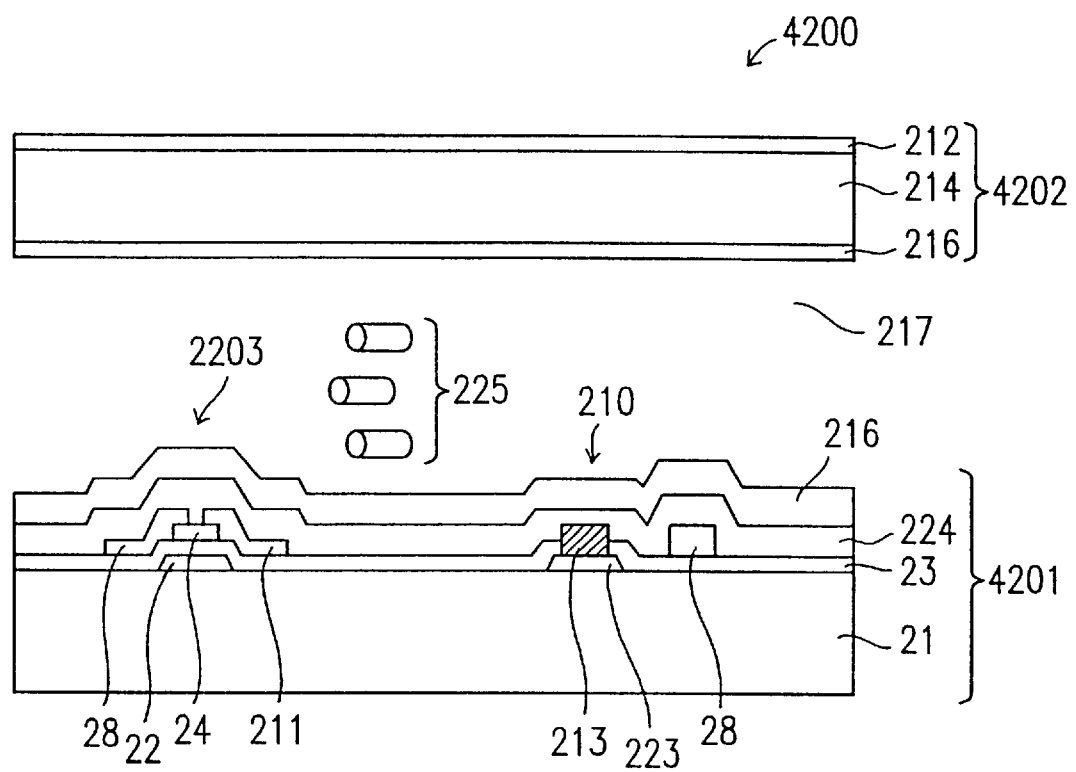
FIG. 25 is a cross-sectional view of the conventional LCD device shown in FIG. 24A taken along a line 25—25.

Although each of the counter electrodes 213 has a stripe shape in Examples 8 to 12 described above, the shape of the counter electrodes 213 is not limited thereto. In any of the examples, for example, a comb-shaped counter electrode as shown in FIG. 23 can be used instead. The effect of the present invention can be sufficiently obtained as long as the counter electrodes 213 are formed so as to conform to the positional relationship with the source lines 28' described in Examples 8 to 12.

The arrangement described in Example 9 in which each picture element area includes two or more picture element electrodes 211, each being located between two counter electrodes 213, is also applicable to Examples 10 to 12. The combination of the arrangement of the picture element electrodes 211 and the counter electrodes 213 in each picture element area and the color filter 214 or 218 is applicable to both a transmission type LCD device and a reflection type LCD device.

Those skilled in the art appreciate the above advantages based on the description of Examples 8 to 12.

As described above, according to the present invention, the picture element electrodes and the counter electrodes are formed in an alternate manner at equal intervals. The picture element electrode is located in the middle of two adjacent counter electrodes. As a result, an electric field generated in the right part of the picture element area is substantially equal to that generated in the left part. Therefore, the dependence of viewing characteristics on a viewing angle and non-uniformity of display Within each picture element area are reduced so as to realize an LCD capable of displaying an image with high quality.

Furthermore, by providing a plurality of picture element electrodes and corresponding common electrodes in one picture element area, a pitch between the electrodes is reduced. Thus, the LCD device can perform a display at a lower driving voltage.

According to the present invention, the counter electrodes are formed along the source lines so that the source line does not protrude from the counter electrode in a width direction. Therefore, the aperture area is not excessively Invaded by the source line, whereby an aperture area is increased. By placing a gap between the picture element electrodes on the gate line, an aperture ratio can be further improved. As a result, an aperture area through which light is transmitted can be increased. Thus, an LCD device with high brightness can be provided by using a conventional backlight. Moreover, an LCD device capable of realizing sufficient brightness with reduced power consumption can be provided.

In addition, as described above, the counter electrodes are formed so as to cover the source lines through the interlayer insulation film. As a result, an electric field generated by the source lines can be shielded by the counter electrodes (shielding effect). In particular, in the case where the counter electrode is placed between the liquid crystal layer and the source line so as to have a certain space therebetween, the effect of the electric field generated by the source line can be more effectively shielded. Thus, since the electric field generated by the source line and the orientation of the liquid crystal molecules are prevented from being disturbed so as to avoid the occurrence of crosstalk, an LCD device with higher quality can be provided.

In the case where the counter electrodes are formed on the counter substrate through the liquid crystal layer, a parasitic capacitance can be reduced. Moreover, in the case where the counter electrode includes a color filter, the counter electrodes also serve as a black matrix.

In the case where the color filter is formed on the active-matrix substrate, the requirements for accuracy of attachment of the substrates is not so strict as the case where the color filter is formed on the counter substrate. Therefore, the reduction of an aperture ratio due to low attachment accuracy can be prevented.

EXAMPLE 13

Figure 30A:
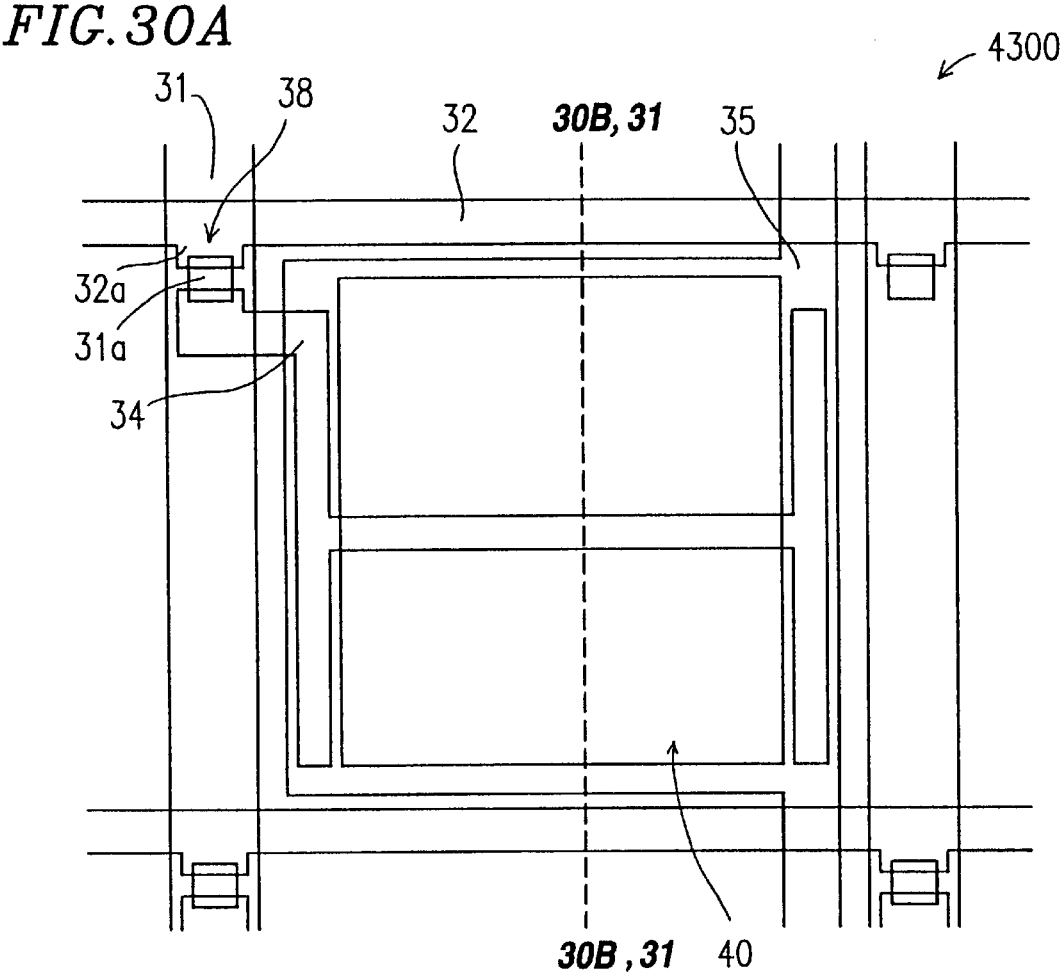
FIG. 30A is a partial plan view of an active-matrix substrate of another conventional LCD device.
Figure 30B:
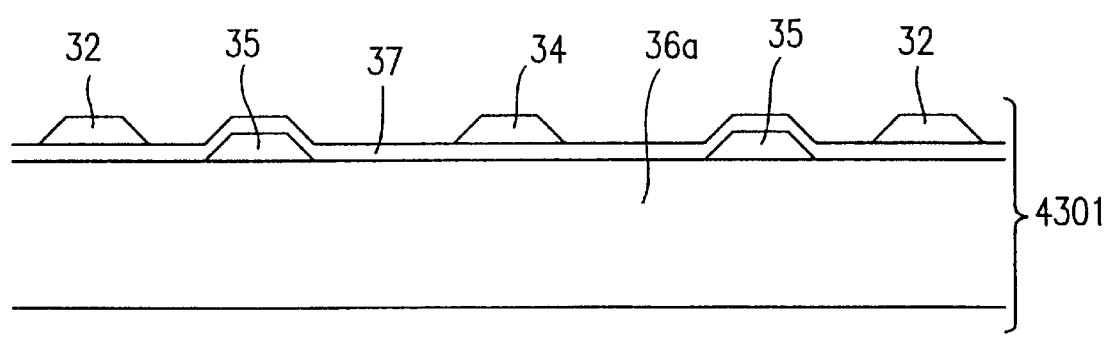
FIG. 30B is a cross sectional view of the active-matrix substrate of the conventional LCD device shown in FIG. 30A.

The above-described conventional LCD device 4300 (FIG. 30) of the horizontal electric field driving system described in Japanese Laid-Open Patent Publication No. 7-36058 has the following problems.

Since the counter electrode 35 is provided in the active-matrix substrate 4301, the arrangement of electrodes and lines are more complicated than that of an LCD device of the vertical electric field driving system, and an excessively low numerical aperture reduces the luminance.

Figure 31:
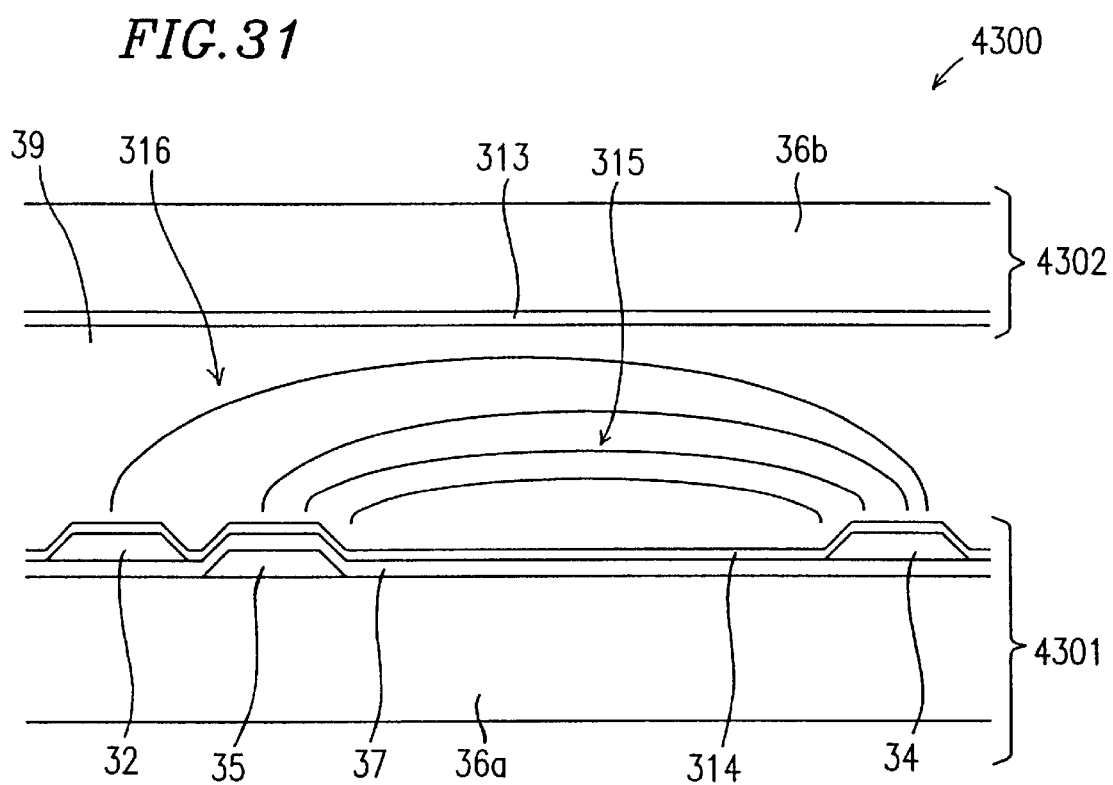
FIG. 31 is a cross sectional view of the conventional LCD device shown in FIG. 30A, illustrating the noise generated between various electrodes and lines.

Furthermore, is shown in FIG. 31, a noise 316 is generated between various electrodes and lines, e.g., between the source line 32 and the drain electrode 34, which deteriorates the display quality.

Moreover, in the conventional LCD device 4300 of the horizontal electric field driving system, the liquid crystal layer 39 having a thickness of about 10 $\mu$m is supplied with an electric field by the electrodes each having a thickness of about several hundred nanometers. Accordingly, as shown in FIG. 31, the electric field applied to the liquid crystal layer 39 is not completely parallel to the upper and lower plates 36b and 36a. When such an electric field is applied to the liquid crystal layer 39, the liquid crystal molecules are tilted to have an angle with respect to the upper and lower plates 36b and 36a. Due to such a phenomenon, the dependence of the display quality on the viewing angle which is to be eliminated on theory is not completely eliminated.

With reference to FIGS. 26A, 26B, 27A, 27B, 28A, 28B and 29, an LCD device 3100 in Example 13 according to the present invention will be described.

Figure 28A:
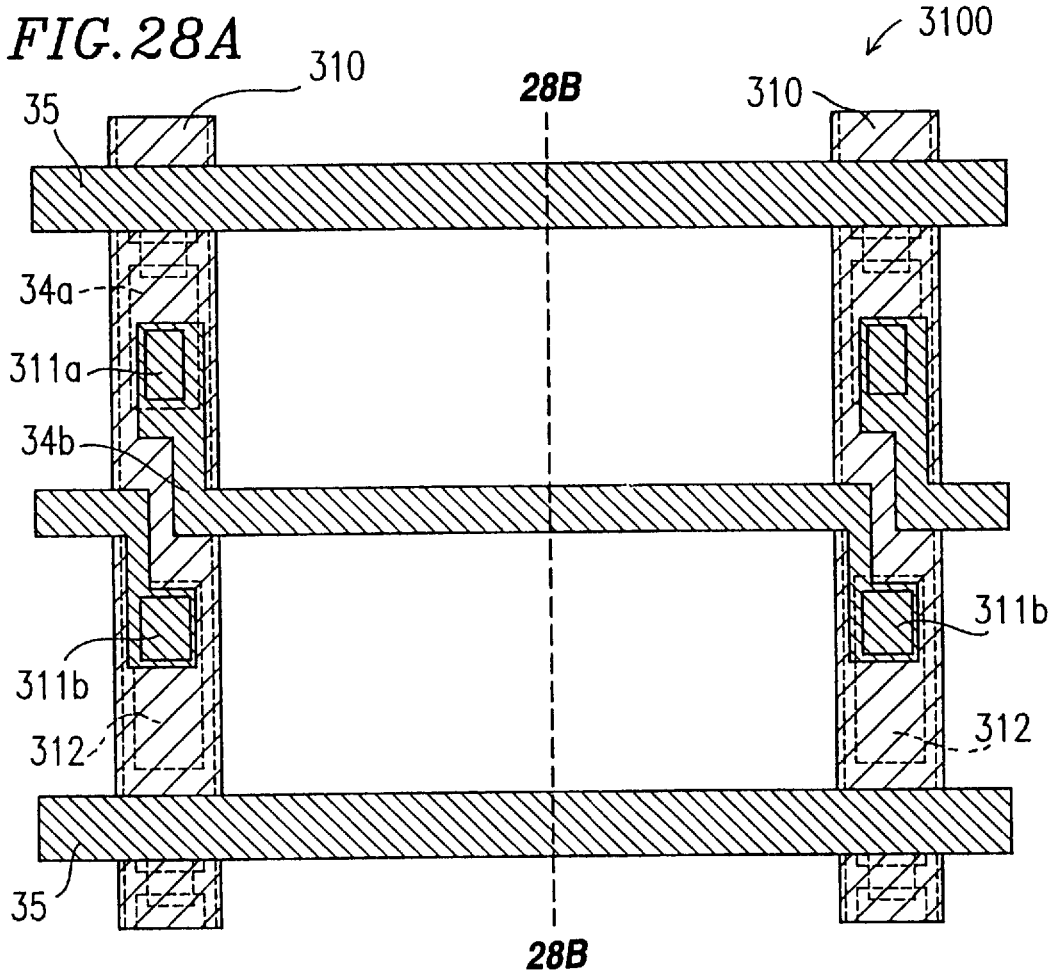
FIG. 28A is a partial plan view of an active-matrix substrate of the LCD device in Example 13.
Figure 28B:
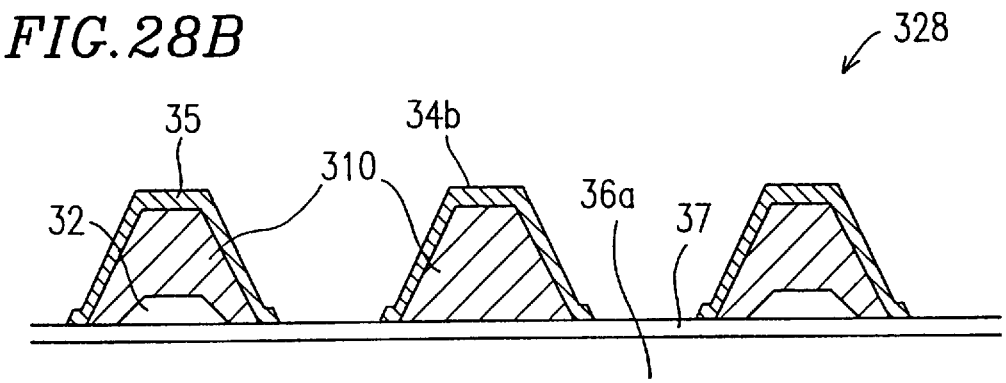
FIG. 28B is a cross sectional view of the active-matrix substrate shown in FIG. 28A.

FIG. 28A is a partial plan view of an active-matrix substrate 328 of the LCD device 3100 corresponding to a picture element area 40. FIG. 28B is a cross sectional view of the active-matrix substrate 328 taken along line 28B—28B in FIG. 2BA.

As shown in FIGS 28A and 28B, the active-matrix substrate 328 includes a lower plate 36a. On the lower plate 36a, a plurality of gate lines 31 (FIGS. 26A and 26B) are provided in stripes parallel to each other. An insulation layer 37 which covers the gate lines 31 is provided on the lower plate 36a. A plurality of source lines 32 are provided on the insulation layer 37. A picture element area 40 is defined by every two adjacent gate lines 31 and every two adjacent source lines 32. At each of intersections of the gate lines 31 and the source lines 32, a TFT 38 is provided. The TFT 38 includes a gate electrode, a source electrode 32a, and a first drain electrode 34a. A plurality of interlayer insulation layers 310 are provided on the insulation layer 37 in lattices in directions M and N. Every other interlayer insulation layers 310 running in direction M cover the source lines 32. The interlayer insulation layer 310 running in direction N cover the gate lines 31. A plurality of second drain electrodes 34b (only one is shown in FIGS. 28A and 28B) and a plurality of counter electrodes 35 are provided in stripes alternately and parallel to each other, The second drain electrodes 34b and the counter electrodes 35 are provided for applying an electric field to a liquid crystal layer 39 (FIG. 29) interposed between the active-matrix substrate 328 and a counter substrate 317.

As shown in FIG. 28B, the interlayer insulation layers 310 are formed to have a parallelopiped cross section. The second drain electrodes 34b and the counter electrodes 35 are provided on the two slanting surfaces and a flat top surface of the respective interlayer insulation layer 310 running in direction M. Each second drain electrode 34b is electrically connected to the first drain electrode 34a through a contact hole 311a running through the interlayer insulation layer 310 running in direction N.

The active-matrix substrate 328 is produced in, for example, the following manner.

Figure 26A:
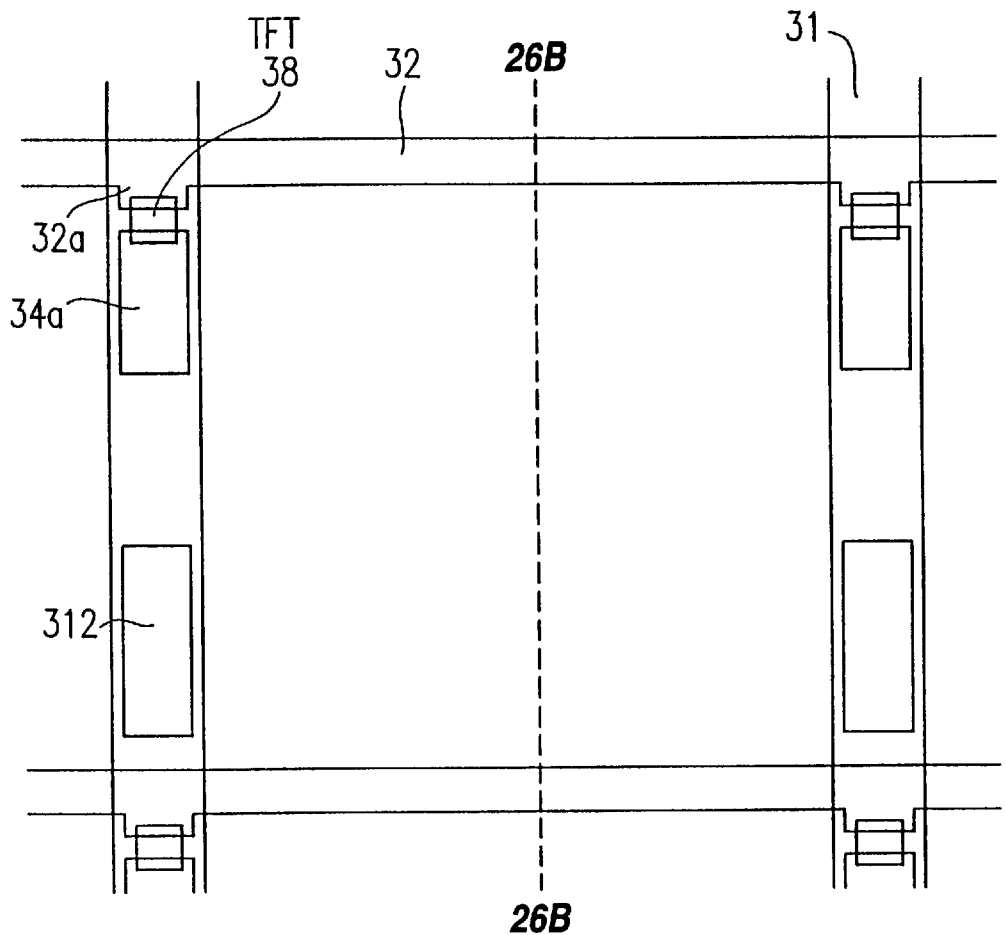
FIG. 26A is a partial plan view showing a step for producing an LCD device in Example 13 according to the present invention.
Figure 26B:
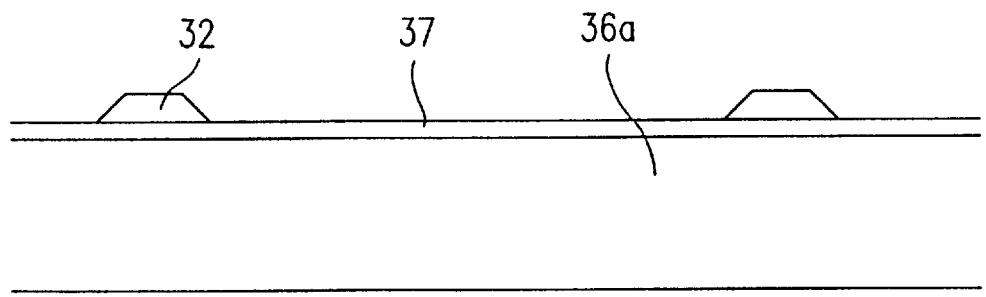
FIG. 26B is a cross sectional view corresponding to FIG. 26A.

As shown in FIGS. 26A and 26B, on the lower plate 36a formed of an insulating material, the gate lines 31 are formed. Then, the insulation layer 37 of $SiN_x$ or the like is formed on the lower plate 36a so as to cover the gate lines 31. On the insulation layer 37, the source lines 32 and the TFTs 38 are formed in any appropriate conventional manner. The lower plate 36a is formed of, for example, a glass material. The gate lines 31 and the source lines 32 are formed of Ta or the like. The gate electrode of the TFT 38 is a part of the gate line 31, and the source electrode is a projecting area 32a of the source line 32. The first drain electrode 34a is formed of the same conductive material as the source line 32. Simultaneously with the source line 32 and the first drain electrode 34a, a conductive piece 312 is formed on the insulation layer 37 substantially above the gate line 31. The conductive piece 312 acts as an electrode of a storage capacitor.

Figure 27A:
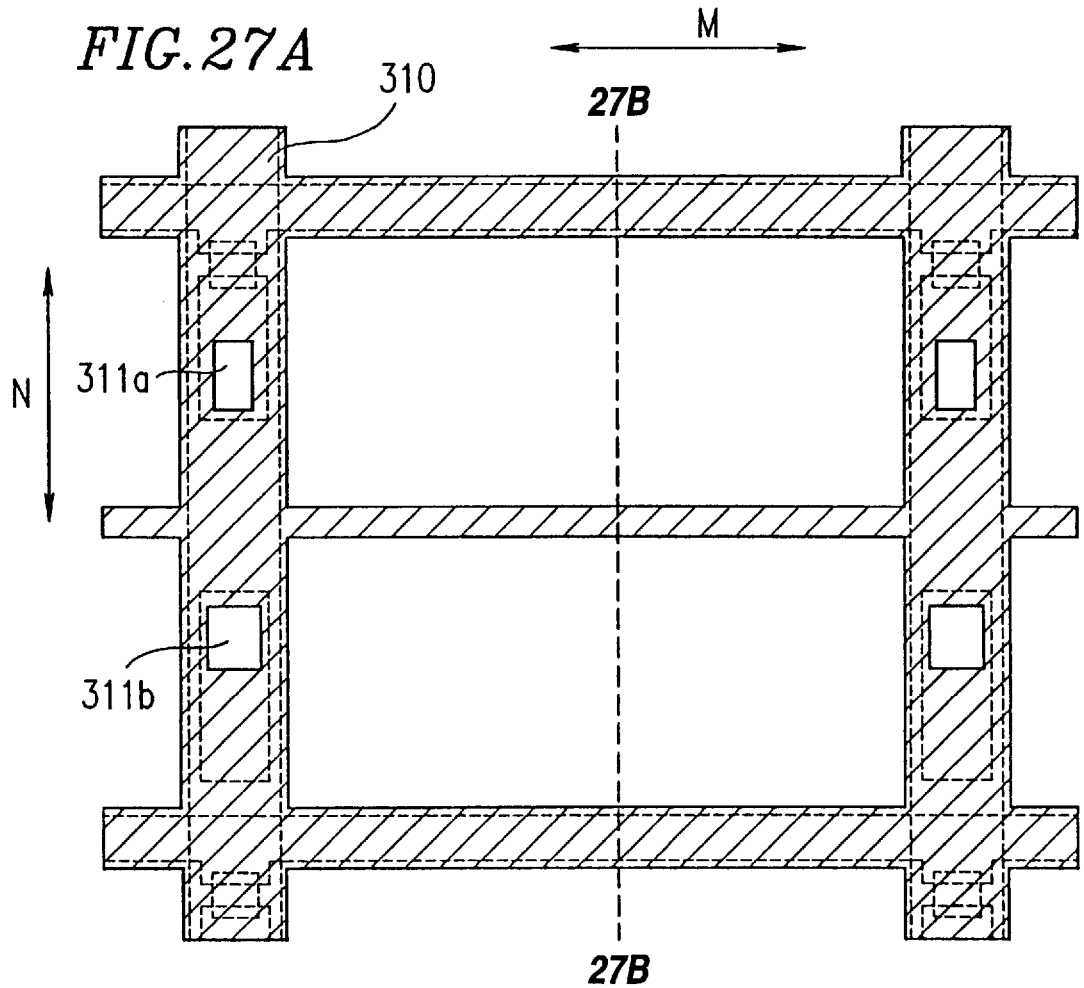
FIG. 27A is a partial plan view showing another step for producing the LCD device in Example 13 according to the present invention.
Figure 27B:
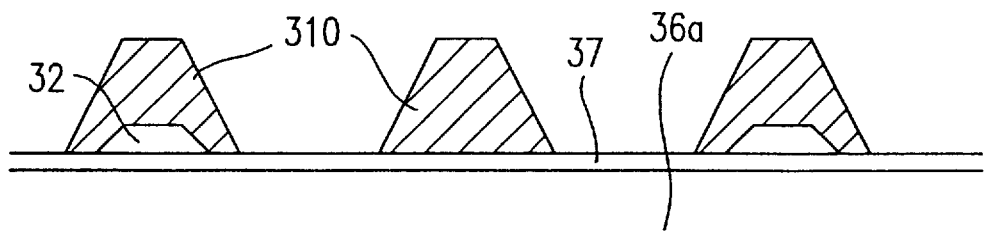
FIG. 27B is a cross sectional view corresponding to FIG. 27A.

Then, as shown in FIGS. 27A and 27B, every other interlayer insulation layers 310 running in direction M are formed to cover the source lines 32. In each interlayer insulation layer 310 running in direction N, the contact hole 311a for electrically connecting the first drain electrode 34a and the second drain electrode 34b and another contact hole 311b for electrically connecting the second drain electrode 34b and the conductive piece 312 which forms the storage capacitance together with the gate line 31 needs to be formed. The interlayer insulation layers 310 is formed of a resin. A resin is advantageous because (1) resin is relatively easily formed into a layer several microns thick, and (2) resin has a dielectric constant half of that of silicon nitride and thus generates a sufficiently small parasitic capacitance between electrodes and lines which are provided to interpose the interlayer insulation layer 310. Among various resins, a photosensitive acrylic resin is advantageous in that the interlayer insulation layer 310 can be formed and patterned to form the contact holes 311a and 311b in the same step. A photosensitive acrylic resin in a liquid state is applied to the lower plate 36a by spin-coating and treated by photolithography, and patterning for forming the contact holes 311a and 311b is performed by development with an alkaline solution.

Then, as shown in FIG. 28B, the second drain electrodes 34b and the counter electrodes 35 are formed to cover the slanting and the flat top surfaces of the interlayer insulation layers 310 running in direction M. The counter electrodes 35 are formed to cover the interlayer insulation layers 310 which cover the source lines 32. Thus, the counter electrodes 35 completely overlap the source lines 32. The second drain electrodes 34b and the counter electrodes 35 are formed of Ta or the like.

Figure 29:
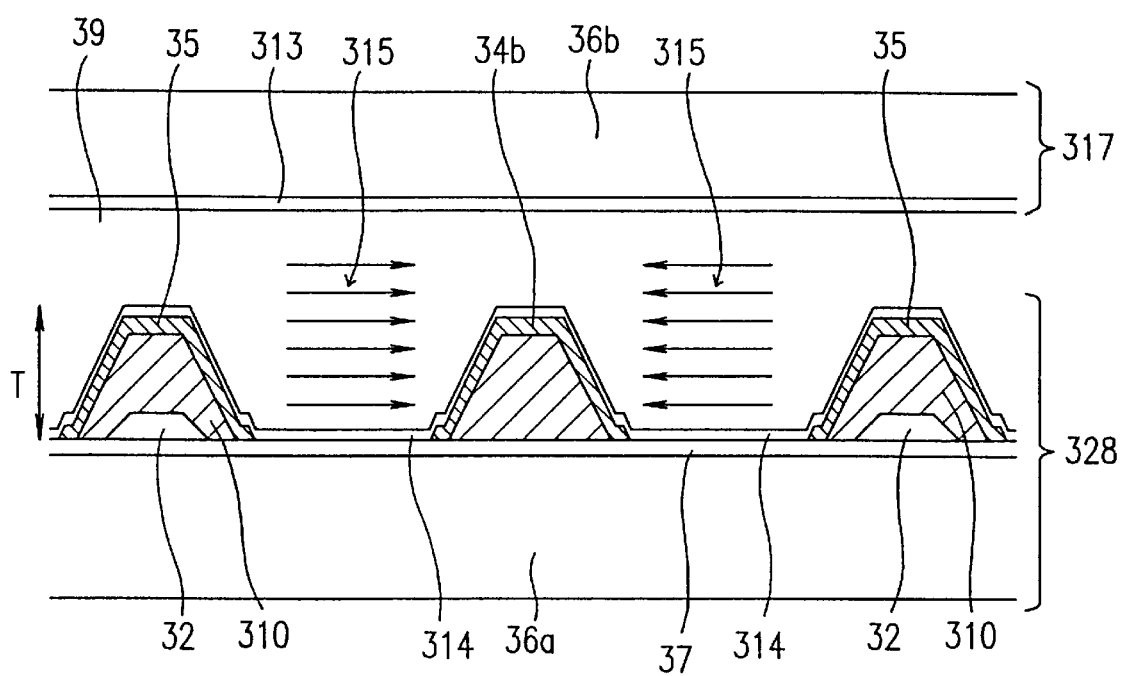
FIG. 29 is a cross sectional view of the LCD device in Example 13.

Then, as shown in FIG. 29, an alignment layer 314 is formed on the insulation layer 37 covering the counter electrodes 35 and the second drain electrodes 34b. Then, the surface of the alignment layer 314 is rubbed.

The counter substrate 317 is formed by forming an alignment layer 313 on a surface of an upper plate 36b formed of an insulating material and rubbing the surface of the alignment layer 313. The rubbing direction is determined so that the principal axis of the liquid crystal molecules in a liquid crystal layer 39 which is to be formed between the active-matrix substrate 318 and the counter substrate 317 is aligned at 45° with respect to the second drain electrodes 34b and the counter electrodes 35. Then, the active-matrix substrate 318 and the counter substrate 317 are assembled in the state where the alignment layers 313 and 314 face each others and a liquid crystal material containing the liquid crystal molecules is injected into the space therebetween to form the liquid crystal layer 39. Thus, the LCD device 3100 is completed. On the surface of the upper plate 36b, a color filter can be formed before the formation of the alignment layer 313.

In the LCD device 3100 produced in the above-described manner, the second drain electrodes 34b and the counter electrodes 35 can have a sufficient height in the thickness direction of the liquid crystal layer 39 (indicated by arrow T in FIG. 29). By appropriately setting the height of the interlayer insulation layers 310, an electric field which is substantially completely parallel to the upper and lower plates 36b and 36a can be applied as shown in FIG. 29. The present inventors have found through experiments that, when the height of the interlayer insulation layers 310 is 30% to 100%, preferably 60% to 100% with respect to the thickness of the liquid crystal layer 39, the electric field is substantially completely parallel to the upper and lower plates 36b and 36a. In a typical LCD device, the thickness of the liquid crystal layer, namely, the distance between the two substrates 328 and 317 is about 3 to 10 $\mu$m. In consideration of these figures, the height of the interlayer insulation layers 310 can be set to be about 1 to 10 $\mu$m, preferably about 2 to 6 $\mu$m. Thus, the LCD device 3100 displays satisfactory images in a wider range of viewing angles.

Due to the structure in which the counter electrodes 35 overlap the source lines 32 with the interlayer insulation layers 310 interposed therebetween, the numerical aperture is raised. Since the source lines 32 are completely covered with the counter electrodes 35, the noise caused by the source lines 32 on the second drain electrodes 34b, which is a serious problem in a conventional LCD device of the horizontal electric field driving system, is almost completely eliminated.

Figure 32:
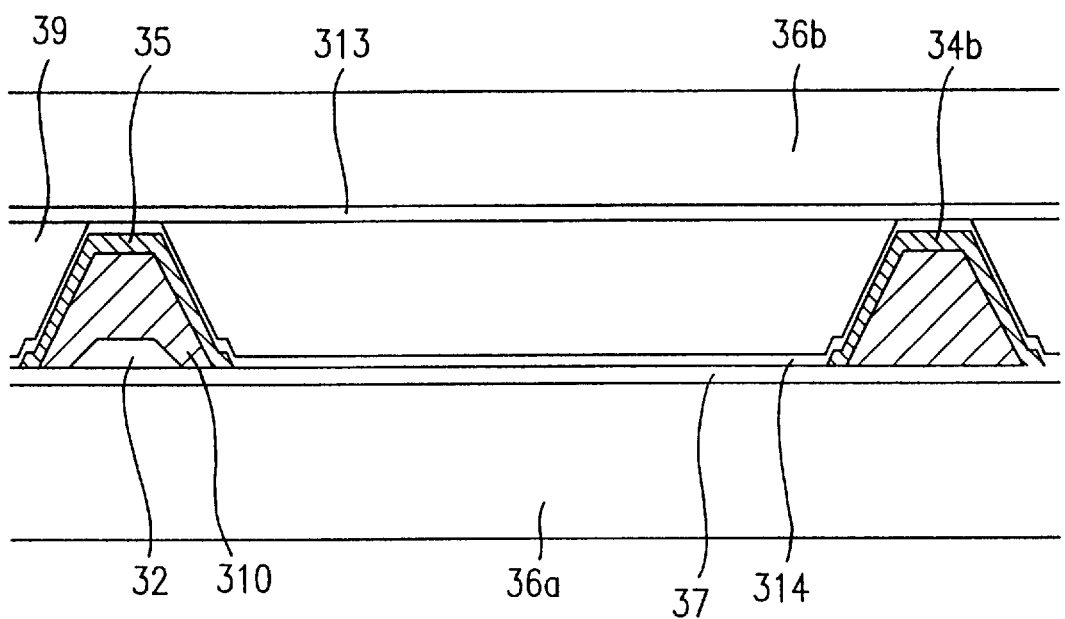
FIG. 32 is a cross sectional view of an LCD device in a modification of Example 13 according to the present invention.

In the LCD device 3100, a transparent electrode is not required in either of the two substrates. This eliminates the steps of producing the transparent electrode, The conductive layers such as counter electrodes are not provided on the counter substrate 317. Accordingly, as shown in FIG. 32, the counter electrodes 35 and the second drain electrodes 34b in the active-matrix substrate 318 can be used as spacers for maintaining the space between the upper plates 36b and the lower plate 36a.

The LCD device 3100 is of the Cs-on-Gate system in Example 13, but can be of the Cs-on-Common system.

According to the present invention, an electrode for applying an electric field to the liquid crystal molecules, e.g., the second drain electrode 34b, is provided to cover the top surface and the slanting surfaces of the interlayer insulation layer 310. Due to such a structure, the electric field can be applied in a direction substantially parallel to the surfaces of the upper and lower plates 36b and 36a. The counter electrode 35 for applying the electric field together with the second drain electrode 34b is provided to cover the source line 32 completely. Thus, the numerical aperture is raised, and also generation of noise between the source line 32 and the second drain electrode 34b which has adverse affect on the display quality is prevented, For these reasons, satisfactory display quality is obtained in a wider range of viewing angles.

The conductive layers such as counter electrodes are not provided in the counter substrate 317, Accordingly, the counter electrodes 35 and the second drain electrodes 34b in the active-matrix substrate 318 can be used as spacers for maintaining the space between the upper plates 36b and the lower plate 36a by setting the thicknesses thereof appropriately.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active-matrix substrate comprising:

an insulation substrate;

a plurality of switching elements arranged in a matrix on the insulation substrate;

a plurality of first signal lines for supplying a signal for controlling the switching elements to the switching elements;

a plurality of second signal lines for supplying a date signal to the switching elements, arranged so as to cross the first signal lines;

an interlayer insulation film having first contact holes formed therethrough, formed so as to cover the switching elements, the first signal lines, and the second signal lines;

a plurality of picture element electrodes formed on the interlayer insulation film, electrically connected to the switching elements through the contact holes; and a plurality of counter electrodes formed on the interlayer insulation film, wherein the counter electrodes are formed along the second signal lines so as to face the second signal lines through the interlayer insulation film, the plurality of picture element electrodes are arranged in a same direction in which the counter electrodes are formed, and the plurality of picture element electrodes and the counter electrodes are alternately arranged so that the picture element electrodes and the counter electrodes are disposed at substantially equal intervals.

2. An active-matrix substrate according to claim 1, wherein one picture element area corresponding to each of the switching elements includes at least one picture element electrode, and the picture element electrode is located between two adjacent counter electrodes.

3. An active-matrix substrate according to claim 1, wherein a boundary area between the two adjacent picture element electrodes along the direction is located on one of the first signal lines.

4. An active-matrix substrate according to claim 1, wherein each of the counter electrode is formed so as to have a width larger than that of each of the second signal line and to completely cover said each of the second signal lines in a width direction.

5. An active-matrix substrate according to claim 1, wherein the counter electrodes are formed on all the second signal lines.

6. An active-matrix substrate according to claim 5, wherein the counter electrodes are formed between the picture element electrodes as well as on the second signal lines.

7. An active-matrix substrate according to claim 1, wherein the counter electrodes are connected to each other in an area other than the picture element areas so as to have a same potential electrically.

8. An active-matrix substrate according to claim 7, comprising a common electrode forming a storage capacitors with the picture element electrode, arranged so as to cross the picture element electrodes, wherein the counter electrode are electrically connected to the common electrode.

9. An active-matrix substrate according to claim 1, wherein the Interlayer insulation film includes a first insulation layer of three colors forming a color filter and a second insulation layer formed so as to cover the first insulation layer.

10. An active-matrix substrate according to claim 9, wherein the color filter is formed by patterning a photosensitive resin film of three colors.

11. An active-matrix substrate according to claim 9, wherein the picture element electrode are electrically connected to the switching elements via said first contact holes formed through the first insulation layer and second contact hole formed through the second insulation layer.

12. An active-matrix substrate according to claim 11, wherein each of the first contact holes is formed so as to have a width smaller than that of the common electrode and to completely overlap the common electrode, and each of the second contact hole is formed so as to have a width smaller than that of said each of the first contact holes and to be located inside said each of the first contact holes.

13. A liquid crystal display device comprising:

an active-matrix substrate according to claim 9;

a counter substrate including a transparent insulation plate; and a liquid crystal layer interposed between the active-matrix substrate and the counter substrate.

14. A liquid crystal display device comprising:

an active-matrix substrate according to claim 1;

a counter substrate; and a liquid crystal layer interposed between the active-matrix substrate and the counter substrate.

15. A liquid crystal display device comprising:

an active-matrix substrate according to claim 1;

a counter substrate having a reflective surface; and a liquid crystal layer interposed between the active-matrix substrate and the counter substrate.

* * * * *